US007108784B1

(12) United States Patent
Litz et al.

(10) Patent No.: US 7,108,784 B1
(45) Date of Patent: Sep. 19, 2006

(54) APPARATUS FOR REMOVAL AND DESTRUCTION OF AMMONIA FROM AN AQUEOUS MEDIUM

(75) Inventors: John E. Litz, Lakewood, CO (US); Charles S. Williams, Golden, CO (US)

(73) Assignee: WRT International LLC, Arvada, CO (US)

( * ) Notice: Subject to any disclaimer, the term of this patent is extended or adjusted under 35 U.S.C. 154(b) by 9 days.

(21) Appl. No.: 10/256,854

(22) Filed: Sep. 26, 2002

Related U.S. Application Data

(60) Provisional application No. 60/325,141, filed on Sep. 26, 2001.

(51) Int. Cl.
C02F 9/00 (2006.01)

(52) U.S. Cl. .................. 210/182; 210/188; 210/195.1; 210/251; 210/259; 210/266; 210/269; 422/189

(58) Field of Classification Search ................ 210/182, 210/202, 251, 259, 266, 269, 188, 195.1; 422/148, 187, 189; 423/356, 550
See application file for complete search history.

(56) References Cited

U.S. PATENT DOCUMENTS

| | | | | |
|---|---|---|---|---|
| 2,632,720 | A | 3/1953 | Perry | 134/25.5 |
| 3,700,592 | A | 10/1972 | De Pree | 210/674 |
| 3,723,308 | A * | 3/1973 | Breck | 210/681 |
| 3,933,631 | A | 1/1976 | Adams | 210/324 |
| 4,265,634 | A | 5/1981 | Pohl | 436/161 |
| 4,375,568 | A | 3/1983 | Izod et al. | 568/758 |
| 4,389,293 | A | 6/1983 | Mani et al. | 204/517 |
| 4,686,198 | A | 8/1987 | Bush et al. | 502/25 |
| 4,695,387 | A * | 9/1987 | Berry et al. | 210/676 |
| 4,765,779 | A | 8/1988 | Organ | 406/106 |
| 4,800,024 | A | 1/1989 | Elfline | 210/665 |
| 4,995,956 | A | 2/1991 | Mani | 204/527 |
| 5,043,072 | A | 8/1991 | Hitotsuyanagi et al. | 210/638 |
| 5,084,184 | A | 1/1992 | Burns | |
| 5,200,046 | A | 4/1993 | Chlanda et al. | 204/534 |
| 5,207,914 | A | 5/1993 | Lin | 210/635 |
| 5,512,178 | A | 4/1996 | Dempo | 210/638 |
| 5,556,545 | A | 9/1996 | Volchek et al. | 210/651 |
| 5,575,919 | A | 11/1996 | Santina | 210/695 |
| 5,591,346 | A | 1/1997 | Etzel et al. | 210/668 |
| 5,651,883 | A | 7/1997 | Horwitz et al. | 210/198.2 |
| 5,679,256 | A | 10/1997 | Rose | 210/662 |
| 5,695,642 | A | 12/1997 | Greenleigh et al. | 210/638 |
| 5,707,514 | A | 1/1998 | Yamasaki et al. | 210/151 |
| 5,711,015 | A | 1/1998 | Tofe | 588/1 |
| 5,725,753 | A | 3/1998 | Harada et al. | 205/746 |
| 5,733,434 | A | 3/1998 | Harada et al. | 205/746 |

(Continued)

OTHER PUBLICATIONS

*DOWEX RSC*, "Radium Removal from Groundwater with DOWEX RSC Radium Selective Complexer Resin," DOWEX Ion Exchange Resins, http://www.dow.com/liquidseps (Aug. 2001), 2 pages.

(Continued)

*Primary Examiner*—Ivars C. Cintins
(74) *Attorney, Agent, or Firm*—Dorsey & Whitney LLP

(57) ABSTRACT

Methods and apparatuses are provided for the removal and destruction of ammonia from an aqueous medium. The methods and apparatuses include the removal of ammonia from an aqueous medium by contact with either natural or synthetic zeolite. The spent zeolite is re-generated for continuous use, while the ammonia is concentrated as ammonium sulfate, and ultimately destroyed via combustion. A system for monitoring and maintaining an ammonia removal system by an off-site provider is also disclosed.

4 Claims, 39 Drawing Sheets

U.S. PATENT DOCUMENTS

| | | | |
|---|---|---|---|
| 5,876,685 | A | 3/1999 | Krulik et al. ............... 423/488 |
| 5,951,874 | A | 9/1999 | Jangbarwala et al. ....... 210/662 |
| 6,042,731 | A | 3/2000 | Bonnin ....................... 210/679 |
| 6,531,063 | B1 | 3/2003 | Rose .......................... 210/631 |
| 6,582,605 | B1 | 6/2003 | Krulik et al. ............... 210/638 |
| 6,613,230 | B1 | 9/2003 | Krulik et al. ............... 210/638 |
| 6,663,781 | B1 | 12/2003 | Huling et al. ............... 210/668 |
| 6,753,186 | B1 | 6/2004 | Moskoff ..................... 436/125 |
| 2003/0132155 | A1 | 7/2003 | Litz et al. ................... 210/284 |
| 2004/0124150 | A1 | 7/2004 | Litz .......................... 210/656 |

OTHER PUBLICATIONS

Ames, L. L., "Zeolitic Removal of Ammonium Ions from Agricultural and Other Wastewaters," 13th Pacific Northwest Industrial Waste Conference, Washington State University, (Apr. 1967), pp. 135-152.

Bishop, D. F. et al., "Physical-Chemical Treatment of Municipal Wastewater," Journal of Water Pollution Control Federation, vol. 44, Issue 3, (1972), pp. 361-371.

Chmielewska-Horvathova, E., "Use of Clinoptiloite in Ammonia Removal from Wastewater in and Outside Slovakia," Mineralia Slovavaca, vol. 27, Issue 4, (1995), pp. 268-272.

Chmielewska-Horvathova, E., "Advanced Wastewater Treatment Using Clinoptiloite," Environment Protection Engineering, vol. 22, Issue 1-2, (1996), pp. 15-22.

Cooney, E. L. et al., "Ammonia Removal from Wastewaters Using Natural Australian Zeolite. II Pilot-Scale Study Using Continuous Packed column Process," Separation Science and Technology, vol. 34, Issue 14, (1999), pp. 2741-2760.

Jorgensen, S.E., "Ammonia Removal by Use of Clinoptilolite," Water Research, vol. 10, (1976), pp. 213-224.

Kallo, D., "Wastewater Purification in Hungary Using Natural Zeolites," Natural Zeolites'93, International Committee Natural Zeolites, Brockport, New York, (1993), pp. 341-350.

Klieve, J. R. et al., "Neutral pH Regeneration of Clinoptilolite," The Regeneration of Clinoptilolite by Biologically Restored Brine, University of Illinois, Water Resources Center, Research Report No. 139, (1979), pp. 1-1 through C-10.

Koon, J. H. et al., "Optimization of Ammonium Removal by Ion Exchange Using Clinoptilolite," SERL Report No. 71-5, University of California, Berkeley, California, (Sep. 1971), pp. 1-189.

McClaren, J. R. et al., "Factors Affecting Ammonia Removal by Clinoptilolite," Journal of the Environmental Engineering Divisino, ASCE, vol. 1973, (1973), pp. 429-444.

Mercer, B. W., "Clinoptilolite in Water Pollution Control," Ore Bin, vol. 31, Issue 11, (1969), pp. 209-213.

Mercer, B. W., "Ammonia Removal from Secondary Effluents by Selective Ion Exchange," Jouranl of the Water Pollution Control Federation, vol. 42, Issue 2, (1970), pp. R95-R107.

Semmens, M. J. et al., "The Biological Regeneration of Ammonia Saturated Clinoptilolite. II The Mechanism of Regeneration and Influence of Salt Concentration," Environmental Science & Technology, vol. 11, (1977), pp. 260-265.

Wang, M. J. et al. "Nitrogen Removal by Ion Exchange: Continuous Flow Studies on the Biological Regeneration of Clinoptilolite," Journal of the Water Pollution Control Federation, vol. 49, Issue 12, (1977), pp. 2431-2444.

Semmens, M. J., "Ammonia Removal by Clinoptilolite Using Biologically Assisted Regeneration," 5th International Conference on Zeoliltes, Naples, Florida, (1980), pp. 795-804.

Slechto, A. F. et al., "Water Reclamation Studies at the South Lake Tahoe Public Utility District," Journal of the Water Pollution Control Federation, vol. 39, (1967), pp. 787-814.

Smith, S. A. et al., "Tahoe-Truckee Water Reclamation Plant. First Year Review," Water Reuse Symposium, vol. 2, (1979), pp. 1435-1445.

Townsend, R. P. et al., "Ion-Exchange Properties of Natural Clinoptilolite, Ferrierite, and Mordenite: 1. Sodium-Ammonium Equilibria," Zeolites, vol. 4, Issue 2, (Apr. 1984), pp. 191-195.

Celik, M. S. et al., "Removal of Ammonia by Natural Clay Minerals Using Fixed and Fluidised Bed Column Reactors," Water Science and Technology: Water Supply, vol. 1, No. 1, IWA Publishing, (2001), pp. 81-88.

Hagiwara, Z. et al., "Ion-Exchange Reactions of Processed Zeolite and Its Application to the Removal of Ammonia-Nitrogen in Wastes," Zeolite, 76, International Conference, Tucson, Arizona, Pergamon Press (1978), pp. 463-470.

Haralambous, A. et al., "The Use of Zeolite for Ammonium Uptake," Water Science and Technology Journal, vol. 25, Issue 1, (1992), pp. 139-145.

Hayhurst, D. T., "The Potential Use of Natural Zaolites for Ammonia Removal During Coal-Gasification," Zeolite, 76, International Conference, Tucson, Arizona, Pergamon Press (1978), pp. 503-507.

Klieve,J. H. et al., "An Evaluation of Pretreated Natural Zeolites for Ammonium Removal," Water Research—The Journal of the International Association on Water Pollution Research, vol. 14, No. 2, Pergamon Press, (1980), pp. 161-168.

Koon, J. H. et al., "Ammonia Removal from Municipal Wastewaters by Ion Exchange," Journal of the Water Pollution Control Federation, vol. 47, Issue 3, (Mar. 1975), pp. 448-465.

Semmens, M. J. et al., "Clinoptilolite Column Ammonia Removal Model," Journal of the Environmental Engineering Division, Proceedings of the American Society of Civil Engineers, vol. 104, No. EE2, (Apr. 1978), pp. 231-244.

Semmens, M. J. et al., "Ammonium Removal by Ion Exchange: Using Biologically Restored Regenerant," Journal of Water Pollution Control Federation, vol. 31, Issue 12, (Dec. 1979), pp. 2928-2940.

Svetich, Richard, "Long-Term Use of Clinoptilolite in the Treatment of Sewage at Tahoe-Truckee Sanitation Agency, Truckee, California," Zeolite 93, 4th International Conference on the Occurrence, Properties, and Utilization of Natural Zeolites, Red Lion Hotel-Riverside, Boise, Idaho (Jun. 20-28, 1993), pp. 197-201.

Ames, L. L., "Zeolitic Removal of Ammonium Ions from Agricultural and Other Wastewaters", 13[th]Pacific Northwest Industrial Waste Conference, Washington State Universitypp. 135-152, 1967.

Bishop, D. F. et al., "Physical-Chemical Treatment of Municipal Wastewater", Journal of Water Pollution Control Federation, vol. 44, No. 3, pp. 361-371, 1972.

Celik, M. S. et al., "Removal of Ammonia by Natural Clay Minerals Using Fixed and Fluidised Bed Cloumn Reactors" Water Science and Technology: Water Supplyvol. 1, No. 1, pp. 81-88, 2001.

Chmielewska-Horváthová, E., "Use of Clinoptiloite in Ammonia Removal from Wastewater in the Outside Slovakia", Mineralia Slovavaca, vol. 27, No. 4, pp. 268-272, 1995.

Chmielewska-Horváthová, E., "Advanced Wastewater Treatment Using Clinoptiloite", Environment Protection Engineering, vol. 22, Issue 1-2, pp. 15-22, 1996.

Cooney, E. L. et al., "Ammonia Removal from Wastewaters Using Natural Australian Zeolite. II Pilot-Scale Study Using Continuous Packed Column Process", Separation Science and Technology, vol. 34, Issue 14, pp. 2741-2760, 1999.

DOWEX RSC, "Radium Removal from Groundwater with DOWEX RSC Radium Selective Complexer Resin", DOWEX Ion Exchange Resins, http://www.dow.com/liquidseps, 2 pp., 2001.

Hagiwara, Z. et al., "Ion-Exchange Reactions of Processed Zeolite and Its Application to the Removal of Ammonia-Nitrogen in Wastes", Natural Zeolites: Occurrence, Properties, Use, International Conference on the Occurrence, Properties, and Utilization of Natural Zeolites, Tucson, Arizonia, Pergamon Press, pp. 463-470, 1978.

Haralambous, A. et al., "The Use of Zeolite for Ammonium Uptake", Water Science and Technology Journal, vol. 25, No. 1, (1992), pp. 139-145.

Hayhurst, D. T., "The Potential Use of Natural Zeolites for Ammonia Removal During Coal-Gasification", Natural Zeolites: Occurrence, Properties, Use, International Conference on the Occurence, Properties, and Utilization of Natural Zeolites, Tucson, Arizona, Pergamon Press, pp. 503-507, 1978.

Jørgensen, S.E., "Ammonia Removal by Use of Clinoptilolite", Water Research, vol. 10, pp. 213-224, 1976.

Kalló, D., "Watewater Purification in Hungary Using Natural Zeolites", *Natural Zeolites '93*, International Committee Natural Zeolites, Brockport, New York, pp. 341-350, 1993.

Klieve,J. H. et al., "An Evaluation of Pretreated Natural Zeolites for Ammonium Removal", *Water Research—The Journal of the International Association on Water Pollution Research*, vol. 14, No. 2, Pergamon Press, pp. 161-168, 1980.

Koon, J. H. et al., "Optimization of Ammonia Removal by Ion Exchange Using Clinoptilolite", *SERL*, Report No. 71-5, University of California, Berkeley, California, pp. 1-189, 1971.

Koon, J. H. et al., "Ammonia Removal from Municipal Wastewaters by Ion Exchange", *Journal Water Pollution Control Federation*, vol. 47, No. 3, pp. 448-465, 1975.

McLaren, J. R. et al., "Factors Affecting Ammonia Removal by Clinoptilolite", *Journal of the Environmental Engineering Division, ASCE*, vol. 1973, pp. 429-444, 1973.

Mercer, B. W., "Clinoptilolite in Water-Pollution Control", *The Ore Bin*, vol. 31 No. 11, pp. 209-213, 1969.

Mercer, B. W., "Ammonia Removal from Secondary Effluents by Selective Ion Exchange", *Journal Water Pollution Control Federation*, vol. 42, No. 2, pp. R95-R107, 1970.

Semmens, M. J. et al., "Biological Regeneration of Ammonium-Saturated Clinoptilolite. II The Mechanism of Regeneration and Influence of Salt Concentration", *Environmental Science & Technology*, vol. 11, pp. 260-265, 1977.

Semmens, M. J. et al. "Nitrogen Removal by Ion Exchange: Biological Regeneration of Clinoptilolite", *Journal of the Water Pollution Control Federation*, vol. 49, No. 12, pp. 2431-2444, 1977.

Semmens, M. J. et al., "Clinoptilolite Column Ammonia Removal Model", *Journal of the Environmental Engineering Division, Proceedings of the American Society of Civil Engineers*, vol. 104, No. EE2, pp. 231-244, 1978.

Semmens, M. J. et al., "The Regeneration of Clinoptilolite by Biologically Restored Brine", *University of Illinois, Water Resources Center*, Research Report No. 139, pp. 1-1 through C-10, 1979.

Semmens, M. J. et al., "Ammonium Removal by Ion Exchange: Using Biologically Restored Regenerant", *Journal of Water Pollution Control Federation*, vol. 51, Issue 12, (Dec. 1979), pp. 2928-2940.

Semmens, M. J., "Ammonium Removal by Clinoptilolite Using Biologically Assisted Regeneration", *5th International Conference on Zeolilites*, Naples, Florida, pp. 795-804, 1980.

Slechta, A. F. et al., "Water Reclamation Studies at th South Lake Tahoe Public Utility District", *Journal of the Water Pollution Control Federation*, vol. 39, pp. 787-814, 1967.

Smith, S. A. et al., "Tahoe-Truckee Water Reclamation Plant. First Year Review", *Water Reuse Symposium*, vol. 2, pp. 1435-1445, 1979.

Svetich, Richard, "Long-Term Use of Clinoptilolite in the Treatment of Sewage at Tahoe-Truckee Sanitation Agency, Truckee, California", *Natural Zeolites: Occurrence, Properties, Use*, International Conference on the Occurrence, Properties, and Utilization of Natural Zeolites, Red Lion Hotel-Riverside, Boise, Idaho pp. 197-201, 1993.

Townsend, R. P. et al., "Ion Exchange Properties of Natural Clinoptilolite, Ferrierite and Mordenite: 1. Sodium-Ammonium Equilibria", *Zeolites*, vol. 4, No. 2, pp. 191-195, 1984.

Abdo et al., "A new technique for removing hexavalent chromium from waste water and energy generation via galvanic reduction with scrap iron", Energy Conversation and Management, vol. 39, No. 9, pp. 943-951, Jul. 1998. (Abstract).

Barrado et al., "Characterisation of solid residues obtained on removal of Cr from waste water", Journal of Alloys and Compounds, vol. 335, pp. 203-209, Mar. 14, 2002. (Abstract).

Fazullina et al., "Removal of chromium compounds in the process of coagulation treatment of wool industry dyeing-finishing plant waste water", Soviet Journal of Water Chemistry and Technology, vol. 10, No. 5, pp. 85-88, 1988. (Abstract).

Han, Ihn Sup, "Environmental engineering parameters affecting the removal of hexavalent chromium and nitroaromatic compounds from water by granular activated carbon", Thesis, 178 pages, 1999. (Abstract).

Kutsy, V. G., "The Removal of Co; 2; +, Ni; 2; +Cu; +, Zn; 2; +, Mn; 2; +, Fe; 3; + and Cr; 6; + out of Water Solutions by Phosphates of Metals", Ekotekhnologii I Resosberezhenie, Part 1, pp. 42-45, 2002. (Abstract).

Lin, et al., "The removal of hexavalent chromium from water by ferrous sulfate", Hazardous and insdustrial wastes: Proceedings of the twenty-seventh Mid-Atlantic industrial waste conference, Technomic Publishing Co., Inc., Lancaster, PA, 1995. (Abstract).

Melitas et al., "Kinetics of soluble chromium removal from contaminated water by zero valent iron media: corrosion inhibition and passive oxide effects", Environmental Science Technology, vol. 35, No. 19, pp. 3948-3953, 2001. (Abstract).

Philipot et al., "Hexavalent Chromium Removal from Drinking Water", Water Science and Technology, vol. 17, No. 6/7, pp. 1121-1132, 1985. (Abstract).

Sarre et al., "Chromium removal in water by modified cellulose", Journal of Water Science, vol. 1, No. 1-2, pp. 55-71, 1988. (Abstract).

Slechta, A. F. et al., "Water Reclamation Studies at th South Lake Tahoe Public Utility District", Journal of the Water Pollution Control Federation, vol. 39, pp. 787-814, 1967.

Svetich, Richard, "Long-Term Use of Clinoptilolite in the Treatment of Sewage at Tahoe-Truckee Sanitation Agency, Truckee, California", Natural Zeolites: Occurrence, Properties, Use, International Conference on the Occurrence, Properties, and Utilization of Natural Zeolites, Red Lion Hotel-Riverside, Boise, Idaho pp. 197-201, 1993.

\* cited by examiner

FIG. 5A

MASS BALANCE TO REMOVE AMMONIA, AIR STRIP, H2SO4 SCRUB, AND BURN AMMONIA

| Stream No. | Description | Phase | lb/hr | gpm | Spg | Calcium %-g/L | Calcium lb/hr | Magnesium %-g/L | Magnesium lb/hr | Potassium %-g/L | Potassium lb/hr | Sodium %-g/L | Sodium lb/hr | Ammonium %-g/L | Ammonium lb/hr | Hydrogen ion %-g/L | Hydrogen ion lb/hr | Sulfate %-g/L | Sulfate lb/hr | Chloride %-g/L | Chloride lb/hr | Hydroxide %-g/L | Hydroxide lb/hr |
|---|---|---|---|---|---|---|---|---|---|---|---|---|---|---|---|---|---|---|---|---|---|---|---|
| 404 | Feed Water | Liquid | 350,490 | 700 | 1.00 | 0.20 | 70.10 | 0.025 | 8.76 | 0.005 | 1.75 | 0.025 | 8.76 | 0.040 | 14.02 | 0.00 | 0.00 | 0.24 | 84.12 | 0.19 | 65.19 | - | |
| | Adjusted Feed | Liquid | 350,797 | 701 | 1.00 | 0.20 | 70.24 | 0.025 | 8.76 | 0.005 | 1.75 | 0.025 | 8.76 | 0.044 | 15.36 | 0.000 | 0.00 | 0.240 | 84.12 | 0.186 | 65.19 | 0.006 | 2.70 |
| 412 | Rinsed zeolite | Solid | 2,935 | 2.7 | 2.15 | 0.60% | 17.64 | 0.00% | 0.00 | 0.00% | 0.00 | 0.05% | 1.47 | 0.00% | 0.00 | | | 0.00 | 0.00 | 0.00 | 0.00 | 0.00 | 0.00 |
| | | Liquid | 734 | 1.5 | 1.00 | 0.20 | 1.9 | 0.00 | 0.00 | 0.00 | 0.00 | 0.00 | 0.00 | 0.00 | 0.00 | 0.00 | 0.00 | 0.00 | 0.00 | 3.3 | 2.41 | 0.00 | 0.01 |
| | | Total | 3,668 | 4.2 | 1.75 | | 19.00 | | 0.00 | | 0.00 | | 1.47 | | 0.00 | | 0.00 | | 0.00 | | 2.41 | | 0.01 |
| 416 | Loaded zeolite to strip | Solid | 2,951 | 2.7 | 2.15 | 0.00% | 0.00 | 0.00% | 0.00 | 0.05% | 1.72 | 0.00% | 0.00 | 0.51% | 15.06 | | | | | | | | |
| | | Liquid | 734 | 1.5 | 1.00 | 0.20 | 0.15 | 0.02 | 0.02 | 0.00 | 0.00 | 0.02 | 0.02 | 0.04 | 0.03 | 0.00 | 0.00 | 0.24 | 0.18 | 0.19 | 0.14 | 0.00 | 0.00 |
| | | Total | 3,685 | 4.2 | 1.75 | | 0.15 | | 0.02 | | 1.72 | | 0.02 | | 15.09 | | 0.00 | | 0.176 | | 0.14 | | 0.00 |
| 410 | Clean discharge water | Liquid | 350,797 | 701 | 1.00 | 0.025 | 8.74 | 0.025 | 8.74 | 0.000 | 0.03 | 0.029 | 10.21 | 0.00 | 0.28 | 0.00 | 0.00 | 0.24 | 84 | 0.19 | 67.47 | 0.00 | 0.00 |
| 444 | RO Concentrate | Liquid | 440 | 0.77 | 1.14 | 67.2 | 25.93 | 0.00 | 0.00 | 0.04 | 0.02 | 0.00 | 0.00 | 0.00 | 0.00 | 0.00 | 0.00 | 0.27 | 0.11 | 119.0 | 45.91 | 0.27 | 0.10 |
| | Sodium Chloride | Solid | 4 | 0 | 2.16 | | | | | | | 40% | 1.47 | | | | | | | 60% | 2.19 | | |
| 430 | Preg Stuart | Liquid | 44,477 | 82 | 1.08 | 39.1 | 1,612 | 0.00 | 0.02 | 0.00 | 0.00 | 0.00 | 0.02 | 0.37 | 15.09 | 0.00 | 0.00 | 0.0 | 0.00 | 69.1 | 2,846 | 0.16 | 6.52 |
| 422 | Recycle Stuart | Liquid | 44,020 | 81 | 1.08 | 40.0 | 1630 | 0.00 | 0.00 | 0.00 | 0.00 | 0.00 | 0.00 | 0.00 | 0.00 | 0.00 | 0.00 | 0.00 | 0.00 | 71 | 2894 | 0.160 | 6.52 |
| 428 | Stripped zeolite to rinse | Solid | 2,935 | 2.7 | 2.15 | 0.60% | 17.64 | 0.00% | 0.00 | 0.00% | 0.00 | 0.05% | 1.47 | 0.00% | 0.00 | | | 0.00 | 0.00 | 0.00 | 0.00 | 0.00 | 0.00 |
| | | Liquid | 734 | 1.4 | 1.08 | 40.0 | 27.17 | 0.02 | 0.00 | 0.00 | 0.00 | 0.00 | 0.00 | 0.00 | 0.00 | 0.00 | 0.00 | 0.00 | 0.00 | 74.0 | 48.23 | 0.16 | 0.11 |
| | | Total | 3,668 | 4.1 | 1.79 | | 44.82 | | 0.00 | | 0.00 | | 1.47 | | 0.00 | | 0.00 | | 0.00 | | 48.23 | | 0.11 |
| 440 | Make-up rinse water | Liquid | 440 | 0.88 | 1.00 | 0.25 | 0.11 | 0.02 | 0.01 | 0.00 | 0.00 | 0.03 | 0.01 | 0.00 | 0.00 | 0.00 | 0.00 | 0.24 | 0.11 | 0.19 | 0.08 | 0.00 | 0.00 |
| 442 | Water to rinse | Liquid | 4,402 | 8.8 | 1.00 | 0.03 | 0.11 | 0.00 | 0.00 | 0.00 | 0.00 | 0.00 | 0.00 | 0.00 | 0.00 | 0.00 | 0.00 | 0.02 | 0.11 | 0.02 | 0.08 | 0.00 | 0.00 |
| 412 | Rinsed zeolite to load | Solid | 2935 | 2.7 | 2.15 | 0.60% | 17.64 | 0.00% | 0.00 | 0.00% | 0.00 | 0.05% | 1.47 | 0.00% | 0.00 | | | 0.00 | 0.00 | 0.00 | 0.00 | 0.00 | 0.00 |
| | | Liquid | 734 | 1.5 | 1.00 | 1.85 | 1.38 | 0.00 | 0.00 | 0.00 | 0.00 | 0.00 | 0.00 | 0.00 | 0.00 | 0.00 | 0.00 | 0.00 | 0.00 | 3.3 | 2.41 | 0.01 | 0.01 |
| | | Total | 3,668 | 4.2 | 1.75 | | 19.00 | | 0.00 | | 0.00 | | 1.47 | | 0.00 | | 0.00 | | 0.00 | | 2.41 | | 0.01 |
| | Rinse water to RO | Liquid | 4,402 | 8.7 | 1.01 | 5.96 | 25.93 | 0.00 | 0.00 | 0.00 | 0.00 | 0.00 | 0.00 | 0.00 | 0.00 | 0.00 | 0.00 | 0.02 | 0.11 | 10.6 | 45.91 | 0.02 | 0.10 |

| MASS BALANCE TO REMOVE AMMONIA, AIR STRIP, H2SO4 SCRUB, AND BURN AMMONIA | | | | | | | | |
|---|---|---|---|---|---|---|---|---|
| Carboneta/CO2 | | Water | | Ion | ASSUMPTIONS AND CHECK CALCULATIONS | | | |
| %-g/L | lb/hr | %-g/L | lb/hr | Balance | Assumptions are underlined | | Force Values are bold | |
| | | | | | 200 mg/l Ca | 25 mg/l Mg | 5 K mg/l | |
| 0.16 | 56.08 | 999 | 350,181 | -0.001 | 700 gpm | 1.00 SG | 25 Na mg/l | |
| | | | | | 40 mg/L NH4 | 240 mg/l SO4 | 185 mg/l Cl | |
| 01.60 | 56.08 | 999 | 350,487 | -0.078 | | | 150 mg/l CO3 | |
| | | | | | zeolite capacity | | | |
| | 0.00 | | | | 0.30 meq/g | 0.00030 lb eq/lb | | |
| 0.00 | 0.00 | 995 | 730 | -0.001 | Loading efficiency | | | |
| | 0.00 | | 730 | | 98% K, NH4 | 0% Mg | | |
| | | | | | 0% Ca | 0% Na | | |
| | | | | | zeolite required | 2.15 SG of zeolite | | |
| 0.16 | 0.12 | 999 | 733 | 0.000 | 0.88 eq= | 2936 lb | | |
| | 0.12 | | 733 | | | | | |
| | | | | | | | | |
| 0.16 | 56.96 | 999 | 350,481 | 0.144 | 0.000 g/l hydroxide | | | |
| | | | | | | | | |
| 0.18 | 0.07 | 954 | 368 | -0.012 | | | | |
| | | | | | | | | |
| | | | | | Chloride Make-up | 40% Na | 80% Cl | |
| | | | | | | 2.16 SG | | |
| | | 971 | 40,003 | 0.545 | 100% elution efficiency | | | |
| | | | | | 111 g/l CaC2 | 40 g/l Ca | 0.56 g/l So4 | |
| | | 969 | 39,496 | -0.661 | 0 g/l H+ | 71 g/l Cl | 0.16 g/l OH | |
| | | | | | 1.08 SG | 15 lb eluant stripped zeolite | | |
| | | | | | | | | |
| | | 969 | 658 | -0.011 | 20% liquid | | | |
| | | | 658 | | | | | |
| | | | | | | | | |
| 0.16 | 0.07 | 999 | 440 | 0.000 | 10% of water to rinse | | | |
| | | | | | | | | |
| 0.02 | 0.07 | 1000 | 4,402 | 0.000 | 6 times zeolite liquid | | 4402 lb | |
| | | | | | | | | |
| 0.00 | 0.00 | 995 | 730 | -0.001 | 95% ion removal of stripped ions | | | |
| | 0.00 | | 730 | | | | | |
| | | | | | | | | |
| 0.02 | 0.07 | 996 | 4,330 | -0.012 | | | | |

UNDERLINED VALUES ARE ASSUMMPTIONS BASED ON EXPERIMENTAL DATA IN EXAMPLES

| | | | | | | Calcium | | Magnesium | | Potassium | | Sodium | | Ammonium | | Hydrogen ion | | Sulfate | | Chloride | | Hydroxide | |
|---|---|---|---|---|---|---|---|---|---|---|---|---|---|---|---|---|---|---|---|---|---|---|---|
| Stream No. | Description | Phase | lb/hr | gpm | SpG | %-g/L | lb/hr | %-g/L | lb/hr | %-g/L | lb/hr | %-g/L | lb/hr | %-g/L | lb/hr | %-g/L | lb/hr | %-g/L | lb/hr | %-g/L | lb/hr | %-g/L | lb/hr |
| 434 | RO Permeate | Liquid | 3,962 | 7.9 | 1.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 420 | Lime to adjust | Solid | 32.9 | 0.026 | 2.50 | 53% | 17.30 | | | | | | | | | | | | | | | | |
| 430 | Slurry to air stripper | Solid | | | | | | | | | | | | | | | | | | | | | |
| | | Liquid | 44,510 | 82 | 1.08 | 39.5 | 1,629 | 0.00 | 0.02 | 0.04 | 1.72 | 0.00 | 0.02 | 0.37 | 15.09 | | | 0.00 | 0.00 | 69.1 | 2,848 | 0.5 | 21.19 |
| | | Total | 44,510 | 82 | 1.08 | | 1,629 | | 0.02 | | 1.72 | | 0.0 | | 15.09 | | | | | | 2,848 | | |
| 445 | Air to stripper | | 158,445 | | 32736 cfm | | | | | | | | | | | | | | | | | | |
| 448 | Air from stripper | | 158,460 | | 32736 cfm | | | | | | | | | 0.010% | 15.09 | | | | | | | | |
| 422 | Brine from air stripper | Liquid | 44,495 | 82.2 | 1.08 | 39.55 | 1629 | 0.00 | 0.00 | 0.00 | 0.00 | 0.00 | 0.00 | 0.00 | 0.00 | 0.00 | 0.00 | 0.00 | 0.00 | 69.1 | 2846 | 0.17 | 6.94 |
| 449 | Brine bleed | Liquid | 475 | 0.9 | 1.08 | 39.6 | 17.38 | 0.0 | 0.00 | 0.00 | 0.00 | 0.00 | 0.00 | 0.00 | 0.00 | 0.00 | 0.00 | 0.0 | 0.00 | 69.1 | 30.38 | 0.17 | 0.07 |
| | Gain or loss in elution | | 0.00 | | | | -16.82 | | | | | | | | 0.00 | | | | 0.09 | | | | 0.35 |
| 454 | H2SO4 to scrubbing acid | | 500 | 0.05 | 1.83 | | | | | | | | | | | 34.04 | 0.92 | 1668 | 45.18 | | | | |
| 470 | Make-up water | | 146 | 0.29 | 1.00 | | | | | | | | | | | | | | | | | | |
| 452 | Scrubbing Acid | Liquid | 22,255 | 37.99 | 1.17 | | | | | | | | | | | 0.10 | 1.84 | 204 | 3880 | | | | |
| | Scrubbed gas | | 158,445 | | 32736 cfm | | | | | | | | | | 1.51 | | | | | | | | |
| 456 | Product scrub | Liquid | 22,270 | 37.99 | 1.17 | | | | | | | | | 80.04 | 1522 | 0.05 | 1.01 | 204 | 3880 | | | | |
| 464 | Bleed to NH3 burn | Liquid | 197 | 0.34 | 1.17 | | | | | | | | | 80.75 | 1536 | 0.05 | 0.01 | 204 | 34.3 | | | | |
| 466 | Lime to adjust | Solid | 32.0 | 0.026 | 2.50 | 53% | 16.83 | | | | | | | | 13.6 | | | | | | | | |
| 472 | Slurry before reaction | Liquid | 229 | 0.38 | 1.26 | 93.0 | 16.83 | | | | | | | 80.75 | 13.58 | | | 190 | 34.30 | | | 78.0 | 14.12 |
| | Dilution water | | 0 | 0.001 | 1.00 | | | | | | | | | 75.04 | | | | | | | | | |

| MASS BALANCE TO REMOVE AMMONIA, AIR STRIP, H2SO4 SCRUB, AND BURN AMMONIA | | | | | | | | |
|---|---|---|---|---|---|---|---|---|
| Cobonate/C02 | | Water | | Ion | ASSUMPTIONS AND CHECK CALCULATIONS | | | |
| %-g/L | lb/hr | %-g/L | lb/hr | Balance | Assumptions are underlined | | Force Values are bold | |
| 0.00 | 0.00 | 1000 | 3,962 | 0.000 | 0 g/l ions | | 90% to permeate | |
|  |  |  |  |  | 2.8 SG | | 1.03 eq/eq NH3 | |
|  |  |  |  |  | 52.6% Ca |  |  |  |
|  | 0.00 | 971 | 40,019 | 0.645 |  |  |  |  |
|  |  |  | 40,019 |  |  |  |  |  |
|  |  |  | 874 |  | 3000 cf/cf aqueous | | 874 lb water vapor | |
|  |  |  |  |  | 1153 moles air | | 48.5 moles water vapor | |
|  |  |  | 874 |  | 100% NH3 Stripped |  |  |  |
|  |  |  |  |  | 30 C from air stripper | | 32 mm H20 vapor | |
|  |  |  |  |  | 99% lime reacted | | 760 mm total pressure | |
|  |  | 972 | 40,020 | 0.599 |  |  |  |  |
|  |  |  | 427 | 0.007 | 1.1% of air stripper discharge brine to conrol brine volume | | | |
|  |  |  | 97 |  |  |  |  |  |
|  |  |  | 3 | 0.000 | 110% of required acid | | 93% H2SO4 | |
|  |  |  |  |  |  |  | 1.83 SG |  |
|  |  |  | 146 | 0.000 |  |  |  |  |
|  |  |  |  |  | 50% of brine flow | | 3880 lb/hr SO4 | |
|  |  | 888 | 16,851 | 7.243 | 290 g/l (NH4)2SO4 | | 80.04 g/l NH4 | |
|  |  |  |  |  | 1.17 SG |  |  |  |
|  |  |  | 874 |  | 90% ammonia removal |  |  |  |
|  |  | 888 | 16,853 | 7.159 |  |  |  |  |
|  |  | 888 | 149 | 0.083 |  |  |  |  |
|  |  |  |  |  | 2.5 SG | | 1.1 eq/eq NH3 | |
|  |  |  |  |  | 52.60% Ca | | 1.1 eq/eq H | |
|  |  | 907 | 164 | 0.063 |  |  |  |  |
|  |  |  | 0 |  | 0% dilution | not needed |  |  |

FIG.5B2

| Stream | | | | | | | | | | | | | | | | | | | | | | | | |
|---|---|---|---|---|---|---|---|---|---|---|---|---|---|---|---|---|---|---|---|---|---|---|---|---|
| No. | Description | Phase | lb/hr | gpm | SpG | %-g/L | lb/hr | Magnesium %-g/L | lb/hr | Potassium %-g/L | lb/hr | Sodium %-g/L | lb/hr | Ammonium %-g/L | lb/hr | Hydrogen ion %-g/L | lb/hr | Nitrate %-g/L | lb/hr | Chloride %-g/L | lb/hr | Hydroxide %-g/L | lb/hr |
| | Gypsum slurry | Solid | 72 | 0.06 | 2.32 | 23.9%cum | 16.58 | | | | | | | | | | | 55.8%trate | 40.03 | | | | |
| | | Liquid | 278 | 0.50 | 1.10 | 0.58 | 0.15 | | | | | | | 54.11 | 13.56 | | | -22.84 | -5.7 | | | | |
| | | Total | 348 | 0.58 | 1.23 | | 16.83 | | | | | | | | 13.56 | | | | 34.30 | | | | |
| | Gypsum cake | Solid | 72 | 0.06 | 2.32 | 23.3% | 18.68 | | | | | | | | | | | 58.8% | 40.03 | | | | |
| | | Liquid | 31 | 0.06 | 1.10 | 0.58 | 0.02 | | | | | | | 54.11 | 1.51 | | | -22.84 | -0.64 | | | | |
| | | Total | 102 | 0.12 | 1.74 | | 16.70 | | | | | | | | 1.51 | | | | 39.40 | | | | |
| | Cake rinse | Liquid | 5 | 0 | 1.00 | | | | | | | | | | | | | | | | | | |
| | Washed cake | Solid | 72 | 0.06 | 2.32 | 23.3% | 16.88 | | | | | | | | | | | 55.8% | 40.03 | | | | |
| | | Liquid | 31 | 0.06 | 1.00 | 0.05 | 0.001 | | | | | | | 4.43 | 0.136 | | | -1.87 | -0.057 | | | | |
| | | Total | 102 | .012 | 1.68 | | 16.88 | | | | | | | | 0.14 | | | | 39.98 | | | | |
| 472 | Filtrate+Wash | Liquid | 307 | 0.56 | 1.08 | 0.51 | 0.14 | | | | | | | 47.72 | 13.44 | | | -20.14 | -5.57 | | | | |
| 476 | Air to strip | Gas | 1,078 | 224 cfm | | | | | | | | | | | | | | | | | | | |
| 488 | Stripper air to combust | Gas | 1,090 | 228 cfm | | | | | | | | | | | 12.10 | | | | | | | | |
| 484 | Air to burner | Gas | 0 | 0 cfm | | | | | | | | | | | | | | | | | | | |
| 486 | Methane to burner | Gas | 0 | | | | | | | | | | | | | | | | | | | | |
| 478 | Liquid from stripper | Liquid | 307 | 0.56 | 1.09 | 0.51 | 0.14 | | | | | | | 4.77 | 1.34 | | | | | | | | |
| | Bleed Sums | | 347,310 | 702 | 0.99 | 0.25 | 87.7 | 0.02 | 8.7 | 0.00 | 0.0 | 0.03 | 10.2 | 0.001 | 0.3 | 0.00 | 0.0 | 0.24 | 83.9 | 0.28 | 97.8 | 0.00 | 0.4 |
| | Lime additions | | 64.9 | | | | | | | | | | | | | | | | | | 0.0 | | |
| | H2SO4 Additions | | 50 | | | | | | | | | | | | | | | | | | | | |
| | Sodium Chloride | | 4 | | | | | | | | | | | | | | | | | | | | |

FIG. 5C1

| MASS BALANCE TO REMOVE AMMONIA, AIR STRIP, H2SO4 SCRUB, AND BURN AMMONIA | | | | | | | | |
|---|---|---|---|---|---|---|---|---|
| Carbonate/CO2 | | Water | | Ion | ASSUMPTIONS AND CHECK CALCULATIONS | | | |
| %-g/L | lb/hr | %-g/L | lb/hr | Balance | Assumptions are underlined | | Force Values are bold | |
| | | | | | 2.32 | SG of gypson | 55% SO4 | 21% H2O |
| | | 21% | 15 | 0.015 | 23% | Ca | 99.13% | Ca pptd |
| | | | 654 | 164 | 0.879 | 1.4 g/l SO4 is equilibrium | 1.1 | sain SG |
| | | | | 179 | | 0.58 g/l Ca at equilibrium | | |
| | | | | | | | | |
| | | 20.9% | 15 | 0.015 | | | | |
| | | | 1068 | 30 | 0.096 | 70% moisture cake | | |
| | | | | 45 | | | | |
| | | | | | | | | |
| | | | 1000 | 61 | 0.000 | 2 displacements | 70% efficiency per displacer | |
| | | | | | | | | |
| | | 20.9% | 15 | 0.015 | | | | |
| | | | 997 | 31 | 0.009 | 70% moisture cake | | |
| | | | | 46 | | | | |
| | | | | | | | | |
| | | | 1061 | 299 | 0.870 | | | |
| | | | | | | 3000 cf/cf aqueous | 215 lb water vapor/moles | |
| | | | | | | 283 moles air/min | 12 water vapor/min | |
| | | | | 214.50 | | 5.4 moles NH3/min | 90% NH3 removal efficiency | |
| | | | | | | | | |
| | | | | | | 0 lb/hr from HSC to burn at 220°C | | |
| | | | | | | 30 °C from air stripper | 32 mm H2O vapor | |
| | | | | | | | 760 mm total pressure | |
| | | | | | | | | |
| | | | 1084 | 305 | -0.077 | | | |
| | | | | | | | | |
| | | | | | | | | |
| | | | | | | | | |
| 0.16 | 56.0 | 987 | 347,044 | | | | | |

FIG.5C2

| Day | Time | Elapsed | Cum | Rate ml | Bed Volumes | Cum BV | Feed Ca | Mg | K | NH3 | Na | Column 1 Ca | Mg | K | NH3 | Na | Column 2 Ca | Mg | K | NH3 | Na |
|---|---|---|---|---|---|---|---|---|---|---|---|---|---|---|---|---|---|---|---|---|---|
| 1 | 11:35 | 0 | 0 | | | | | | | | | | | | | | | | | | |
| 1 | 12:00 | 25 | 25 | 1110 | 15.0 | 15 | 97 | 14 | 19 | 29 | 16 | 1 | 2 | 1 | 0.1 | 245 | 1 | 2 | 1 | 0.0 | 250 |
| 1 | 14:00 | 120 | 145 | 1050 | 68.1 | 83 | 97 | 12 | 19 | 27 | 16 | 40 | 14 | 1 | 1.9 | 165 | 1 | 2 | 1 | 0.1 | 240 |
| 1 | 16:00 | 120 | 265 | 1183 | 76.7 | 160 | 100 | 12 | 21 | 30.0 | 14 | 81 | 14 | 4 | 6.7 | 110 | 18 | 20 | 1 | 0.3 | 185 |
| 2 | 10:00 | 75 | 340 | 1200 | 48.6 | 208 | 88 | 14 | 20 | 34 | 22 | 76 | 14 | 5 | 8.8 | 96 | 32 | 16 | 1 | 0.3 | 165 |
| 2 | 12:00 | 120 | 460 | 1150 | 74.6 | 283 | 100 | 16 | 23 | 32 | 22 | 100 | 16 | 9 | 19 | 60 | 80 | 16 | 1 | 1.7 | 135 |
| 2 | 14:00 | 120 | 580 | 1063 | 70.2 | 353 | 110 | 16 | 26 | 40 | 20 | 110 | 18 | 13 | 26 | 45 | 105 | 16 | 3 | 5.8 | 115 |
| 2 | 16:00 | 120 | 700 | 1100 | 71.4 | 425 | 90 | 14 | 19 | 29 | 21 | 91 | 14 | 10 | 26 | 21 | 87 | 14 | 4 | 8.8 | 81 |
| 3 | 10:00 | 70 | 770 | 1150 | 43.5 | 468 | 86 | 12 | 20 | 27 | 26 | | | | | | 85 | 14 | 6 | 13 | 68 |
| 3 | 12:00 | 120 | 890 | 1000 | 64.9 | 533 | 83 | 14 | 20 | 36 | 27 | | | | | | 87 | 14 | 9 | 19 | 47 |
| 3 | 14:00 | 120 | 1010 | 1175 | 76.2 | 609 | 84 | 14 | 20 | 29 | 26 | | | | | | 90 | 14 | 11 | 24 | 35 |
| 3 | 16:00 | 120 | 1130 | 1175 | 76.2 | 685 | 91 | 16 | 22 | 32 | 27 | | | | | | 97 | 16 | 13 | 29 | 32 |
| 4 | 10:00 | 90 | 1220 | 1175 | 67.2 | 743 | 94 | 14 | 22 | 33 | 28 | | | | | | | | | | |
| 4 | 12:00 | 120 | 1340 | 1250 | 81.1 | 824 | 81 | 14 | 19 | 27 | 19 | | | | | | | | | | |
| 4 | 14:00 | 120 | 1460 | 1200 | 77.8 | 902 | 83 | 14 | 19 | 26 | 19 | | | | | | | | | | |

| Day | Time | Elapsed | Cum | Rate ml | Liters | | meq fed to circuit Ca | Mg | K | NH3 | Na | meq discharge Col 1 Ca | Mg | K | NH3 | Na | meq discharge Col 2 Ca | Mg | K | NH3 | Na |
|---|---|---|---|---|---|---|---|---|---|---|---|---|---|---|---|---|---|---|---|---|---|
| 1 | 12:00 | 25 | 25 | 1110 | 28 | | 135 | 32 | 13 | 47 | 19 | 1.4 | 4.6 | 0.7 | 0.2 | 296 | 1.39 | 4.6 | 0.7 | 0 | 301.6 |
| 1 | 14:00 | 120 | 145 | 1050 | 126 | | 611 | 124 | 61 | 202 | 88 | 252 | 145 | 3.2 | 14 | 904 | 6.3 | 21 | 3.2 | 0.7 | 1315 |
| 1 | 16:00 | 120 | 265 | 1183 | 142 | | 710 | 140 | 76 | 251 | 86 | 675 | 164 | 15 | 56 | 679 | 128 | 234 | 3.6 | 2.5 | 1142 |
| 2 | 10:00 | 75 | 340 | 1200 | 90 | | 396 | 104 | 46 | 178 | 86 | 342 | 104 | 12 | 47 | 376 | 144 | 133 | 2.3 | 1.6 | 645.7 |
| 2 | 12:00 | 120 | 460 | 1150 | 138 | | 690 | 182 | 61 | 263 | 132 | 690 | 182 | 32 | 157 | 360 | 652 | 182 | 3.5 | 14 | 810 |
| 2 | 14:00 | 120 | 580 | 1063 | 130 | | 715 | 171 | 86 | 304 | 113 | 715 | 193 | 43 | 202 | 254 | 682 | 193 | 10 | 44 | 649.8 |
| 2 | 16:00 | 120 | 700 | 1100 | 132 | | 594 | 152 | 64 | 224 | 121 | 601 | 152 | 34 | 203 | 121 | 574 | 152 | 14 | 68 | 464.9 |
| 3 | 10:00 | 70 | 770 | 1150 | 81 | | 346 | 80 | 41 | 128 | 91 | | | | | | 342 | 93 | 12 | 61 | 238 |
| 3 | 12:00 | 120 | 890 | 1000 | 120 | | 498 | 138 | 61 | 251 | 141 | | | | | | 522 | 138 | 28 | 136 | 245.2 |
| 3 | 14:00 | 120 | 1010 | 1175 | 141 | | 592 | 162 | 72 | 237 | 159 | | | | | | 635 | 162 | 40 | 196 | 214.6 |
| 3 | 16:00 | 120 | 1130 | 1175 | 141 | | 642 | 186 | 79 | 266 | 166 | | | | | | 684 | 166 | 47 | 238 | 196.2 |
| 4 | 10:00 | 90 | 1220 | 1175 | 106 | | 497 | 122 | 60 | 204 | 129 | | | | | | | | | | |
| 4 | 12:00 | 120 | 1340 | 1250 | 150 | | 608 | 173 | 73 | 242 | 124 | | | | | | | | | | |
| 4 | 14:00 | 120 | 1460 | 1200 | 144 | | 598 | 166 | 70 | 224 | 119 | | | | | | | | | | |

Net Loadings

| Day | Time | Elapsed | Cum | Rate ml | Bed Volumes | Cum BV | | | | | | Loaded on Column 1 Ca | Mg | K | NH3 | Na | Loaded on Column 2 Ca | Mg | K | NH3 | Na |
|---|---|---|---|---|---|---|---|---|---|---|---|---|---|---|---|---|---|---|---|---|---|
| 1 | 12:00 | 25 | 25 | 1110 | 15 | 15 | | | | | | 133 | 27 | 13 | 47 | -276 | 0 | 0 | 0 | 0.2 | -6.03 |
| 1 | 14:00 | 120 | 145 | 1050 | 68 | 83 | | | | | | 359 | -21 | 58 | 188 | -816 | 246 | 124 | 0 | 13 | -411 |
| 1 | 16:00 | 120 | 265 | 1183 | 77 | 160 | | | | | | 135 | -23 | 62 | 195 | -593 | 447 | -70 | 11 | 53 | -463 |
| 2 | 10:00 | 75 | 340 | 1200 | 49 | 208 | | | | | | 54 | 0 | 35 | 131 | -290 | 198 | -30 | 9.2 | 45 | -270 |
| 2 | 12:00 | 120 | 460 | 1150 | 75 | 283 | | | | | | 0 | 0 | 49 | 106 | -228 | 138 | 0 | 28 | 143 | -450 |
| 2 | 14:00 | 120 | 580 | 1063 | 70 | 353 | | | | | | 0 | -21 | 43 | 102 | -141 | 32.5 | 0 | 33 | 157 | -396 |
| 2 | 16:00 | 120 | 700 | 1100 | 71 | 425 | | | | | | | | | | | 19.8 | 0 | 51 | 156 | -344 |
| 3 | 10:00 | 70 | 770 | 1150 | 44 | 468 | | | | | | | | | | | 4.02 | -13 | 29 | 68 | -147 |
| 3 | 12:00 | 120 | 890 | 1000 | 65 | 533 | | | | | | | | | | | -24 | 0 | 34 | 116 | -104 |
| 3 | 14:00 | 120 | 1010 | 1175 | 76 | 609 | | | | | | | | | | | -42.3 | 0 | 32 | 41 | -55.2 |
| 3 | 16:00 | 120 | 1130 | 1175 | 76 | 685 | | | | | | | | | | | -42.3 | 0 | 32 | 28 | -30.7 |
| 4 | 10:00 | 90 | 1220 | 1175 | 57 | 743 | | | | | | | | | | | | | | | |
| 4 | 12:00 | 120 | 1340 | 1250 | 81 | 824 | | | | | | | | | | | | | | | |
| 4 | 14:00 | 120 | 1460 | 1200 | 78 | 902 | | | | | | | | | | | | | | | |

Cumulative Loadings

| Day | Time | Elapsed | Cum | Rate ml | Bed Volumes | Cum BV | | | | | | Column 1 Ca | Mg | K | NH3 | Na | Column 2 Ca | Mg | K | NH3 | Na |
|---|---|---|---|---|---|---|---|---|---|---|---|---|---|---|---|---|---|---|---|---|---|
| 1 | 12:00 | 25 | 25 | 1110 | 15 | 15 | | | | | | 133 | 27 | 13 | 47 | -276 | 0 | 0 | 0 | 0.2 | -6 |
| 1 | 14:00 | 120 | 145 | 1050 | 68 | 83 | | | | | | 492 | 6.7 | 71 | 234 | -1093 | 246 | 124 | 0 | 14 | -417 |
| 1 | 16:00 | 120 | 265 | 1183 | 77 | 160 | | | | | | 627 | -17 | 133 | 429 | -1685 | 693 | 54 | 11 | 67 | -880 |
| 2 | 10:00 | 75 | 340 | 1200 | 49 | 208 | | | | | | 681 | -17 | 167 | 560 | -1975 | 891 | 25 | 20 | 112 | -1150 |
| 2 | 12:00 | 120 | 460 | 1150 | 75 | 283 | | | | | | 681 | -17 | 216 | 666 | -2203 | 1029 | 25 | 48 | 255 | -1600 |
| 2 | 14:00 | 120 | 580 | 1063 | 70 | 353 | | | | | | 681 | -38 | 260 | 769 | -2344 | 1061 | 25 | 82 | 412 | -1995 |
| 2 | 16:00 | 120 | 700 | 1100 | 71 | 425 | | | | | | 681 | -38 | 260 | 769 | -2344 | 1081 | 25 | 132 | 568 | -2340 |
| 3 | 10:00 | 70 | 770 | 1150 | 44 | 468 | | | | | | | | | | | 1085 | 11 | 161 | 636 | -2487 |
| 3 | 12:00 | 120 | 890 | 1000 | 65 | 533 | | | | | | | | | | | 1061 | 11 | 195 | 752 | -2591 |
| 3 | 14:00 | 120 | 1010 | 1175 | 76 | 609 | | | | | | | | | | | 1019 | 11 | 227 | 793 | -2646 |
| 3 | 16:00 | 120 | 1130 | 1175 | 76 | 685 | | | | | | | | | | | 977 | 11 | 260 | 822 | -2677 |
| 4 | 10:00 | 90 | 1220 | 1175 | 57 | 743 | | | | | | | | | | | | | | | |
| 4 | 12:00 | 120 | 1340 | 1250 | 81 | 824 | | | | | | | | | | | | | | | |
| 4 | 14:00 | 120 | 1460 | 1200 | 78 | 902 | | | | | | | | | | | | | | | |

FIG. 7A

| Day | Time | Column 3 ||||| Column 4 ||||| Column 5 ||||| Column 1 regenerated |||||
|---|---|---|---|---|---|---|---|---|---|---|---|---|---|---|---|---|---|---|---|---|---|
| | | Ca | Mg | K | NH3 | Na | Ca | Mg | K | NH3 | Na | Ca | Mg | K | NH3 | Na | Ca | Mg | K | NH3 | Na |
| 1 | 11:35 | | | | | | | | | | | | | | | | | | | | |
| 1 | 12:00 | 1 | 2 | 1 | 0.0 | 255 | 1 | 2 | 1 | 0.0 | 245 | | | | | | | | | | |
| 1 | 14:00 | 1 | 2 | 1 | 0.1 | 245 | 1 | 2 | 1 | 0.0 | 225 | | | | | | | | | | |
| 1 | 16:00 | 1 | 2 | 1 | 0.2 | 255 | 1 | 2 | 1 | 0.0 | 255 | | | | | | | | | | |
| 2 | 10:00 | 3 | 14 | 1 | 0.1 | 220 | 1 | 2 | 1 | 0.0 | 260 | | | | | | | | | | |
| 2 | 12:00 | 32 | 22 | 1 | 0.0 | 180 | 2 | 24 | 1 | 0.0 | 210 | | | | | | | | | | |
| 2 | 14:00 | 75 | 22 | 1 | 0.3 | 165 | 16 | 24 | 1 | 0.0 | 215 | | | | | | | | | | |
| 2 | 16:00 | 68 | 14 | 1 | 0.5 | 125 | 35 | 16 | 1 | 0.0 | 165 | | | | | | | | | | |
| 3 | 10:00 | 66 | 14 | 1 | 0.7 | 115 | 36 | 14 | 1 | 0.0 | 145 | 1 | 2 | 1 | 0.0 | 240 | | | | | |
| 3 | 12:00 | 76 | 14 | 2 | 2.7 | 100 | 54 | 14 | 1 | 0.1 | 135 | 12 | 18 | 1 | 0.0 | 180 | | | | | |
| 3 | 14:00 | 89 | 14 | 4 | 9.1 | 79 | 76 | 14 | 1 | 0.4 | 110 | 46 | 16 | 1 | 0.0 | 145 | | | | | |
| 3 | 16:00 | 99 | 16 | 13 | 13 | 32 | 92 | 16 | 1 | 1.3 | 97 | 71 | 16 | 1 | 0.1 | 125 | | | | | |
| 4 | 10:00 | 81 | 14 | 6 | 11 | 80 | 71 | 14 | 2 | 1.1 | 130 | 30 | 8 | 2 | 0.0 | 200 | 1 | 2 | 2 | 0.1 | 290 |
| 4 | 12:00 | 84 | 14 | 9 | 18 | 38 | 80 | 14 | 3 | 3.2 | 73 | 64 | 14 | 1 | 0.2 | 105 | 17 | 20 | 1 | 0.1 | 165 |
| 4 | 14:00 | 86 | 14 | 10 | 23.0 | 27 | 89 | 14 | 4 | 7.5 | 57 | 40 | 18 | 1 | 0.5 | 135 | 40 | 18 | 1 | 0.1 | 135 |
| | | meq discharge Col 3 ||||| meq discharge Col 4 ||||| meq discharge Col 5 ||||| meq discharge Col 1 (reg) |||||
| 1 | 12:00 | 1.39 | 4.6 | 0.7 | 0 | 308 | 1.39 | 4.6 | 0.7 | 0 | 295.6 | | | | | | | | | | |
| 1 | 14:00 | 6.3 | 21 | 3.2 | 0.7 | 1342 | 6.3 | 21 | 3.2 | 0 | 1233 | | | | | | | | | | |
| 1 | 16:00 | 7.1 | 23 | 3.6 | 1.7 | 1574 | 7.1 | 23 | 3.6 | 0 | 1574 | | | | | | | | | | |
| 2 | 10:00 | 13.5 | 104 | 2.3 | 0.5 | 861 | 4.5 | 15 | 2.3 | 0 | 1017 | | | | | | | | | | |
| 2 | 12:00 | 221 | 250 | 3.5 | 0 | 1080 | 13.8 | 273 | 3.5 | 0 | 1260 | | | | | | | | | | |
| 2 | 14:00 | 487 | 235 | 3.3 | 2.3 | 932 | 104 | 257 | 3.3 | 0 | 1215 | | | | | | | | | | |
| 2 | 16:00 | 449 | 152 | 3.4 | 3.9 | 717 | 231 | 174 | 3.4 | 0 | 947 | | | | | | | | | | |
| 3 | 10:00 | 266 | 93 | 2.1 | 3.3 | 403 | 145 | 93 | 2.1 | 0 | 507.5 | 4.03 | 13 | 2.1 | 0 | 840 | | | | | |
| 3 | 12:00 | 456 | 138 | 6.1 | 19 | 522 | 324 | 138 | 3.1 | 0.7 | 704.3 | 72 | 178 | 3.1 | 0 | 939.1 | | | | | |
| 3 | 14:00 | 627 | 162 | 14 | 75 | 484 | 536 | 162 | 3.6 | 3.3 | 674.3 | 324 | 186 | 3.6 | 0 | 888.9 | | | | | |
| 3 | 16:00 | 698 | 186 | 47 | 105 | 196 | 649 | 186 | 3.6 | 11 | 594.7 | 501 | 186 | 3.6 | 0.8 | 766.3 | | | | | |
| 4 | 10:00 | 428 | 122 | 16 | 70 | 368 | 375 | 122 | 5.4 | 6.8 | 597.7 | 159 | 70 | 5.4 | 0 | 919.6 | 5.3 | 17 | 5.4 | 0.6 | 1333 |
| 4 | 12:00 | 630 | 173 | 35 | 160 | 248 | 600 | 173 | 12 | 28 | 476.1 | 480 | 173 | 3.8 | 1.8 | 684.8 | 128 | 247 | 3.8 | 0.9 | 1076 |
| 4 | 14:00 | 619 | 166 | 37 | 195 | 169 | 641 | 166 | 15 | 64 | 356.9 | 288 | 213 | 3.7 | 4.2 | 845.2 | 288 | 213 | 3.7 | 0.8 | 845 |
| | | Loaded on Column 3 ||||| Loaded on Column 4 ||||| Loaded on Column 5 ||||| Loaded on Column 1 regen |||||
| 1 | 12:00 | 0 | 0 | 0 | 0 | -6.03 | 0 | 0 | 0 | 0 | 12.07 | | | | | | | | | | |
| 1 | 14:00 | 0 | 0 | 0 | 0 | -27.4 | 0 | 0 | 0 | 0.7 | 109.6 | | | | | | | | | | |
| 1 | 16:00 | 121 | 210 | 0 | 0.8 | -432 | 0 | 0 | 0 | 1.7 | 0 | | | | | | | | | | |
| 2 | 10:00 | 131 | 30 | 0 | 1.1 | -215 | 9 | 89 | 0 | 0.5 | -157 | | | | | | | | | | |
| 2 | 12:00 | 331 | -68 | 0 | 14 | -270 | 207 | -23 | 0 | 0 | -180 | | | | | | | | | | |
| 2 | 14:00 | 195 | -43 | 6.6 | 42 | -283 | 383 | -21 | 0 | 2.3 | -283 | | | | | | | | | | |
| 2 | 16:00 | 125 | 0 | 10 | 64 | -253 | 218 | -22 | 0 | 3.9 | -230 | | | | | | | | | | |
| 3 | 10:00 | 76.5 | 0 | 10 | 57 | -165 | 121 | 0 | 0 | 3.3 | -105 | 141 | 80 | 0 | 0 | -333 | | | | | |
| 3 | 12:00 | 66 | 0 | 21 | 116 | -277 | 132 | 0 | 3.1 | 18 | -183 | 252 | -40 | 0 | 0.7 | -235 | | | | | |
| 3 | 14:00 | 7.05 | 0 | 25 | 120 | -270 | 91.7 | 0 | 11 | 72 | -190 | 212 | -23 | 0 | 3.3 | -215 | | | | | |
| 3 | 16:00 | -14 | 0 | 0 | 133 | 0 | 49.4 | 0 | 43 | 95 | -398 | 148 | 0 | 0 | 10 | -172 | | | | | |
| 4 | 10:00 | 68.9 | 0 | 43 | 134 | -239 | 62.9 | 0 | 11 | 63 | -230 | 217 | 52 | 0 | 6.8 | -322 | 153 | 52 | 0 | -0.6 | -414 |
| 4 | 12:00 | -23 | 0 | 38 | 82 | -124 | 30 | 0 | 23 | 131 | -228 | 120 | 0 | 7.7 | 26 | -209 | 353 | -74 | 0 | 0.9 | -391 |
| 4 | 14:00 | -22 | 0 | 33 | 29 | -50.1 | -22 | 0 | 22 | 131 | -188 | 353 | -47 | 11 | 59 | -488 | 0 | 0 | 0 | 3.4 | 0 |
| | | Column 3 ||||| Column 4 ||||| Column 5 ||||| Column 1 regenerated |||||
| | | Ca | Mg | K | NH3 | Na | Ca | Mg | K | NH3 | Na | Ca | Mg | K | NH3 | Na | Ca | Mg | K | NH3 | Na |
| 1 | 12:00 | 0 | 0 | 0 | 0 | -6.03 | 0 | 0 | 0 | 0 | 12.07 | | | | | | | | | | |
| 1 | 14:00 | 0 | 0 | 0 | 0 | -33.4 | 0 | 0 | 0 | 0.7 | 121.6 | | | | | | | | | | |
| 1 | 16:00 | 121 | 210 | 0 | 0.8 | -465 | 0 | 0 | 0 | 2.4 | 121.6 | | | | | | | | | | |
| 2 | 10:00 | 251 | 240 | 0 | 1.9 | -681 | 9 | 89 | 0 | 2.9 | -34.9 | | | | | | | | | | |
| 2 | 12:00 | 582 | 172 | 0 | 16 | -951 | 216 | 66 | 0 | 2.9 | -215 | | | | | | | | | | |
| 2 | 14:00 | 777 | 129 | 6.6 | 58 | -1233 | 599 | 45 | 0 | 5.2 | -497 | | | | | | | | | | |
| 2 | 16:00 | 903 | 129 | 17 | 122 | -1486 | 817 | 23 | 0 | 9.1 | -727 | | | | | | | | | | |
| 3 | 10:00 | 979 | 129 | 27 | 179 | -1650 | 938 | 23 | 0 | 12 | -832 | 141 | 80 | 0 | 0 | -333 | | | | | |
| 3 | 12:00 | 1045 | 129 | 49 | 296 | -1927 | 1070 | 23 | 3.1 | 31 | -1015 | 393 | 40 | 0 | 0.7 | -567 | | | | | |
| 3 | 14:00 | 1052 | 129 | 74 | 416 | -2196 | 1162 | 23 | 14 | 103 | -1205 | 604 | 17 | 0 | 4 | -782 | | | | | |
| 3 | 16:00 | 1038 | 129 | 74 | 549 | -2196 | 1211 | 23 | 57 | 197 | -1603 | 752 | 17 | 0 | 14 | -954 | | | | | |
| 4 | 10:00 | 1107 | 129 | 117 | 683 | -2436 | 1264 | 23 | 68 | 260 | -1833 | 969 | 69 | 0 | 21 | -1275 | 153 | 52 | 0 | -0.6 | -414 |
| 4 | 12:00 | 1084 | 129 | 155 | 765 | -2559 | 1294 | 23 | 91 | 392 | -2061 | 1089 | 69 | 7.7 | 47 | -1484 | 506 | -22 | 0 | 0.3 | -805 |
| 4 | 14:00 | 1063 | 129 | 189 | 794 | -2610 | 1272 | 23 | 113 | 523 | -2249 | 1442 | 22 | 19 | 107 | -1972 | 506 | -22 | 0 | 3.6 | -805 |

FIG. 7B

| Cum | Column 1 | | | | | | |
|---|---|---|---|---|---|---|---|
| BV | Ca | Mg | K | NH3 | Na | | Ca= |
| 15 | 133.2 | 27.40741 | 12.77494 | 46.68529 | -276.2935 | | 0 |
| 83 | 492.3 | 6.666667 | 70.78005 | 234.2029 | -1092.554 | | 245.7 |
| 160 | 627.162 | -16.70123 | 132.5018 | 428.7716 | -1685.083 | | 692.874 |
| 208 | 681.162 | -16.70123 | 167.0286 | 560.0658 | -1974.648 | | 890.874 |
| 283 | 681.162 | -16.70123 | 216.4404 | 666.4069 | -2202.648 | | 1028.874 |
| 353 | 681.162 | -38.09383 | 259.6496 | 768.846 | -2343.909 | | 1061.364 |
| 425 | 681.162 | -38.09383 | 259.6496 | 768.846 | -2343.909 | | 1081.164 |
| 468 | | | | | | | 1085.189 |
| 533 | | | | | | | 1061.189 |
| 609 | | | | | | | 1018.889 |
| 685 | | | | | | | 976.569 |
| 743 | | | | | | | |
| 824 | | | | | | | |
| 902 | | | | | | | |
| | Ca | Mg | K | NH3 | Na | | |
| 15 | 0.073 | 0.015 | 0.007 | 0.026 | -0.152 | | |
| 83 | 0.271 | 0.004 | 0.039 | 0.129 | -0.602 | | |
| 160 | 0.345 | -0.009 | 0.073 | 0.236 | -0.928 | | |
| 208 | 0.375 | -0.009 | 0.092 | 0.308 | -1.087 | | |
| 283 | 0.375 | -0.009 | 0.119 | 0.367 | -1.213 | | |
| 353 | 0.375 | -0.021 | 0.143 | 0.423 | -1.291 | | |
| 425 | 0.375 | -0.021 | 0.143 | 0.423 | -1.291 | | |

| Na | | | | | | | | |
|---|---|---|---|---|---|---|---|---|
| −413.8043 | | | | | | | | |
| −805.1087 | | | | | | | | |
| −805.1087 | | | | | | | | |
| Ca | Mg | K | NH3 | Na | | | | |
| 0.000 | 0.000 | 0.000 | 0.000 | 0.000 | | | | 15 |
| 0.000 | 0.000 | 0.000 | 0.000 | 0.000 | | | | 83 |
| 0.000 | 0.000 | 0.000 | 0.000 | 0.000 | | | | 160 |
| 0.000 | 0.000 | 0.000 | 0.000 | 0.000 | | | | 208 |
| 0.000 | 0.000 | 0.000 | 0.000 | 0.000 | | | | 283 |
| 0.000 | 0.000 | 0.000 | 0.000 | 0.000 | | | | 353 |
| 0.000 | 0.000 | 0.000 | 0.000 | 0.000 | | | | 425 |
| 0.078 | 0.044 | 0.000 | 0.000 | −0.183 | | | | 468 |
| 0.216 | 0.022 | 0.000 | 0.000 | −0.312 | | | | 533 |
| 0.333 | 0.009 | 0.000 | 0.002 | −0.431 | | | | 609 |
| 0.414 | 0.009 | 0.000 | 0.008 | −0.525 | | | | 685 |
| 0.534 | 0.038 | 0.000 | 0.011 | −0.702 | | | | 743 |
| 0.600 | 0.038 | 0.004 | 0.026 | −0.817 | | | | 824 |
| 0.794 | 0.012 | 0.010 | 0.059 | −1.086 | | | | 902 |

APPARATUS FOR REMOVAL AND DESTRUCTION OF AMMONIA FROM AN AQUEOUS MEDIUM

CROSS REFERENCE TO RELATED APPLICATIONS

The present non-provisional patent application claims priority to U.S. Provisional Application Ser. No. 60/325,141, filed on Sep. 26, 2001, entitled METHODS AND APPARATUS FOR REMOVAL AND DESTRUCTION OF AMMONIA FROM AN AQUEOUS MEDIUM USING ZEOLITES, which is herein incorporated by reference.

FIELD OF THE INVENTION

The invention generally relates to the removal and destruction of ammonia from aqueous media. More specifically, the invention provides systems, methods and apparatuses for the effective removal of ammonia from water as it is treated in a water treatment facility, and in particular, to systems, methods and apparatuses for the removal and destruction of ammonia from drinking water by contacting the water with zeolite materials.

BACKGROUND OF THE INVENTION

Cities and towns throughout the world depend on having clean potable water supplies. The dependence on clean water has increased as the population of the world has increased, especially as industrial use of rivers and lakes have become commonplace.

The explosion of world population, and corresponding increase in fresh water use, has resulted in a need to maximize water usage. However, the ability to maximize fresh water use has been limited by, (1) increased pollution of the fresh water supplies due to higher industrial output throughout the world (a direct result of the increased population); and (2) increased knowledge and standards for what constitutes clean water, acceptable for use in farming, industry, and consumption. As a result, there is a current need to increase the efficiency in the use of water, i.e., conserve existing clean water supplies, increase the current capabilities used to remove pollutants from water supplies, and increase the effectiveness of existing technologies and develop new technologies to effectively treat and reach new standards in water quality.

In this light, ammonia contamination of water resources has proven to be extremely problematic. High levels of ammonia commonly occur in wastewater, and occasionally drinking water, as a result of well contamination by industrial and agricultural processes. Presently, there is a trend to lower the ammonia discharge limits for facilities toward a range of 2 to 4 parts per million (ppm) from a previous ranges of 10 to 15 ppm.

Conventional ammonia removal technology has focused on additional aeration at wastewater treatment plant lagoons. In general, this remedy has proven ineffective. In contrast, a number of new technologies, focused on other wastewater related problems, have had the side-effect of lowering ammonia discharges. For example, activated sludge wastewater plants are being constructed to eliminate a full range of biological contaminants and have the added benefit of decreased ammonia discharges to 2 ppm or less. These plants however are expensive and not required in areas where the only problem is high ammonia levels. Further, technologies such as Sequence Batch Reactors (SBR's), Rotating Biological Filters (RBF's), and Trickle Filters are also used to solve non-ammonia related wastewater cleanup problems, but ammonia reduction seems to be an added benefit. However, these newer technological options require entirely new facilities or expensive rebuilds at existing facilities. This is an appropriate response where a wastewater problem is significant and requires a fairly drastic improvement. However, facilities with efficiently operating wastewater plants need options that are relatively inexpensive, compared to rebuilding the entire facility, and focused on lowering the ammonia discharge levels, not on other, typically more expensive, cleanup problems. Against this backdrop the present invention has been developed.

BRIEF SUMMARY OF THE INVENTION

The present invention provides systems, methods and apparatuses for the removal and destruction of ammonia from an aqueous medium using zeolite materials. The zeolite materials of the present invention absorb ammonia at levels sufficient to comply with discharge limits set by the EPA. Spent zeolite is re-freshed and re-used, where the ammonia on the zeolite is stripped and concentrated as an ammonium salt. Stored ammonium salts are used in the manufacture of fertilizers, or simply converted to a form for combustion, and release as nitrogen into the atmosphere.

The present invention also provides methods and apparatus for operating an ammonia removal and destruction facility, in accordance with the present invention, from an off-site location. The system includes providing a pre-determined amount of zeolite for removal of ammonia from the target water source, providing and maintaining the required chemical compounds for the storage or destruction of the ammonia, and operation and maintenance of a combustion unit for conversion of the ammonium to a nitrogen containing gas for release into the atmosphere.

These and various other features as well as advantages which characterize the invention will be apparent from a reading of the following detailed description and a review of the appended claims.

BRIEF DESCRIPTION OF THE DRAWINGS

FIGS. 5A, A2, B, B2, C1 and C2 provide a theoretical mass balance calculation for the schematic shown in FIG. 4.

FIGS. 7A–H illustrate tabular and graphical data involved in a five column run in accordance with an embodiment of the present invention.

Figure 8A:
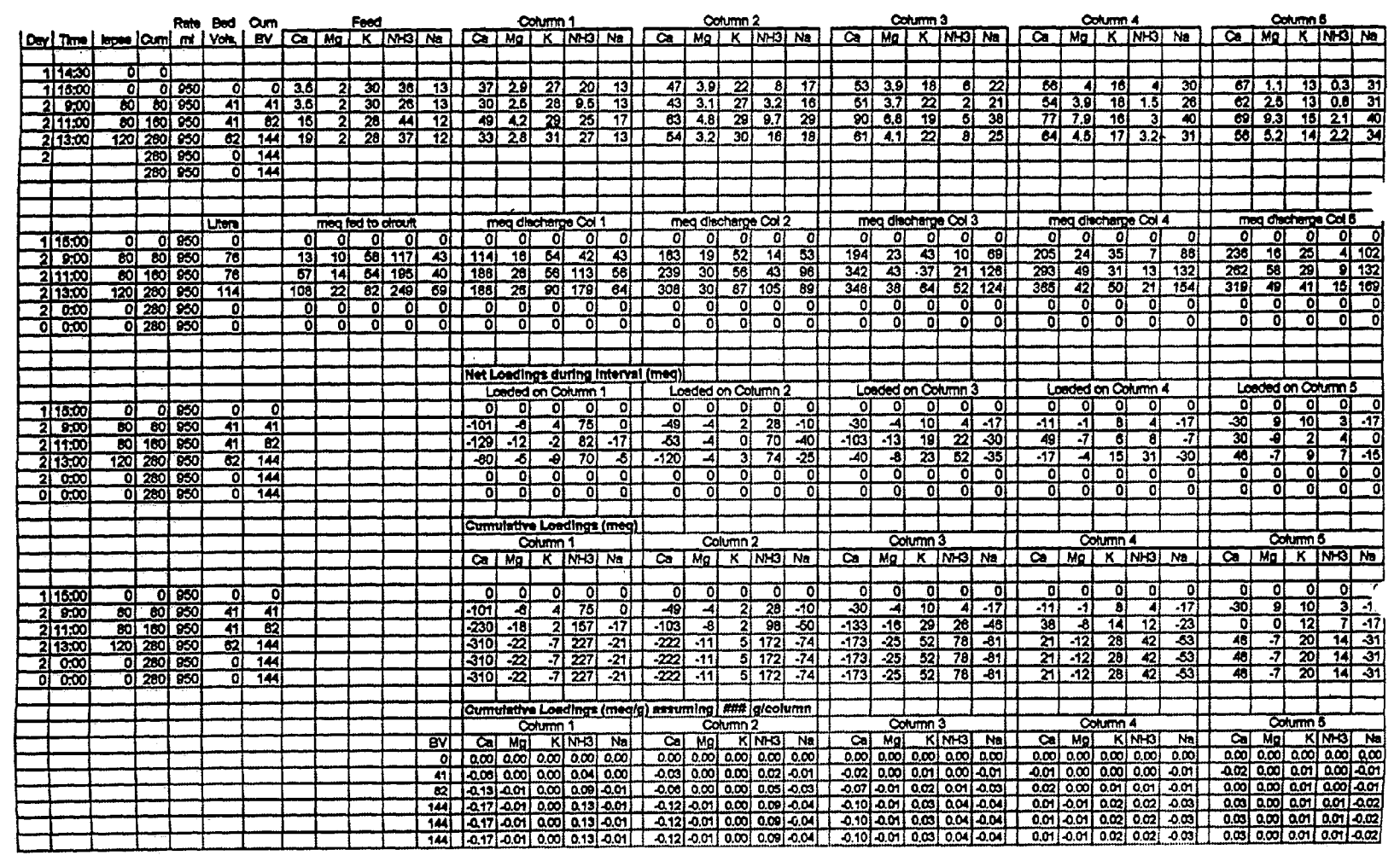

FIGS. 8A–F illustrate tabular and graphical data involved in another five column run in accordance with an embodiment of the present invention.

Figure 9A:
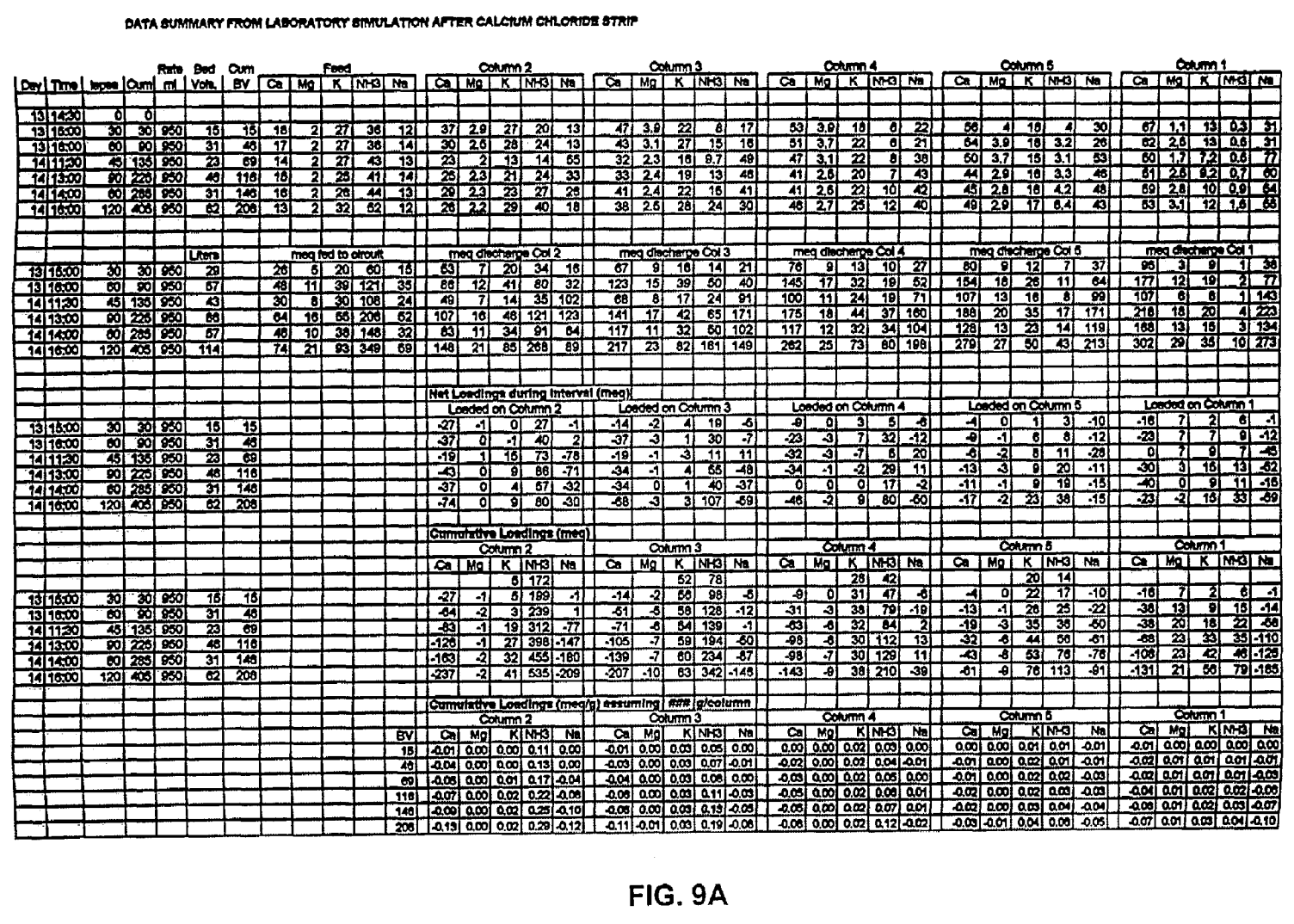

FIGS. 9A–F illustrate tabular and graphical data involved in another five column run in accordance with an embodiment of the present invention.

Figure 10A:
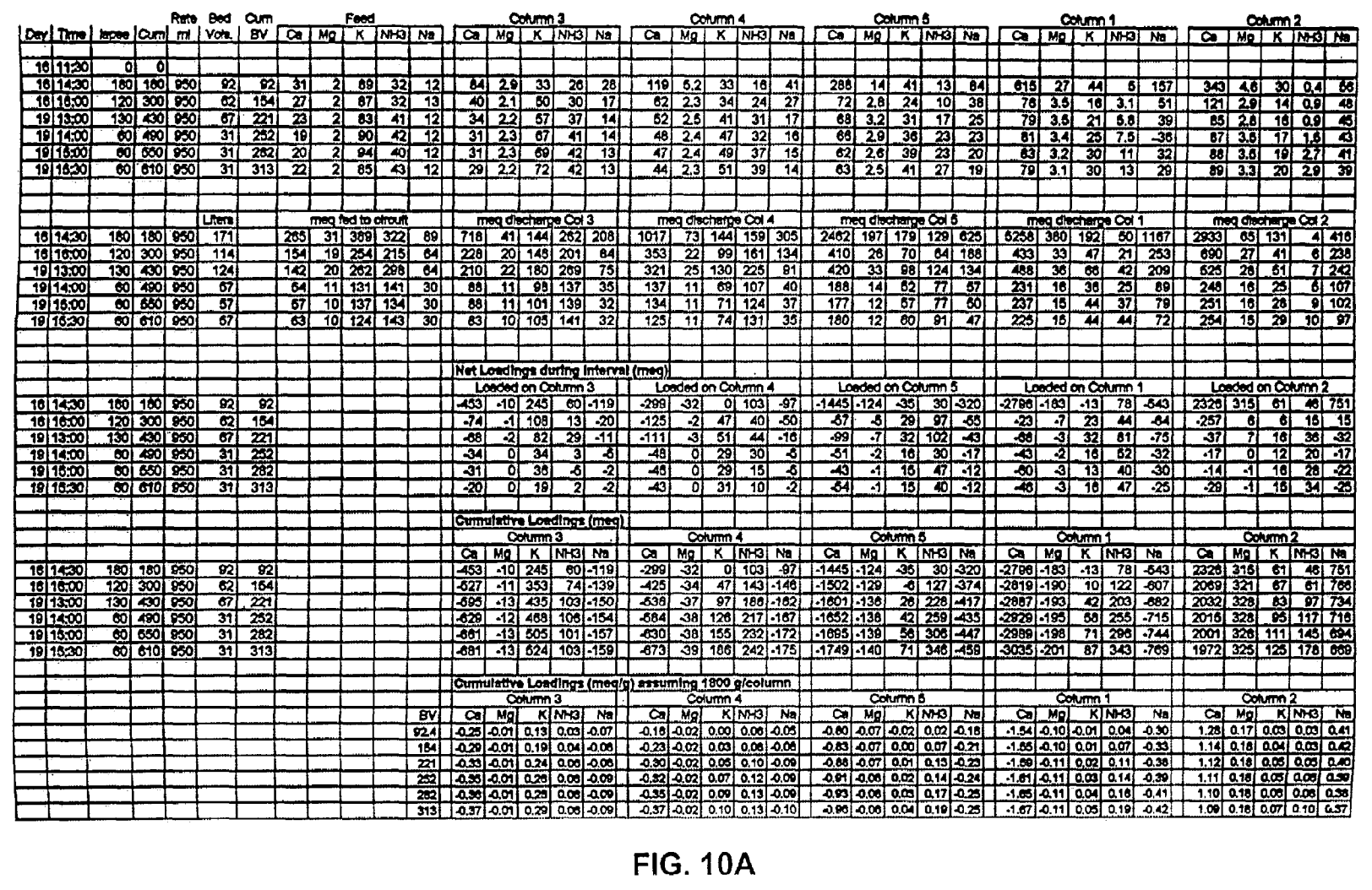

FIGS. 10A–F illustrate tabular and graphical data involved in another five column run in accordance with an embodiment of the present invention.

DETAILED DESCRIPTION OF THE INVENTION

Figure 1:
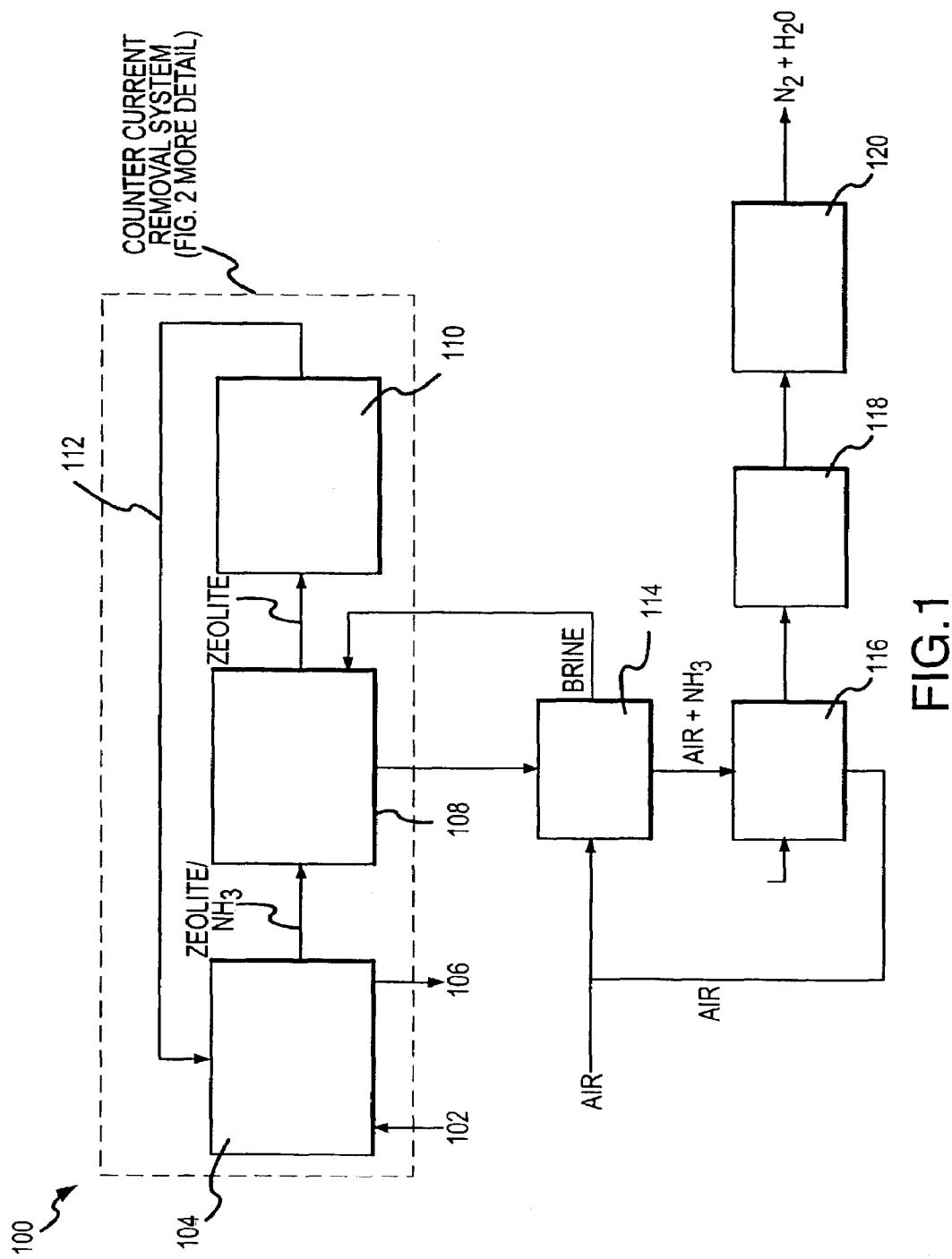
FIG. 1 illustrates a schematic for the removal and destruction of ammonia in accordance with an embodiment of the present invention.

Definitions:

The following definitions are provided to facilitate understanding of certain terms used frequently herein and are not meant to limit the scope of the present disclosure.

"Aqueous medium" refers to water or any liquid made from, with, or by water.

"Feed" refers to an aqueous medium before treatment with the systems and methods of the present invention, for example, a flowing water source before it enters a wastewater treatment facility.

"Zeolite" refers to a natural and/or synthetic zeolite. Natural zeolites are hydrated silicates of aluminum and either sodium or calcium or both, for example clinoptilolite and chabazite. Synthetic zeolites are made by a number of well known processes, for example gel or clay processes, which form a matrix to which the zeolite is added. Example synthetic zeolites include Linde® AW-30 and Zeolon® 900.

"bed volume" for a particular housing member refers to the volume of zeolite in the housing member. The term bed volume, for purposes of the present invention, also refers to the retention volume and/or specific retention volume. Note that bed volume has units of liters, cubic meters, or cubic feet.

"Remove" refers to the detectable decrease of a target material, for example ammonia, from a source, for example ground water. Typically removal of arsenic from an aqueous source is at least 50%, preferably at least 75% and most preferably at least 90%, from the original levels in the zeolite treated source.

"Absorb" and "adsorb" refer to the same basic principle of one substance being retained by another substance. The processes can include attraction of one substance to the surface of another substance or the penetration of one substance into the inner structure of another substance. The present invention contemplates that zeolite can either absorb and/or adsorb ammonia from an aqueous medium and that for purposes of the present invention, that the two principles be interchangeable. Other terms used to describe this interaction include binding or trapping, each of which contemplates absorption and/or adsorption. As used in the present invention, the term absorb refers to any or all of adsorb, trap, bind, and the like.

Zeolite:

Zeolites, in accordance with the present invention, effectively absorb, adsorb, bind and/or trap ammonia in an aqueous media, and thereby remove it from the aqueous media. Compositionally, zeolites are similar to clay minerals, where zeolites are natural hydrated silicates of aluminum and either sodium or calcium or both. Unlike clays, which have a layered crystalline structure (similar to a deck of cards that is subject to shrinking and swelling as water is absorbed), zeolites have a rigid three-dimensional crystalline structure. Zeolites' rigid honeycomb-like crystalline structure consists of a network of interconnected tunnels and cages, thereby forming a series of substantially uniformly sized pores. Aqueous media moves freely in and out of the pores formed by the crystalline structure, making zeolite an excellent sieving or filtration type material, as well as providing a large surface area for binding ammonia within the target aqueous medium. Zeolite is host to water molecules and ions or potassium, sodium, and calcium, as well as a variety of other positively charged ions, but only those of appropriate molecular size fit into the pores, creating the "sieving" property.

There are approximately fifty different types of natural zeolites, including clinoptilolite, chabazite, phillipsite, mordenite, analcite, heulandite, stilbite, thomosonite, brewsterite, wellsite, harmotome, leonhardite, eschellite, erionite, epidesmine, and the like. Differences between the different zeolites include particle density, cation selectivity, molecular pore size, and cation affinity. For example, clinoptilolite, the most common natural zeolite, has 16% more void volume and pores as much as 0.2 nm larger than analcime, another common zeolite.

Preferable natural zeolites for use in the present invention include any zeolite having an exchange capacity with sufficient capacity to lower the ammonia concentration in an aqueous medium from a first level to a second level. Preferable zeolites for use in the present invention have a capacity for ammonia of at least 1 meq/gram, although other lower capacity zeolites are envisioned to be within the scope of the present invention. In addition, zeolites having particle sizes from 10×60 mesh and preferably 20×40 mesh are useful in the present invention. Zeolite fines are typically removed before use in the present invention to prevent plugging in the tanks of the present invention (see below). Preferable natural zeolites for use in the present invention include clinoptilolite.

Table 1 provides a list of companies that presently produce zeolite minerals in either the United States or Canada. Table 1 provides a chemical analysis of the zeolite materials sold by a number of companies, and provides the physical properties of the corresponding zeolite materials. This Table is provided as illustrative of the type of zeolite material that can be purchased for large scale use.

TABLE 1

| | | Chemical Analysis (Expressed in Weight %) | | | | | | | |
|---|---|---|---|---|---|---|---|---|---|
| Company | Location | $Na_2O$ | $K_2O$ | CaO | MgO | $SiO_2$ | $Al_2O_3$ | $TiO_2$ | $Fe_2O_3$ |
| Addwest Minerals | WY | 4.7 | 1.9 | 1.6 | 0.65 | 74.0 | 14.0 | 0.1 | 2.1 |
| American Research | NV/CA | 3.5 | 3.8 | 0.7 | 0.4 | 69.1 | 11.9 | — | 0.74 |
| Am. Absorbents | OR | 0.8 | 3.8 | 0.7 | 0.4 | 69.1 | 11.9 | 0.2 | 0.7 |
| Stellhead Res. | CA/NM/OR | 0.8 | 3.8 | 0.7 | 0.4 | 69.1 | 11.9 | 0.2 | 0.4 |
| Teague Minerals | OR | 0.9 | 4.7 | 1.4 | 0.3 | 64.1 | 11.8 | 0.3 | 2.58 |
| Zeotech | TX | 0.6 | 1.7 | 2.4 | 0.7 | 68.4 | 12.1 | NK | NK |
| St. Cloud Mining | NM | 0.9 | 3.3 | 3.3 | 1.0 | 64.7 | 12.6 | 0.2 | 1.8 |
| W-Way Zeolites | Canada | 2.5 | 2.7 | 3.4 | 1.3 | 65.8 | 14.3 | 0.3 | 2.6 |
| Highwood Res | Canada | 2.78 | 2.79 | 3.78 | 0.95 | 64.5 | 13.7 | 0.27 | 2.19 |
| C2C Mining | Canada | 1.35 | 1.57 | 2.51 | 1.55 | 66.8 | 11.2 | 0.6 | 5.2 |

TABLE 1-continued

| Company | Ionic Exch Cap (meq/g) | H$_2$O % Adsorption | Free Silica (%) | SG | Color | pH (nat.) | Pore Diam. (Å) | Hard. |
|---|---|---|---|---|---|---|---|---|
| Addwest Minerals | 2.00 | 14.0 | 2.00 | 1.5 | pale blue | | 4.4 | 3.7 |
| American Research | 1.85 | 12.3 | NK | NK | | | 4.0 | 5.1 |
| Am. Absorbents | 1.4 | | 1.50 | 2.3 | white | 8.0 | 4.0 | 3.8 |
| Stellhead Res. | 1.30 | | 0.09 | 1.6 | white | 8.0 | 4.0 | 5.1 |
| Teague Minerals | 1.77 | | low | 2.2 | off white | | not provided | not provided |
| Zeotech | | | | | | | | |
| St. Cloud Mining | 1.60 | | 0.01< | 2.3 | white | 8.0 | 4.0 | 3.8 |
| W-Way Zeolies | 1.00 | 25.0 | NK | 2.4 | off white/ pale green | 8.1 | 6.5 | NK |
| Highwood Res | 1.00 | | 10.0 | 2.0 | | 7.0 | | |
| C2C Mining | NK | NK | 5.00 | 2.3 | brown | 5.0 | NK | NK |

It is also envisioned that synthetic zeolites can be used in accordance with the present invention. Synthetic zeolites are made by well known processes, such as a gel process (sodium silicate and alumina) or clay process (kaolin), which form a matrix to which the zeolite is added. Preferable synthetic zeolites include Linde®AW-30, Linde®AW-500, Linde®4-A and Zeolon®900.

It is envisioned that the systems and methods of the present invention can utilize either natural, synthetic or a mixture of natural and synthetic zeolite in the removal of ammonia from aqueous medium.

Ammonia Removal from Aqueous Medium Using Zeolite

Ammonia Absorption:

The absorption of ammonia from an aqueous medium is effected by causing contact between the aqueous medium and zeolite. During the contact period, ammonia in the aqueous medium absorbs onto the zeolite and is effectively removed from the aqueous medium. The zeolite at this point is considered "loaded" with ammonia.

There are two series of chemical reactions believed to occur in the absorption of ammonia to the zeolite. The first series of reactions occurs when the fresh zeolite is initially loaded into an absorption column (see below). The second series of reactions occurs after the zeolite has been migrated through the absorption process, including the elution step. The initial reactions result from the fact that natural zeolite is loaded with sodium ions, the second series of reactions results from the addition of alkaline (basic) material to the system. The alkaline material can be calcium oxide, "calcium based," sodium hydroxide, "sodium-based," or potassium hydroxide, "potassium based." It is envisioned that other alkaline metals could be used in this context, for example, lithium, rubidium and cesium, but all are less preferable due to economic reasons. The two series of reactions are shown below with regard to a "calcium-based" system:

Initial Loading on Zeolite:

$$Ca^{++}+NaZeol \rightarrow 2Na^{+}+CaZeol$$

$$2NH_4^{+}+Na_2Zeol \rightarrow 2Na^{+}(NH_4)_2Zeol$$

$$2K^{+}+Na_2Zeol \rightarrow 2Na^{+}+K_2Zeol$$

Equilibrium Loading on Zeolite:

$$2NH_4^{+}+Ca_2Zeol \rightarrow Ca^{++}+(NH_4)_2Zeol$$

$$2K^{+}+Ca_2Zeol \rightarrow Ca^{++}+K_2Zeol$$

Ammonia Elution:

The ammonia, once loaded onto the zeolite, is passed from the absorption process to an elution unit process. The elution unit process (see below) functions to remove the ammonia absorbed to the zeolite. This is generally accomplished by contacting the loaded zeolite with a salt solution, or brine. The brine is typically composed of sodium, calcium, potassium, and/or magnesium ions in solution. The contact between the loaded zeolite and the brine causes ion displacement between the salt ions and the ammonia, thereby removing the ammonia from the zeolite and creating a "pregnant" brine solution relative to the concentration of ammonia. The chemical reactions of the elution step are illustrated below:

$$(NH_4)_2Zeol+Ca^{++} \rightarrow 2NH_4^{+}+Ca_2Zeol$$

$$K_2Zeol+Ca^{++} \rightarrow 2K^{+}Ca_2Zeol$$

The elution step is in effect the reversal of the reactions discussed with respect to the absorption step above and is driven by the high concentration of salt ions in the brine solution relative to the concentration of ammonia.

Ammonia Dissociation from Brine:

The pregnant brine is fed to an air stripping unit process where the ammonia is dissociated from the brine. Generally, the pH in the pregnant brine is increased to a range of approximately 10 to 11 prior to contact with the air to facilitate the stripping process. In a preferred embodiment of the present invention, the pH is increased by the addition of lime to the brine. The lime helps to dissociate the ammonia from the brine in the form of ammonium hydroxide.

In the air stripping process, contact between air bubbles and loaded brine cause the diffusion of the ammonia from the brine to the air in the form of ammonia gas. The ammonia dissociation reaction steps that occur in the air stripping process are as follows:

$$2NH_4^{+}+2Cl^{-}+CaO+H_2O \rightarrow CaCl_2+2NH_4OH$$

$$2NH_4OH \rightarrow 2NH_3+2H_2O$$

The air/ammonia mixture is then transferred to an air scrubbing step.

Acid Wash to form Ammonium Salt:

The air/ammonia mixture is treated with an acid wash to form an ammonium salt. Preferably, the air is treated with a sulfuric acid (H$_2$SO$_4$), or other like acid, wash via the following reaction:

$$2NH_3+H_2SO_4 \rightarrow (NH_4)_2SO_4$$

Note that the air can preferably be re-circulated in the air stripper.

Storage and Destruction of Ammonium Salt

The ammonium sulfate is passed to a storage tank, or to a re-circulation tank, for ultimate disposal. Ammonium sulfate, in one embodiment of the present invention, is removed from the storage tank and supplied for use in fertilizer and other commercial purpose. However, it has been determined that disposal through these uses can be of marginal economic advantage due to the relatively low concentration of the ammonium sulfate. As such, other embodiments of the present invention are envisioned for the disposal of the ammonium salt, preferably via the destruction of the ammonia through combustion.

Combustion of Ammonia:

The ammonium sulfate in the storage tank is mixed with a basic material, such as lime or other like agent, and passed to an air stripping unit similar to the one described above. The ammonium sulfate stream is reacted with lime to dissociate the ammonia in the form of ammonium hydroxide and facilitate air stripping. The ammonium hydroxide is then removed from the solution as ammonia gas by contacting the solution with a flow of air. The ammonia gas is passed to a combustion unit to be burned at a controlled temperature to avoid the production of $NO_x$ gases.

Typically, the combustion unit is heated by natural gas and includes various streams available to vary the composition of the ammonia gas mixture for ideal combustion. For example, where the concentration of the ammonia gas in air is too high, e.g., greater than 1.1% by weight ammonia in the gas stream, the ammonia gas stream is diluted with air. Where the concentration of the ammonia in the air is too low, e.g., less than 1.1% by weight ammonia in the gas stream, the ammonia gas stream is combined with a combustion gas supply to facilitate combustion (increasing the temperature of the stream).

If required, the combustion air supply can be a mixture of burner gas and air that is burned in a pre-burner prior to entering the combustion chamber of the present invention. The exhaust gas from the pre-burner is fed to the combustion unit to raise the temperature of the combustion step to the required level, i.e., the temperature required to combust the concentration of ammonia gas in the gas stream.

Preferably, the concentration of ammonium sulfate fed to the destruction process is in the range of about 20% to about 40% by volume. If the ammonium sulfate is not at this concentration, it is fed to a recirculation tank where the ammonium sulfate is re-circulated through the acid scrubbing process and bled in increments to the destruction process (when the appropriate concentration is reached). The following chemical reactions are believed to occur during the combustion unit process:

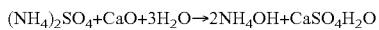
$(NH_4)_2SO_4 + CaO + 3H_2O \rightarrow 2NH_4OH + CaSO_4 H_2O$

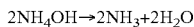
$2NH_4OH \rightarrow 2NH_3 + 2H_2O$

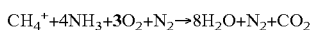
$CH_4^+ + 4NH_3 + 3O_2 + N_2 \rightarrow 8H_2O + N_2 + CO_2$

Zeolite Flow:

The zeolite for use in the present invention is input into the process at the ammonia absorption step. Typically an appropriate amount of zeolite is charged into a housing member(s), e.g., tank, column, etc, for contact with the aqueous medium. The zeolite is maintained within the absorption step and contacted with the aqueous medium for an amount of time sufficient to decrease the concentration of ammonia from a first level (in the feed of the aqueous medium) to a second level (in the discharge of the aqueous medium). In preferred embodiments the discharge level is less than the acceptable discharge limits for ammonia as set by the Environmental Protection Agency (EPA).

Loaded zeolite passes from the absorption step to the stripping unit process (see above), where the ammonia is eluted from the zeolite. The zeolite is passed from the elution process to a rinse unit where the zeolite is cleaned for re-circulation back to the absorption step. In the rinse step, the zeolite stream is fed to a rinse column where it is rinsed with water. Note that the rinse step can include a reverse osmosis unit where chemicals contained in the rinse stream, including calcium, chloride, sulfate, hydroxide, and carbonate are recovered. The recovery of these chemicals helps defray the overall operation costs, as the chemicals can be re-used. Note also that the reverse osmosis unit lowers the pH and total dissolved solids (TDS) content of the discharge stream.

Once refreshed/regenerated, the zeolite is pumped back to the absorption step and the absorption process repeated. It is believed that the zeolite can be re-used in this manner for an indefinite period of time. However, degradation of the zeolite does occur over time, and degraded zeolite is removed or purged from the system by passing it through with the discharge stream. As such, a fairly predictable amount of zeolite must be added to the absorption process to keep a fairly constant amount of zeolite in the system (typically equal to the amount of degraded zeolite purged from the system).

Embodiments of the present invention will now be described with reference to the following Figures.

FIG. 1 provides a process diagram or schematic 100 of ammonia removal and destruction in accordance with the present invention. Aqueous medium 102 is feed into the absorption step 104 (ion exchange). The ammonia is removed from the aqueous medium, which is discharged having a discharge level of ammonia 106. The ammonia loaded zeolite is next treated with brine in an elution step 108 to release ammonia. The zeolite is recovered in a rinse step 110 and cleaned for re-use in the absorption step (as shown by line 112). The ammonia/brine solution is treated with an air strip step 114 and an acid scrubbing step 116 as described above, for ultimate storage 118 and use, or storage/re-circulation to increase the ammonia concentration for ultimate destruction 120.

Figure 2:
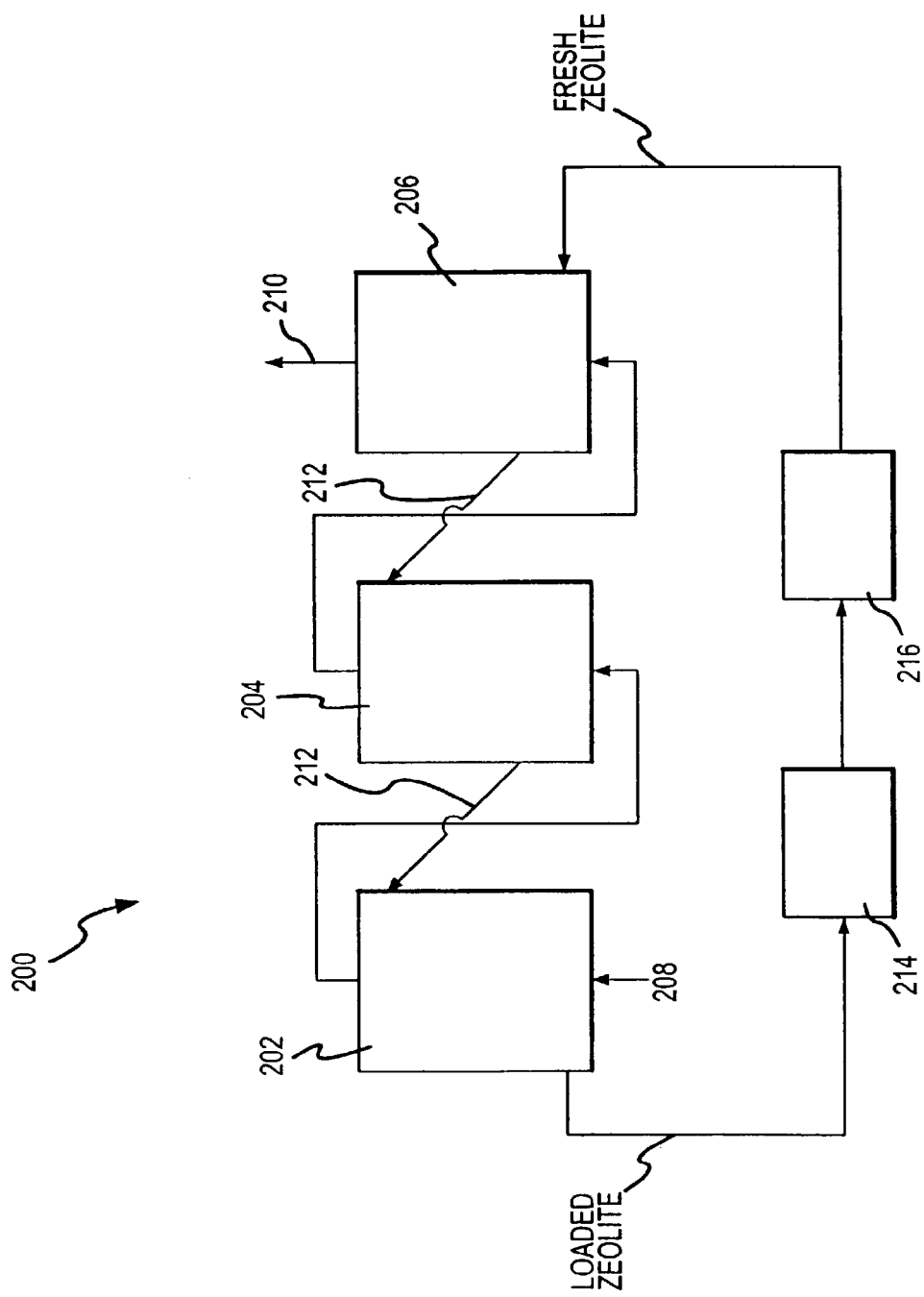
FIG. 2 illustrates a schematic for the ammonia absorption process in accordance with an embodiment of the present invention.

FIG. 2 is a schematic diagram 200 of an absorption unit process according to one embodiment of the present invention. In this embodiment, three absorption columns 202, 204, and 206 are provided for contact between the zeolite and aqueous medium. The aqueous medium 208 is fed up-flow through the first absorption column 202, into the second absorption column 204, and into a third absorption column 206, and then discharged from the system 210. The absorption columns can be operated as fixed bed, fluidized bed, or as stirred reactors. Most preferably, the columns are operated as fluidized bed.

The aqueous medium 208 is fed to the absorption tanks at a flow rate such that the zeolite (generally in the form of a slurry) is fluidized in the columns. For example, it has been determined that an aqueous medium having an up-flow rate of 10 gal/ft² is sufficient to fluidize a bed of zeolite comprising 20×40 mesh zeolite, resulting in between a 40% and 45% expansion of the zeolite. The up-flow configuration creating a fluidized bed is preferred because there is a decreased likelihood of bio-fouling of the columns, the equipment tends not to short-circuit as often, and the configuration allows the degraded zeolite to be discharged from the system with the aqueous medium.

Figure 4:
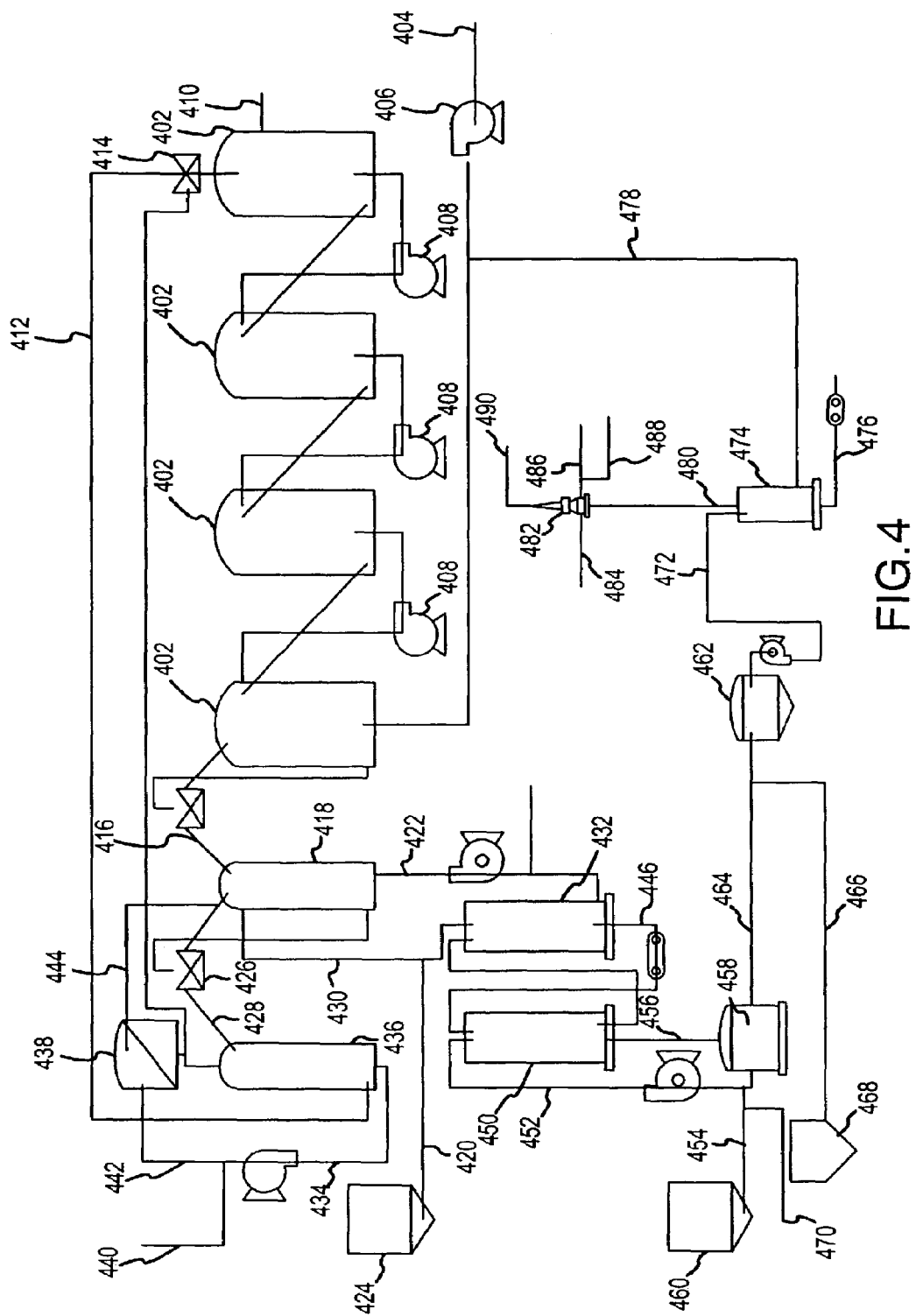
FIG. 4 illustrates a schematic of the overall removal and destruction of ammonia in accordance with an embodiment of the present invention.

In one particular embodiment of the present invention, the zeolite is migrated through the absorption process in a counter-current flow configuration 212 (see FIGS. 2 and 4). Here the aqueous medium with the strongest concentration of ammonia contacts zeolite that is already partially loaded, and fresh or stripped zeolite contacts the aqueous medium at a point where the concentration of ammonia is decreased. The configuration creates favorable conditions for obtaining a low ammonia content in the discharge and efficient loading of the ammonia on the zeolite.

Referring again to FIG. 2, the zeolite is passed from an elution step 214 to a rinse step 216, where the zeolite is rinsed clean with water or other like solution. The migration of the zeolite is accomplished through methods such as air-lifting or by positive displacement pumps. Air lifts are generally known technology which use compressed air to raise the zeolite in the absorption column by introducing compressed air into the zeolite near the bottom of the absorption column. The air mixes with the fluidized zeolite near the bottom of the column and causes the overall level of zeolite to rise thereby spilling over the top of the column, where the zeolite is collected and fed to the next column. In this manner the zeolite is continuously being transferred from column to column to column to rinse step back to the first column again. Note that the number of absorption columns can be varied with regard to the present invention, and is dependent on the capacity required by the overall system.

Figure 3:
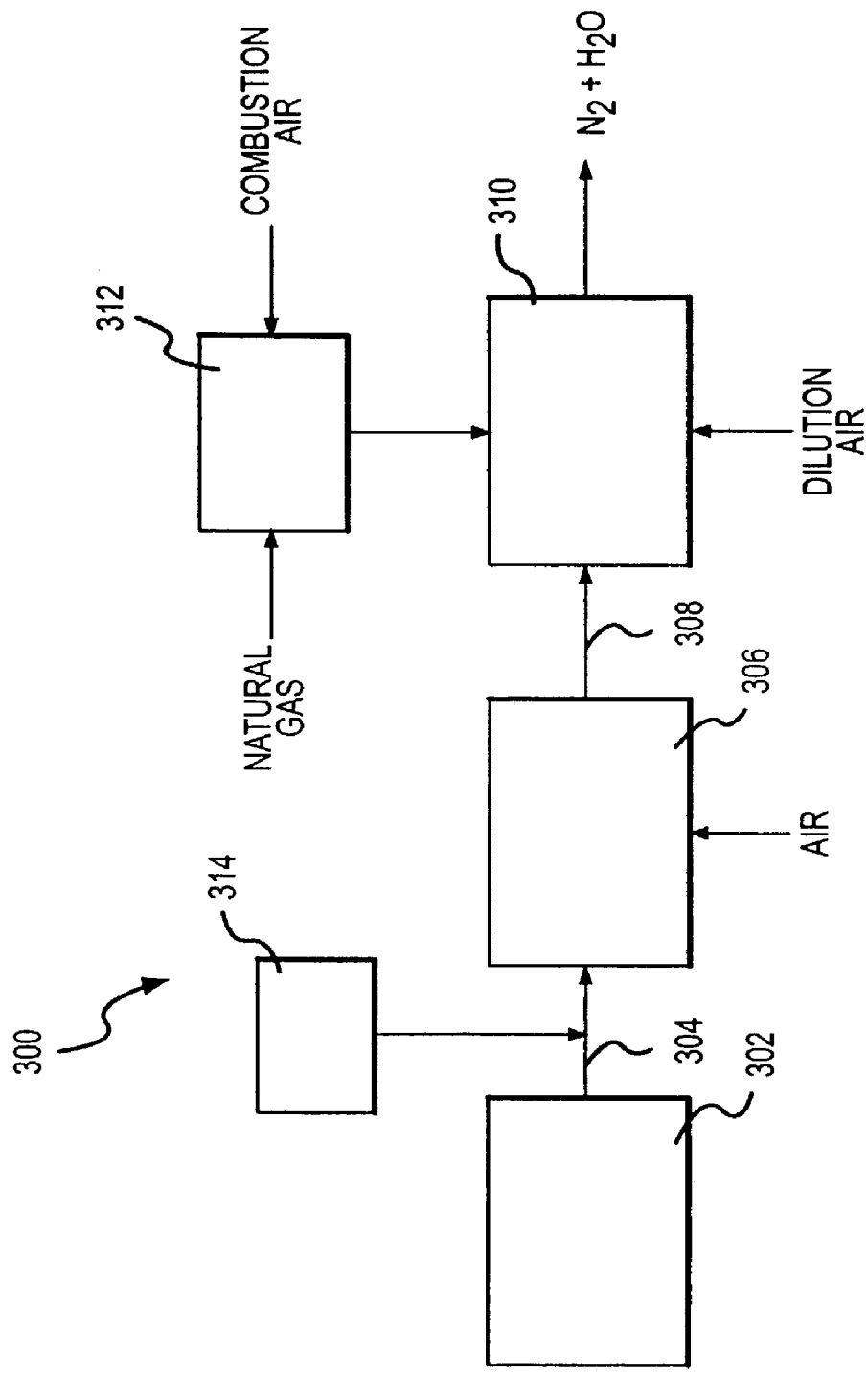
FIG. 3 illustrates a schematic for the combustion of ammonia in accordance with an embodiment of the present invention.

FIG. 3 provides a schematic diagram 300 of the destruction process in accordance with one embodiment of the present invention. In this embodiment, the storage tank 302 housing the ammonium sulfate feeds a stream of material (see line 304) to the ammonia recovery step 306, where an ammonia gas is fed 308 to a combustion 310 unit for destruction of the ammonia. In preferred embodiments, a pre-burner 312 is provided to ensure that lower concentrations of ammonia gas can be destroyed. Note also the lime storage tank 314 for ammonia recovery.

Referring to FIG. 4, a process diagram is shown of a preferred embodiment where four absorption columns 402 operating as fluidized beds and having the zeolite migrated counter-current to the flow of aqueous medium is shown. Note that a brine elution step and a rinse step, with a reverse osmosis unit, are provided to reclaim or recover useful chemicals (see below for additional detail). A destruction unit process, comprising an air stripping unit process and a combustion unit process, are also shown. Also note that the ammonium sulfate is stored in a re-circulation tank.

In more detail, the absorption columns 402 are charged with zeolite, preferably a natural zeolite, more preferably clinoptilolite, for contact with an aqueous medium. The aqueous medium feed 404, having a first level of ammonia, is pumped up-flow, via pump 406, to the first absorption tank at a sufficient flow rate to fluidize the zeolite (target of 40% to 45% expansion). The aqueous medium is then pumped from the first column through the remaining columns in an up-flow configuration utilizing pumps 408. As in column one, the flow rate should be sufficient to fluidize the zeolite in the remaining columns. The aqueous medium, now having a second level of ammonia, is discharged from the system as a discharge stream 410. The second level or discharge level of ammonia is preferably below the acceptable discharge limits as set by the EPA and is most preferably at a concentration of less than 1 mg/L.

The zeolite in the absorption system is pumped in a counter-current configuration to the flow of the aqueous medium. The fresh zeolite stream 412 enters the fourth absorption column first, by passing through a screen 414 provided for the conservation of material and minimization of TDS in the discharge. The zeolite in the absorption columns migrates from column four, to column three, to column two, to column one, and then to the elution step. Preferably, the zeolite is moved using air lifts, which are generally known in the art. The rate of migration is selected such that the contacting time with the aqueous medium is sufficient to produce an aqueous medium having a concentration of ammonia (second level) in the discharge stream 410 lower than the discharge limits set by the EPA. The zeolite stream exiting the first absorption tank is loaded with ammonia and becomes the loaded zeolite stream 416 fed to the elution column 418.

In the elution step, the loaded zeolite stream 416 is contacted in an elution column 418 with a lime input stream 420 and an eluant stream 422. The amount of lime, as stored in a lime storage tank 424, added to the elution column is determined such that the alkalinity of the brine solution is sufficient to remove nearly 100% of the ammonia from the loaded zeolite (this goes for the amount of time as well). The stripped zeolite exits the elution column, passes through a screen 426, and becomes the stripped zeolite feed 428 for the rinse process. The pregnant brine, or eluant stream 430, is fed to the air stripping unit 432.

With regard to the zeolite rinse process, the stripped zeolite stream 428 is rinsed with a rinse stream 434 in a rinse column 436. The rinse process may or may not include a reverse osmosis unit 438 depending on the discharge limits of various chemicals (if the discharge limits are low, it may be a requirement to install a reverse osmosis unit), such as chloride, and on the economic feasibility to recovering the chemicals.

The rinse stream 434 is preferably comprised of a water stream 440 and a reverse osmosis unit permeate 442. The reverse osmosis permeate 442 is created by the passage of the rinse stream 434 exiting the rinse column 436 through a reverse osmosis unit 438. The reverse osmosis concentrate 444 generally contains recovered chemicals such as calcium, chloride, sulfate, and carbonate, and is fed back into the elution column 418.

The zeolite stream exiting 428 the rinse column 436 is fed back to the fourth absorption column as regenerated zeolite 412. A difference between the stripped zeolite and newly loaded zeolite loaded into the columns 402 is that the regenerated zeolite has calcium ions absorbed thereto as opposed to sodium ions.

Referring again to the air stripping unit, a slurry containing the pregnant eluant 430 is mixed with lime 420 to a stripping column 432. An air feed stream 446 is added to the stripping column to facilitate the removal of the ammonia from the slurry 430, thereby creating a mixture of air and ammonia gas.

The air/ammonia mixture stream 448 is fed from the stripping column 432 to an air scrubbing unit 450 where it is washed with a scrubbing acid stream 452. The scrubbing acid stream 452 is created by an acid stream 454 mixed with an amount of product scrub stream 456 from the re-circulation tank 458. The scrubbing acid is preferably $H_2SO_4$ stored in a acid storage tank 460. Note that the scrubbing acid removes ammonia from the air/ammonia mixture and creates an ammonium sulfate solution. The ammonium sulfate solution is removed from the air scrubbing column 450 as the product scrub stream 456 and is transferred to the re-circulating tank 458. The scrubbing stream 452 contains an amount of the product scrub stream 456 as recycle. This recycle, coupled with the low percentage bleed of the product scrub stream 456 acts as a concentrator of ammonium sulfate. The concentration of this stream is a factor in the efficient combustion of the ammonia in the destruction process.

The ammonium sulfate in the re-circulating tank 458 is bled to a mixing tank 462 via stream line 464 for destruction. The amount of ammonium sulfate bled through line 464 is preferably less than 20% of the flow rate circulating between the re-circulation tank 458 and the air scrubber unit process. The ammonium sulfate solution is mixed in the mixing tank 462 with an amount of alkaline material, preferably lime, present in steam 466. The lime or other alkaline material is stored in alkaline storage tank 468. The lime is added to the ammonium sulfate to dissociate the ammonia from the hydroxide. This reaction also produces calcium sulfate ($CaSO_4$), or gypsum, which is preferably removed by passing the product through a filter (not shown).

In certain applications, where the gypsum in the mixing tank becomes very thick in consistency, dilution water 470 may be added. The filter separates out a gypsum cake from a filtrate 472 comprising ammonium hydroxide. The filtrate 472 is fed to an additional air stripping column 474 where it is contacted with an air stream 476 thereby removing the ammonia from the filtrate 472. The remaining liquid stream contains a relatively low concentration of remaining ammonia and can be bled from the air stripper back to the feed stream 404 (see line 478), or other low or non-ammonia containing waste disposal tank (not shown).

The ammonia containing air stream 480 exiting the air stripping column 474 is passed to a combustion unit 482. Depending on the concentration in the air stream, a dilution air stream 484 (to reduce combustion temperature) or a combustion air stream 486 (to increase combustion temperature) can be added to the combustion unit to facilitate combustion of the ammonia. The combustion air stream is blended with a methane stream 488 and passed to a pre-burner (not shown) if necessary. The combustion reaction produces water vapor, nitrogen, and carbon dioxide. The products 490 of the combustion reaction are discharged into the atmosphere.

An alternative of the combustion air stream is to use a catalytic combustion device, for example, catalyst sold by CSM Worldwide, Inc., located at 200 Sheffield St., Mountainside, N.J. 07092. The catalyst would be used to facilitate the combustion of the ammonia in the combustion chamber.

FIGS. 5A, A2, B, B2, C1 and C2 show a theoretical mass balance calculation for the process schematic discussed in FIG. 4. The process requirements including flow rates, concentrations of streams, size of columns, and any other process conditions as were determined through the experimental procedures discussed in detail in the Examples which follow. Specifically, the test results shown in the Examples below were used to estimate the design process condition and assumption based in FIGS. 5A–C2. Additionally, several assumptions were made with respect to process conditions, for example, a theoretical one million gallon per day facility was used as the target facility.

Systems for Monitoring and Disposing of Ammonia From an Aqueous Medium

The present invention contemplates a system for operating the equipment required to remove ammonia from a target water source by an off-site provider, for example a company that specifically installs, monitors, trouble-shoots, and replaces the zeolite materials in the tanks/columns of the present invention. The off-site provider is contemplated to be hired by a municipality (or other like governmental or private water board) to maintain the ammonia levels in the municipalities water via the systems and methods of the present invention. The off-site provider is responsible for determining the ammonia removal requirements of the target water source, for example a water treatment facility, including the type and amount of zeolite required, the number of tanks necessary to house the zeolite, the design of the flow through the tanks, i.e., up-flow, down-flow or batch, the flow rate of the aqueous medium, the length of time before replacement of zeolite, the chemical components and amounts required for efficient removal and destruction of the ammonia, and the combustion requirements of the ammonia removal system, etc.

The off-site provider installs the properly charged zeolite materials at the water treatment facility and monitors the first level, second level, discharge level, etc of the ammonia in the water, and of the ammonia levels during the combustion process (note that the ammonia may be stored as an ammonium salt, which may also be controlled by the off-site provider). The ammonia monitoring can be technician based, i.e., a technician goes to the installed system and takes a sample for analysis, or can be performed by a pre-programmed monitoring unit that removes and analyzes a sample, and transmits the ammonia levels to an off-site monitoring unit, for example a computer via a wireless communication unit. The off-site monitoring unit can be equipped with a signaling means for alerting the off-site provider of over target ammonia levels for discharge, as well as for the levels of the zeolite in the system and the concentration of ammonia gas for combustion in the combustion unit. In one embodiment, the off-site provider has the capability of adding fresh zeolite to the absorption tanks when it is evident that the capacity of the system is insufficient for removing the requisite amount of ammonia.

The off-site provider is responsible for coordinating any maintenance or trouble-shooting issues that arise during the ammonia removal and destruction process. As such, alarms or other signaling devices may be included in the zeolite housing members or other units (air stripping, scrubbing, etc) to alert the provider of a potential malfunction in the system. Further, the off-site manager is responsible for the replacement of degraded zeolite.

The off-site provider installs the properly charged zeolite materials at the water treatment facility and monitors the first level, second level, discharge level, etc of the ammonia in the water, and of the concentration and chemical form of the ammonia during the storage and/or destruction process. As noted above, the ammonia monitoring can be technician based, i.e., a technician goes to the installed system and takes samples for analysis, or can be performed by a pre-programmed device that incrementally removes samples for analysis of ammonia levels, data being transmitted automatically to an off-site monitoring unit, for example a computer. The off-site monitoring unit can be equipped with a signaling means for alerting the off-site provider of over target ammonium levels for the discharge level, as well as for ammonium levels that are problematic during the combustion process, so that modifications can be made where appropriate.

The off-site provider is responsible for coordinating any maintenance or trouble-shooting issues that arise during the ammonia removal process, including the ordering and delivery of appropriate chemicals, for example lime, $H_2SO_4$, brine, etc. As such, alarms or other signaling devices may be included in the chemical component storage vessels, stream lines, etc, to alert the provider of a potential malfunction or shortcoming in the chemical storage or delivery.

As such, an off-site provider of the present invention can be hired by a third party (municipal water board, private water rights holder, etc.) to independently operate the ammonia removal and destruction system disclosed herein. In one embodiment, the off-site provider is an independent contractor specializing in the systems and methods of the present invention. In preferred embodiments, the off-site provider operates a plurality of ammonia removal and destruction systems at a number of geographically different sites for a number of different third parties.

In another embodiment, the off-site provider compiles data from its different sites to optimize the removal of ammonia and destruction of ammonia at those sites, i.e., data is compiled and compared, and optimized systems and methods developed. The data includes the basic parameters for operating the different embodiments of the invention, amounts of zeolite, flow rate concentration of brine, etc.

Finally, the systems and methods of the present invention provide business advantages for an off-site provider to remove and destroy ammonia from public or private water supplies, as managed by other third parties. The business methods provide economic and technological advantages to the third party for removing and destroying ammonia, as described by the embodiments of the present invention.

Having generally described the invention, the same will be more readily understood by reference to the following examples, which are provided by way of illustration and are not intended as limiting.

EXAMPLES

Example 1

Sodium Zeolite Absorption of De-mineralized Water/Ammonia Feed

Tables 2 and 3 show the results of ammonia absorption from an aqueous medium by two columns connected in series charged with regenerated sodium chloride zeolite. The feed solution was prepared using de-mineralized water and adding approximately 28 mg/L ammonia thereto. The feed solution was pumped in an up-flow configuration at a flow rate of approximately 1.5 liters per min (L/min).

The data shown in Table 2 shows that the concentration of ammonia in the effluent of column one began at 0.06 mg/L and concluded at 20.6 mg/L. The effluent exiting column two began at 0.03 mg/L and remained below the discharge level (1 mg/L ammonia) for about 450 minutes. At the completion of the test, the ammonia concentration in the effluent of column 2 was 8.1 mg/L. These results suggest that at the selected flow rate, an additional column of charged zeolite is necessary to ensure that the ammonia concentration in the effluent or discharge stream is at a level lower than the standard discharge level as set by the EPA (approximately 1 mg/L).

TABLE 2

Ammonia removal from two columns connected in series

|  |  |  |  |  | Col. 1 Effluent | | | Col. 2 Effluent | | | |
| --- | --- | --- | --- | --- | --- | --- | --- | --- | --- | --- | --- |
| Time | Flow rate | Bed Vol. | Feed $NH_3$ | meq $NH_3$ | $NH_3$ mg/L | meq dischar. | meq on zeol. | $NH_3$ mg/L | meq disch. | meq on zeol. | % rec. |
| 0 | 1.5 | 0 | 28.5 | 0 | 0.06 | 0 | 0 | 0.03 | 0 | 0 |  |
| 10 | 1.5 | 6 | 28.5 | 30.54 | 0.06 | 0.064 | 30.47 | 0.03 | 0.03 | 0.03 | 99.9 |
| 105 | 1.5 | 63 | 27.2 | 307.39 | 0.83 | 8.51 | 298.88 | 0.12 | 1.25 | 7.26 | 99.6 |
| 265 | 1.5 | 159 | 23.1 | 703.39 | 5.9 | 109.66 | 593.74 | 0.14 | 3.65 | 106.00 | 99.5 |
| 435 | 1.5 | 261 | 24.4 | 1147.82 | 10.5 | 300.91 | 846.92 | 0.77 | 17.68 | 283.23 | 98.5 |
| 450 | 1.8 | 324 | 18.2 | 1182.92 | 5.2 | 310.93 | 871.99 | 0.41 | 18.47 | 292.46 | 98.4 |
| 560 | 1.8 | 403.2 | 27.9 | 1577.51 | 15.8 | 534.39 | 1043.12 | 1.24 | 36.01 | 498.38 | 97.7 |
| 680 | 1.8 | 489.6 | 27.4 | 2000.25 | 19.7 | 838.33 | 1161. | 3.38 | 88.16 | 750.18 | 95.6 |
| 800 | 1.8 | 576 | 28 | 2432.25 | 20.6 | 1156.2 | 1276.1 | 8.1 | 213.13 | 943.04 | 91.2 |

Table 3 summarizes the test data with regard to bed volumes and meq/g for columns one and two:

TABLE 3

Ammonia Concentration For Columns One and Two

| Bed Volume | meq/g for Col. 1 | meq/g for Col. 2 |
|---|---|---|
| 0 | 0.0 | 0.0 |
| 6 | 0.018 | 0.0 |
| 63 | 0.173 | 0.004 |
| 159 | 0.343 | 0.059 |
| 261 | 0.490 | 0.158 |
| 324 | 0.504 | 0.163 |
| 403 | 0.603 | 0.278 |
| 490 | 0.672 | 0.418 |
| 576 | 0.738 | 0.525 |

A second test was performed using similar parameters, except that the flow rate for the aqueous medium was 1.7 L/min and the initial concentration of ammonia in the feed was 37.4 mg/L. Again the results, as shown in Tables 4 and 5, were similar to the data in Tables 2 and 3, where the concentration of ammonia in the effluent at the end of the test exceeded the discharge limit of 1 mg/L (suggesting a third column would be desirable). However, as above, the data indicates the utility of zeolite in removing ammonia from an aqueous medium.

TABLE 4

Ammonia removal from two columns connected in series (1.7 L/min flow rate)

| | | | | | Col. 1 Effluent | | | Col. 2 Effluent | | | |
|---|---|---|---|---|---|---|---|---|---|---|---|
| Time | Flow rate | Bed Vol. | Feed $NH_3$ | meq $NH_3$ | $NH_3$ mg/L | meq dischar. | meq on zeol. | $NH_3$ mg/L | meq dischar. | meq on zeol. | % rec. |
| 0 | 1.7 | 0 | 37.4 | 0 | 1.19 | 0 | 0 | 2.54 | 0 | 0 | 0 |
| 20 | 1.7 | 13.6 | 37.4 | 90.83 | 1.19 | 2.89 | 87.94 | 2.54 | 6.17 | −3.2 | 93.2 |
| 85 | 1.7 | 57.8 | 35.9 | 374.18 | 1.1 | 11.57 | 362.61 | 0.37 | 9.09 | 2.48 | 97.6 |
| 145 | 1.7 | 98.6 | 36.2 | 637.93 | 2.92 | 32.85 | 605.08 | 0.41 | 12.08 | 20.77 | 98.1 |
| 265 | 1.7 | 180.2 | 31.1 | 1091.1 | 11.1 | 194.59 | 896.51 | 0.34 | 17.03 | 177.56 | 98.4 |
| 375 | 1.7 | 255 | 33.3 | 1535.89 | 21.9 | 487.11 | 1048.78 | 0.73 | 26.78 | 460.33 | 98.3 |
| 505 | 1.7 | 343.4 | 36.9 | 2118.38 | 26.1 | 899.12 | 1219.26 | 2.32 | 63.40 | 835.71 | 97.0 |
| 565 | 1.7 | 384.2 | 31.6 | 2348.61 | 26 | 1088.55 | 1260.06 | 5.5 | 103.48 | 985.07 | 95.6 |

TABLE 5 summarizes the test data with regard to bed volumes and meq/g for columns one and two (1.7 L/min flow rate):

| Bed Volumes | meq/g for Col. 1 | meq/g for Col. 2 |
|---|---|---|
| 0 | 0 | 0 |
| 14 | 0.051 | 0 |
| 58 | 0.210 | 0.001 |
| 99 | 0.350 | 0.012 |
| 180 | 0.519 | 0.099 |
| 255 | 0.607 | 0.256 |
| 343 | 0.705 | 0.466 |
| 384 | 0.729 | 0.549 |

Example 2

Sodium Zeolite Absorption of High Ammonia Feed Containing Calcium, Magnesium and Potassium Tables 6 and 7 illustrate that aqueous medium containing approximately 26.5 mg/L ammonia, 127 mg/L calcium, 36 mg/L magnesium, 31 mg/L potassium, and 8.8 mg/L sodium, can be effectively treated to remove ammonia using the apparatus and methods of the present invention. The aqueous medium was pumped up-flow through a two column system similar to the one described in Example 1. The solution was pumped at a flow rate of approximately 1.7 L/min for a total time of 435 minutes.

Figure 6:
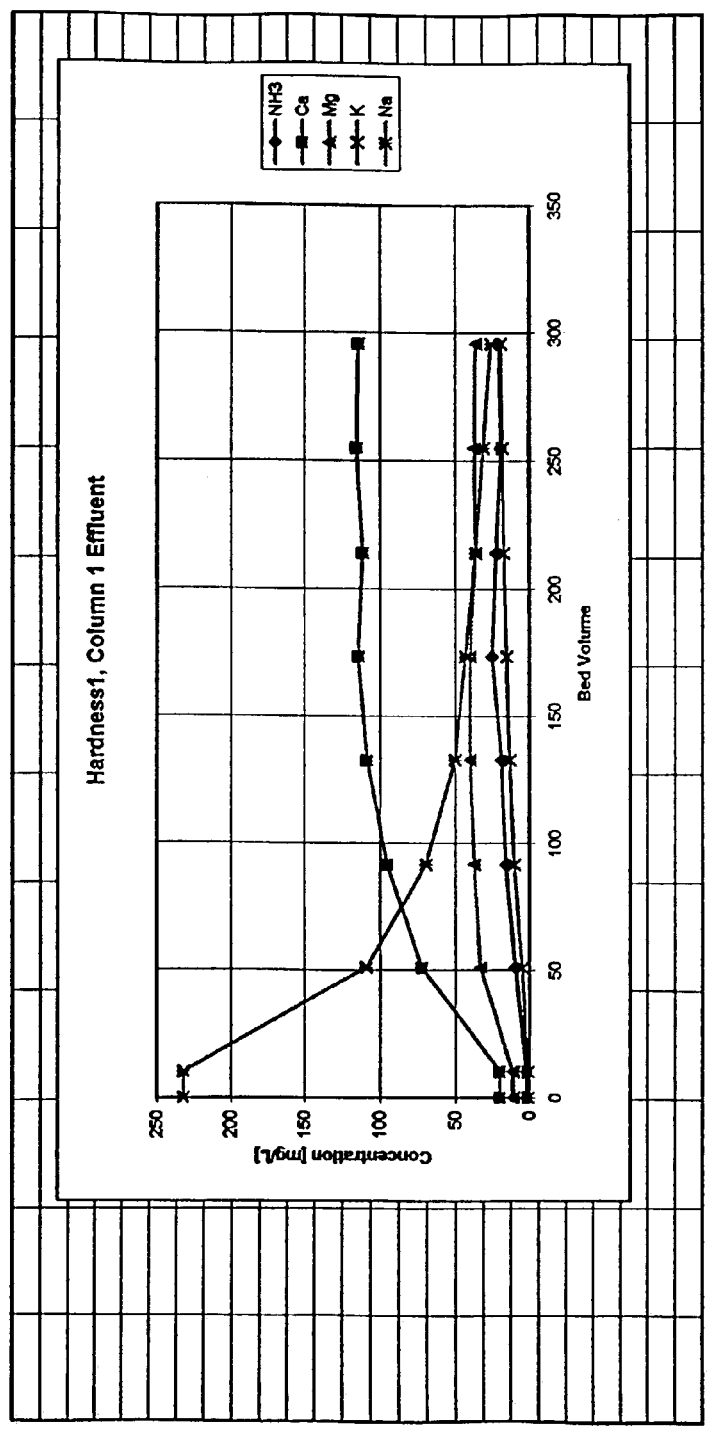
FIG. 6 is graphical representation of bed volume against concentration for the data illustrated in Tables 6 and 7.
Figure 7C:
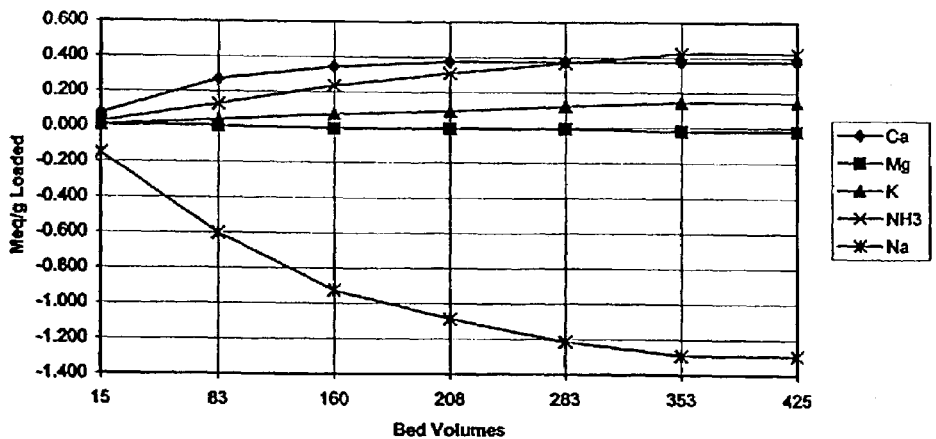
Figure 7D:
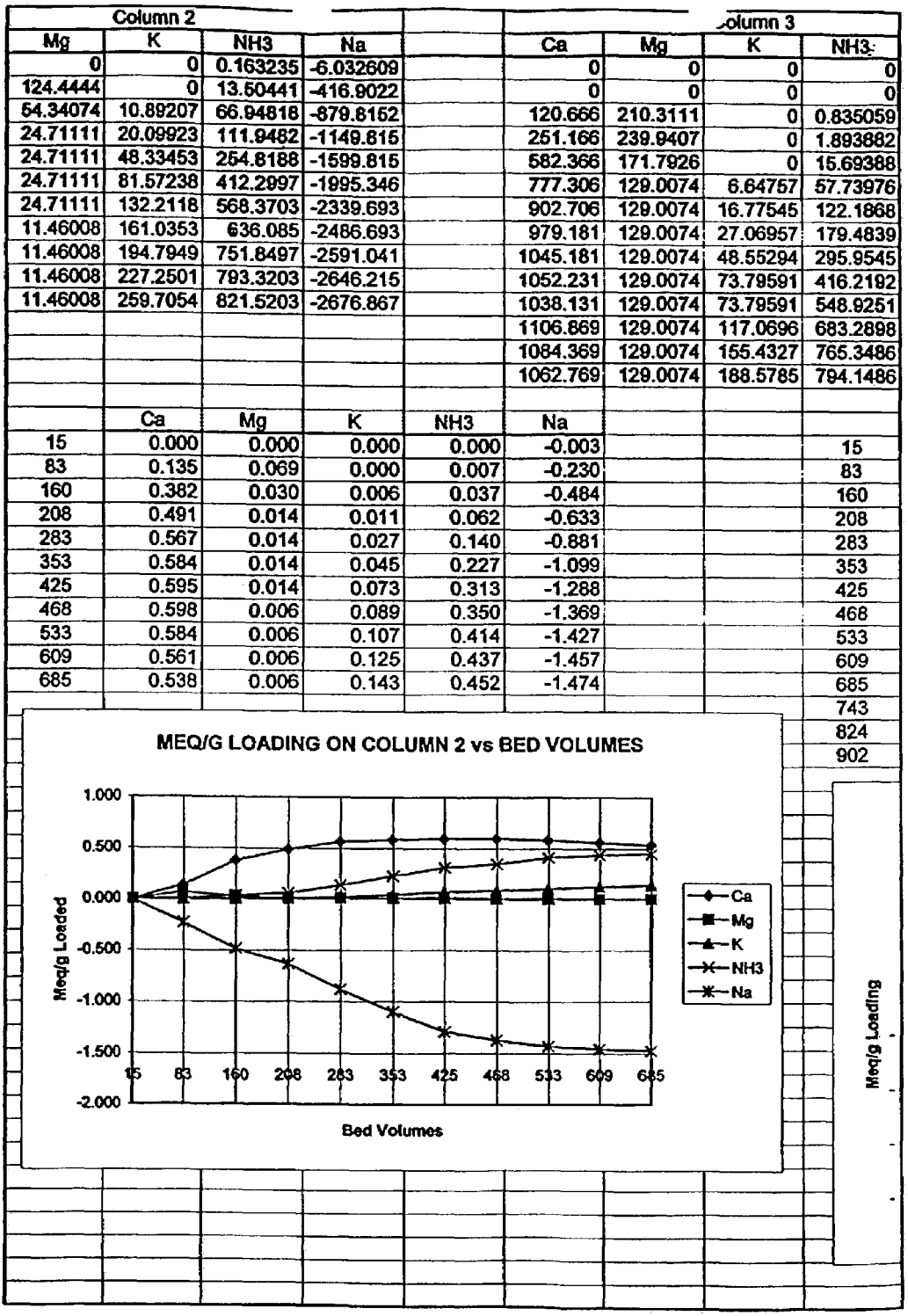
Figure 7E:
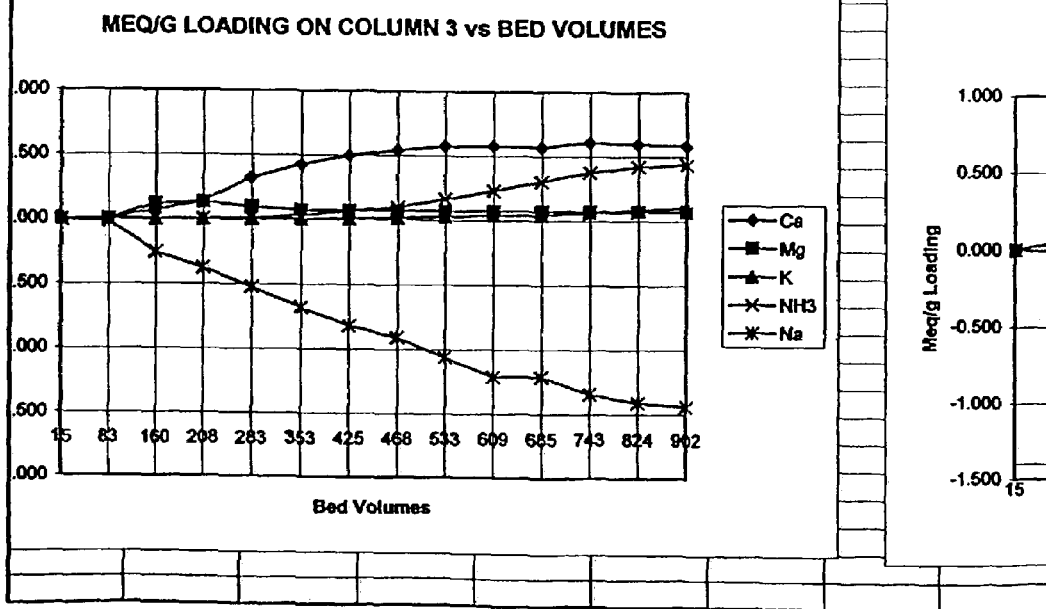
Figure 7F:
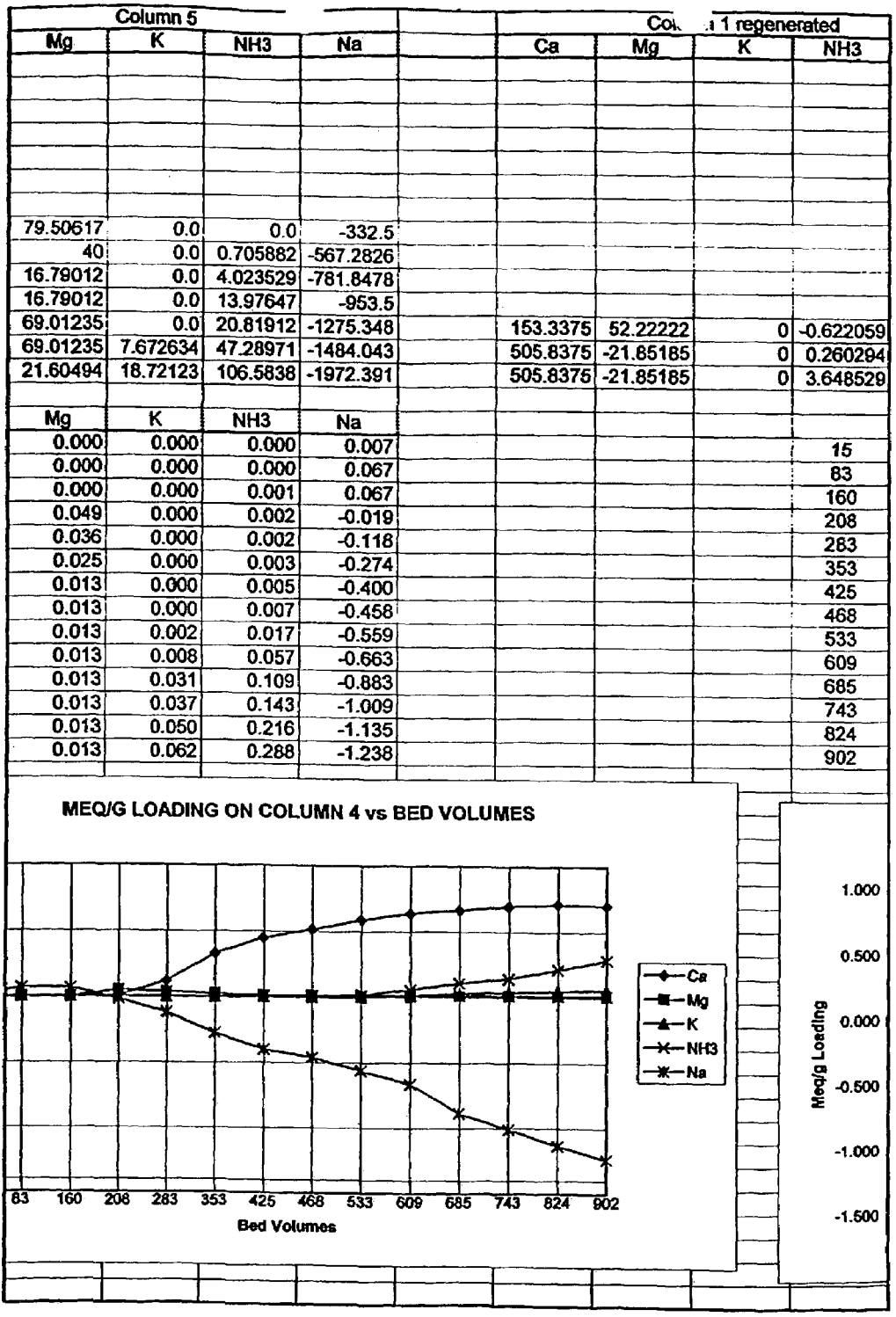
Figure 7G:
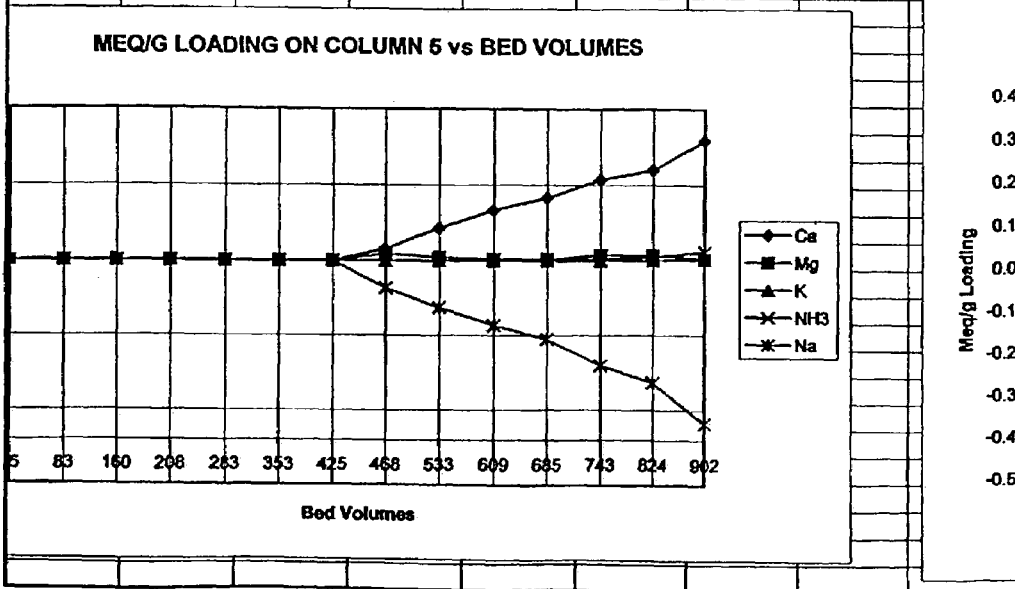
Figure 7H:
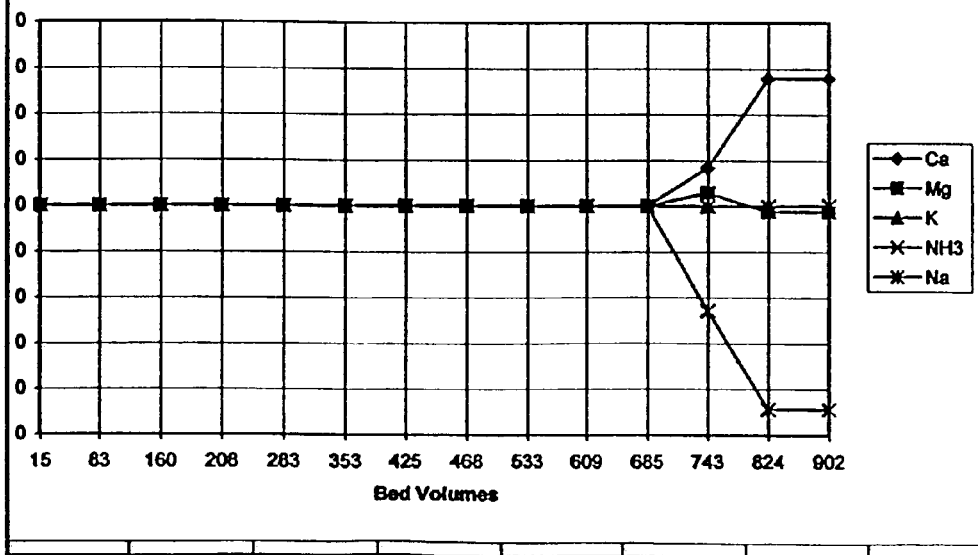
Figure 8B:
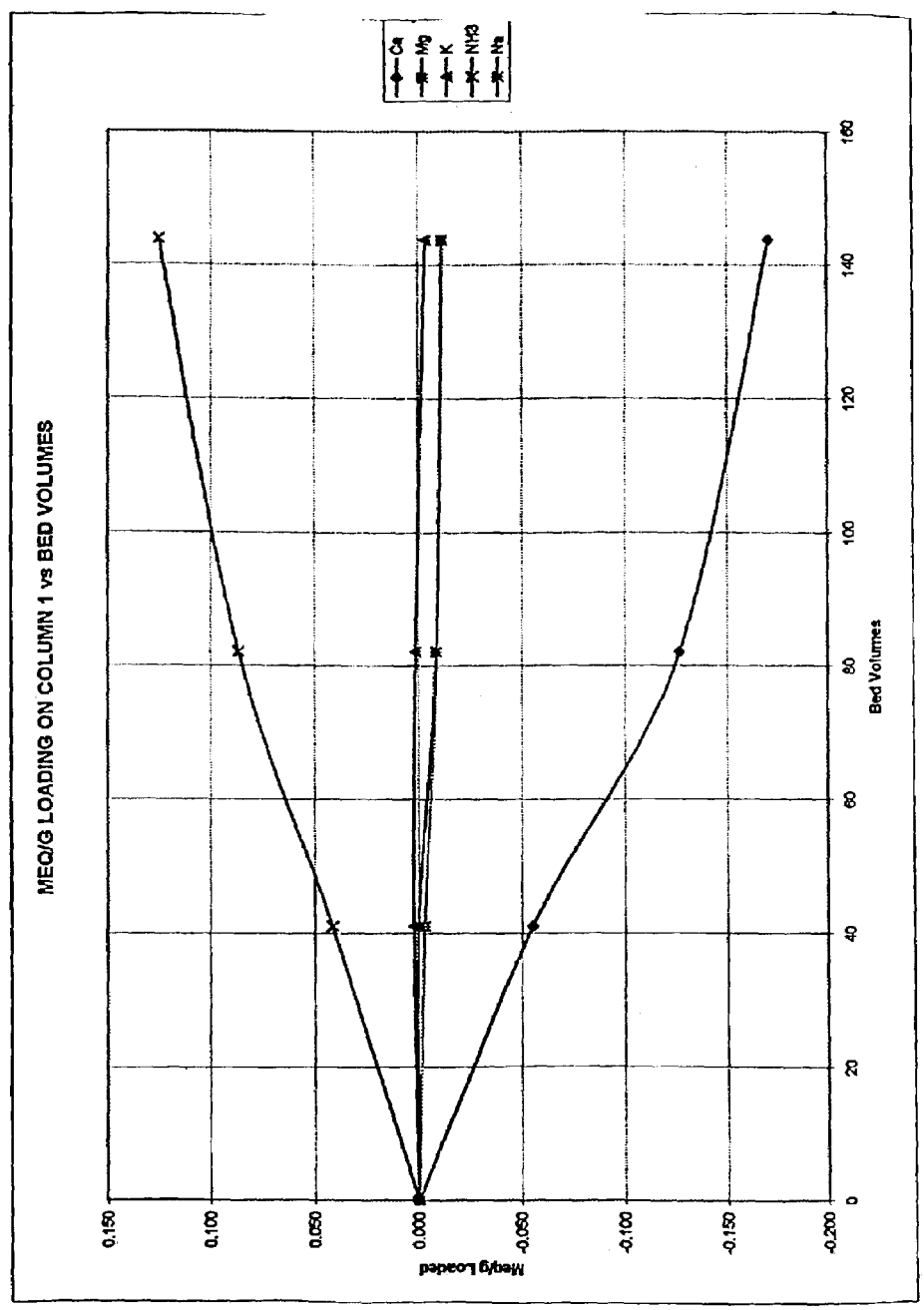
Figure 8C:
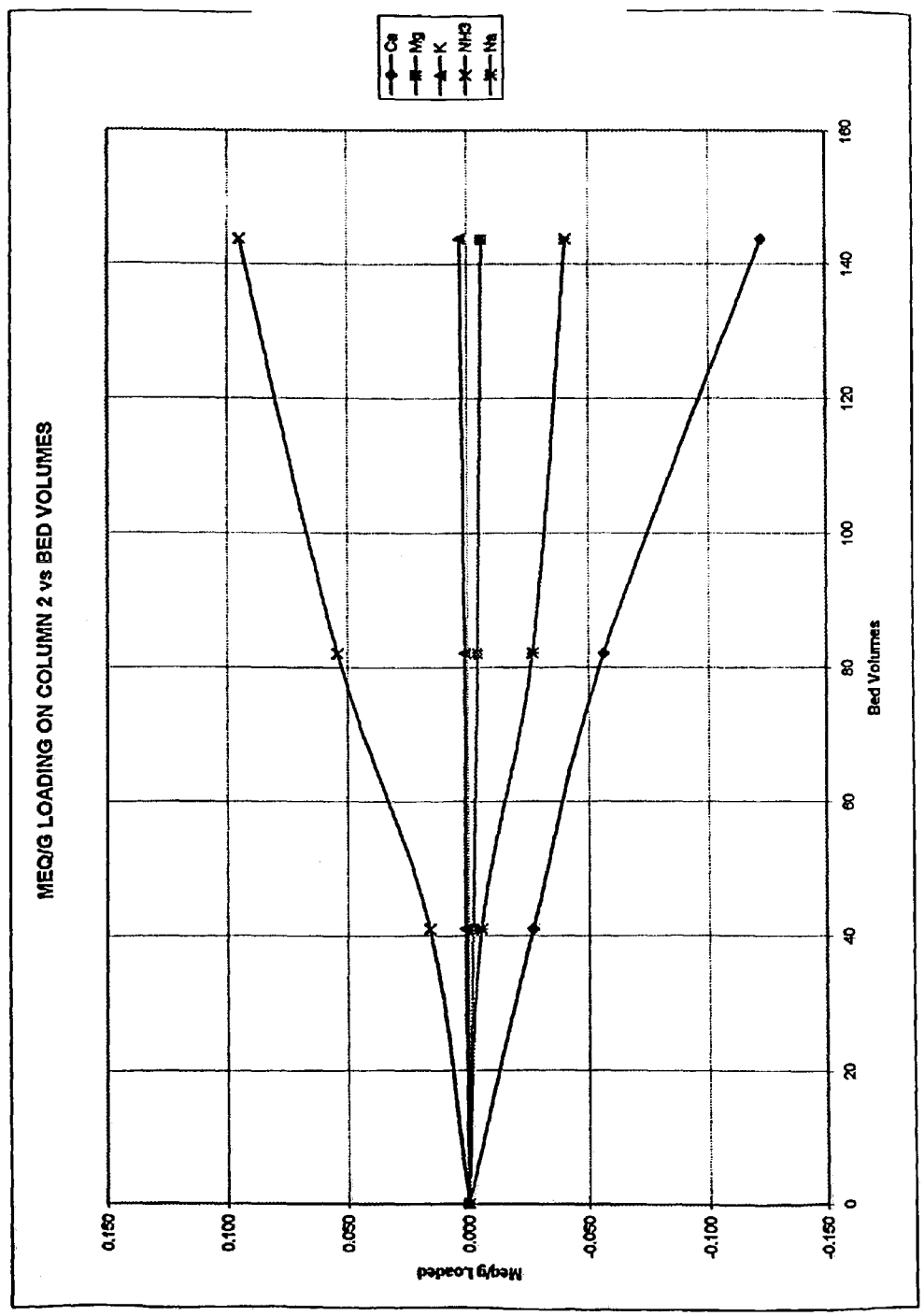
Figure 8D:
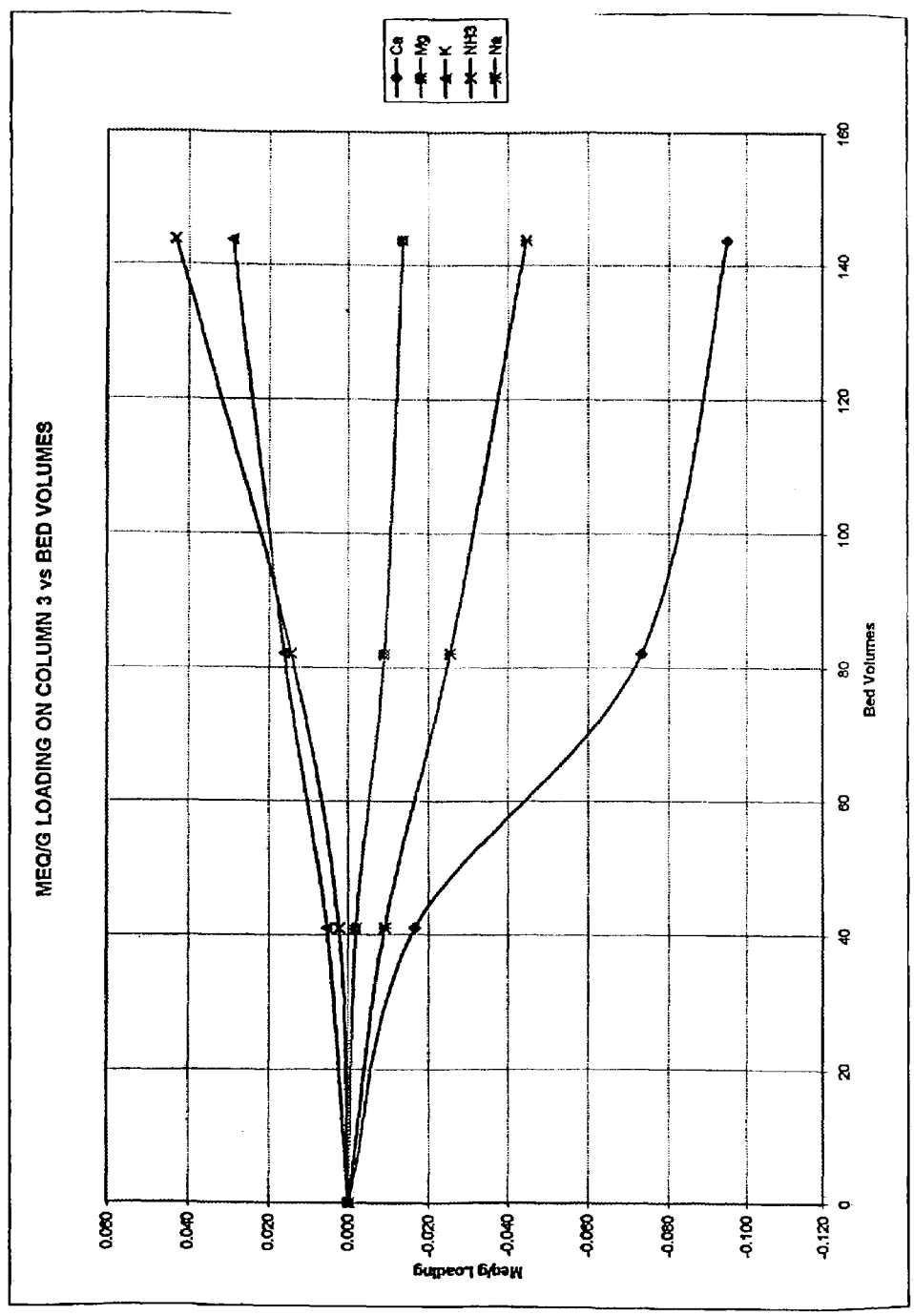
Figure 8E:
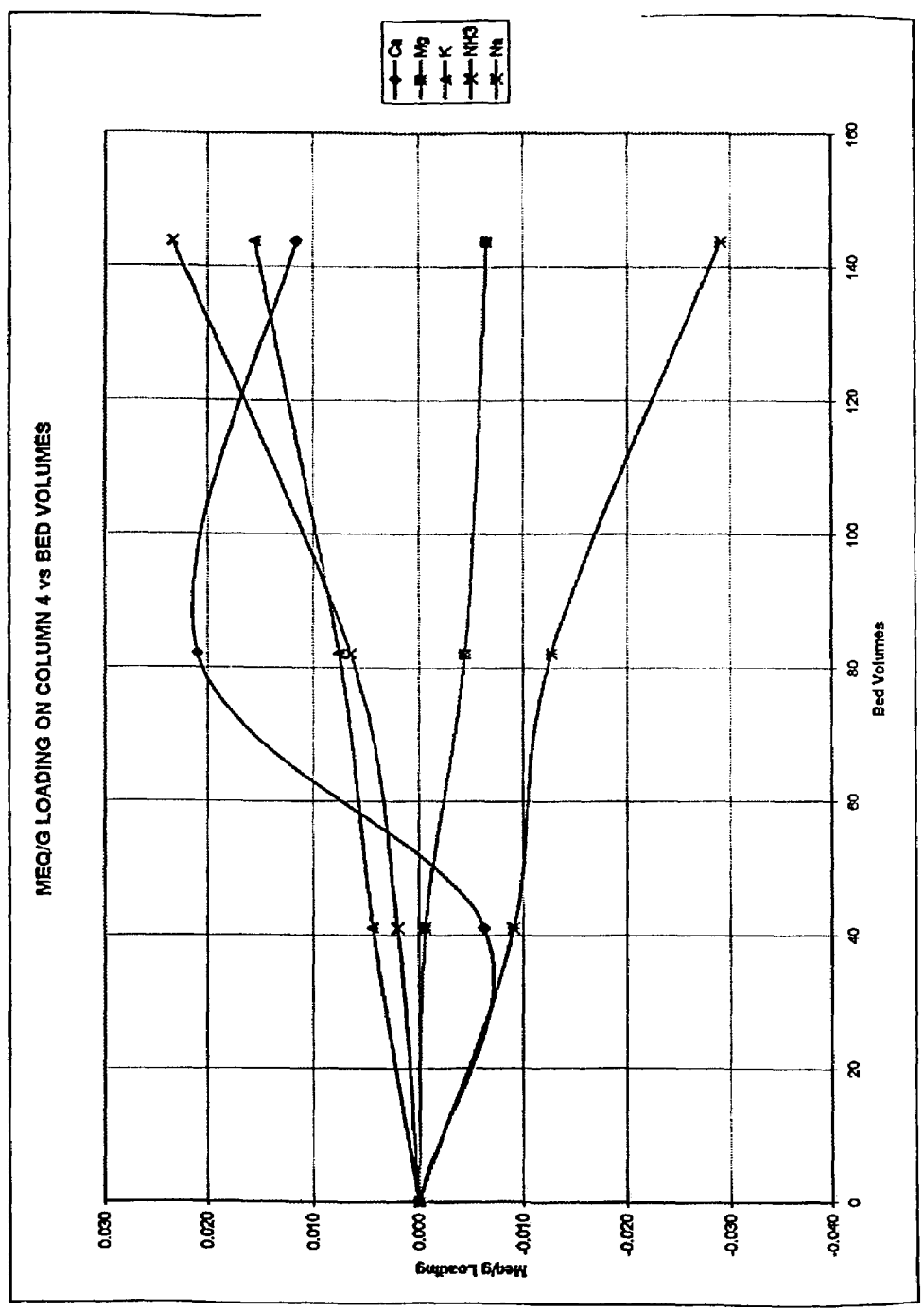
Figure 8F:
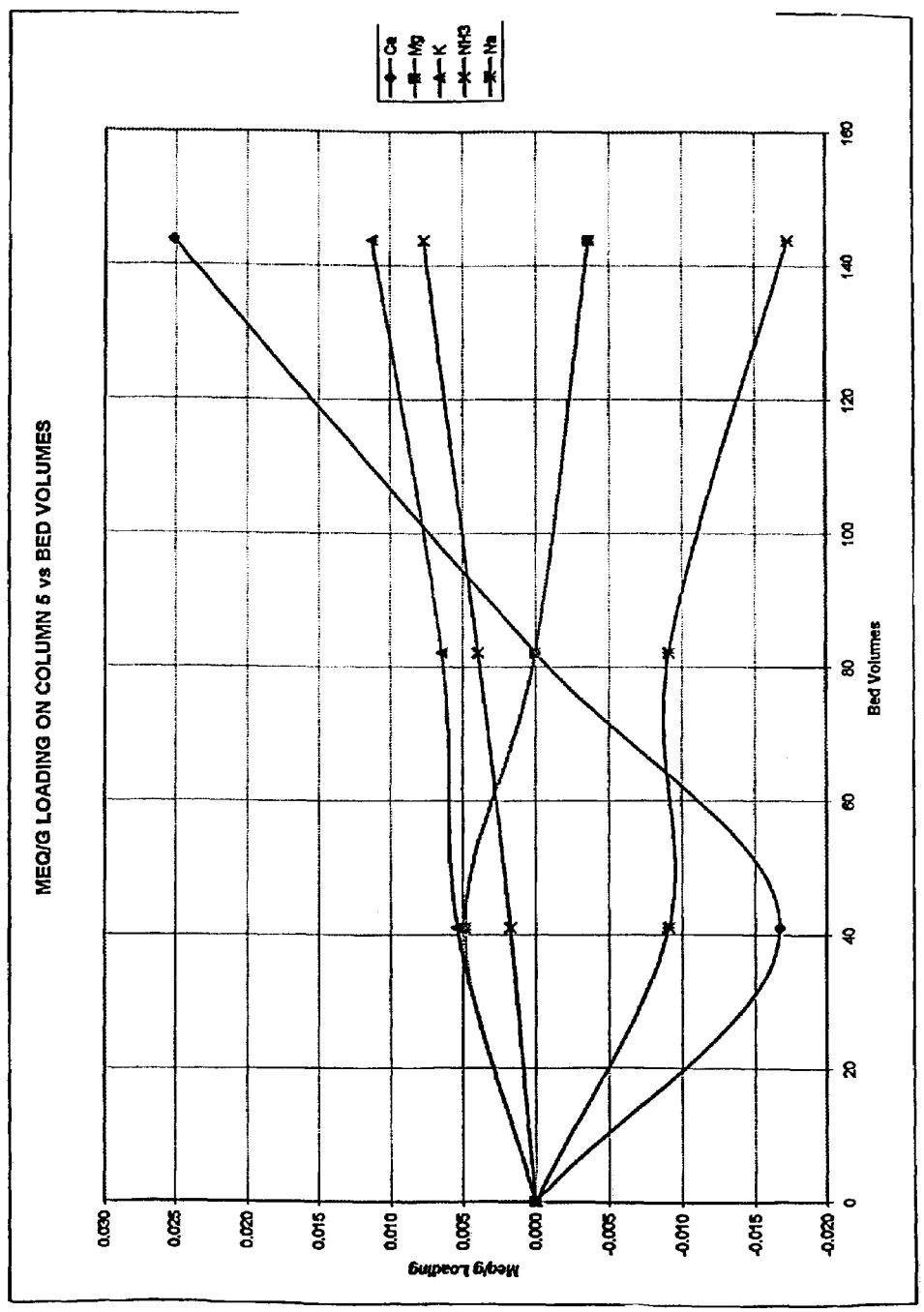
Figure 9B:
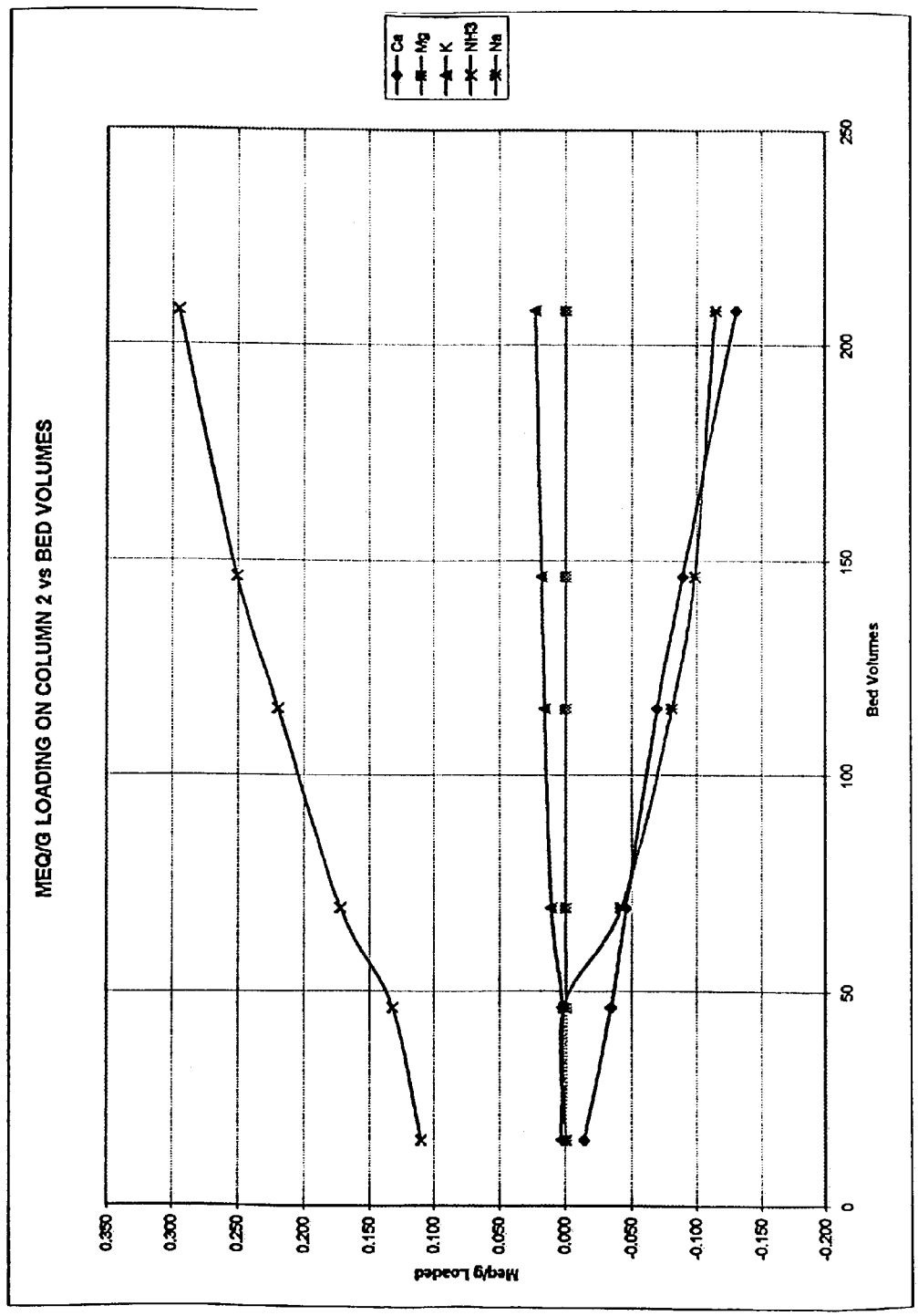
Figure 9C:
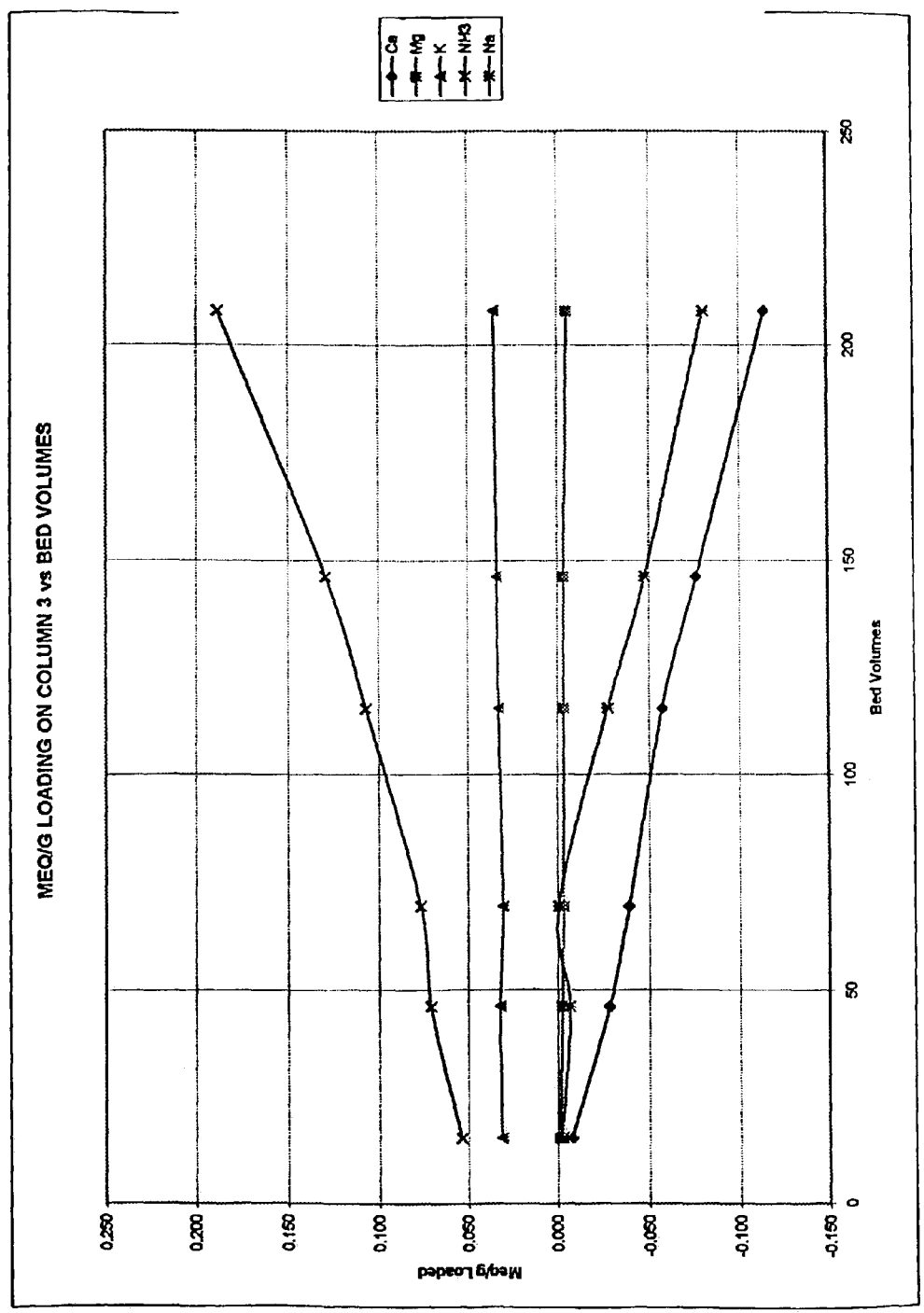
Figure 9D:
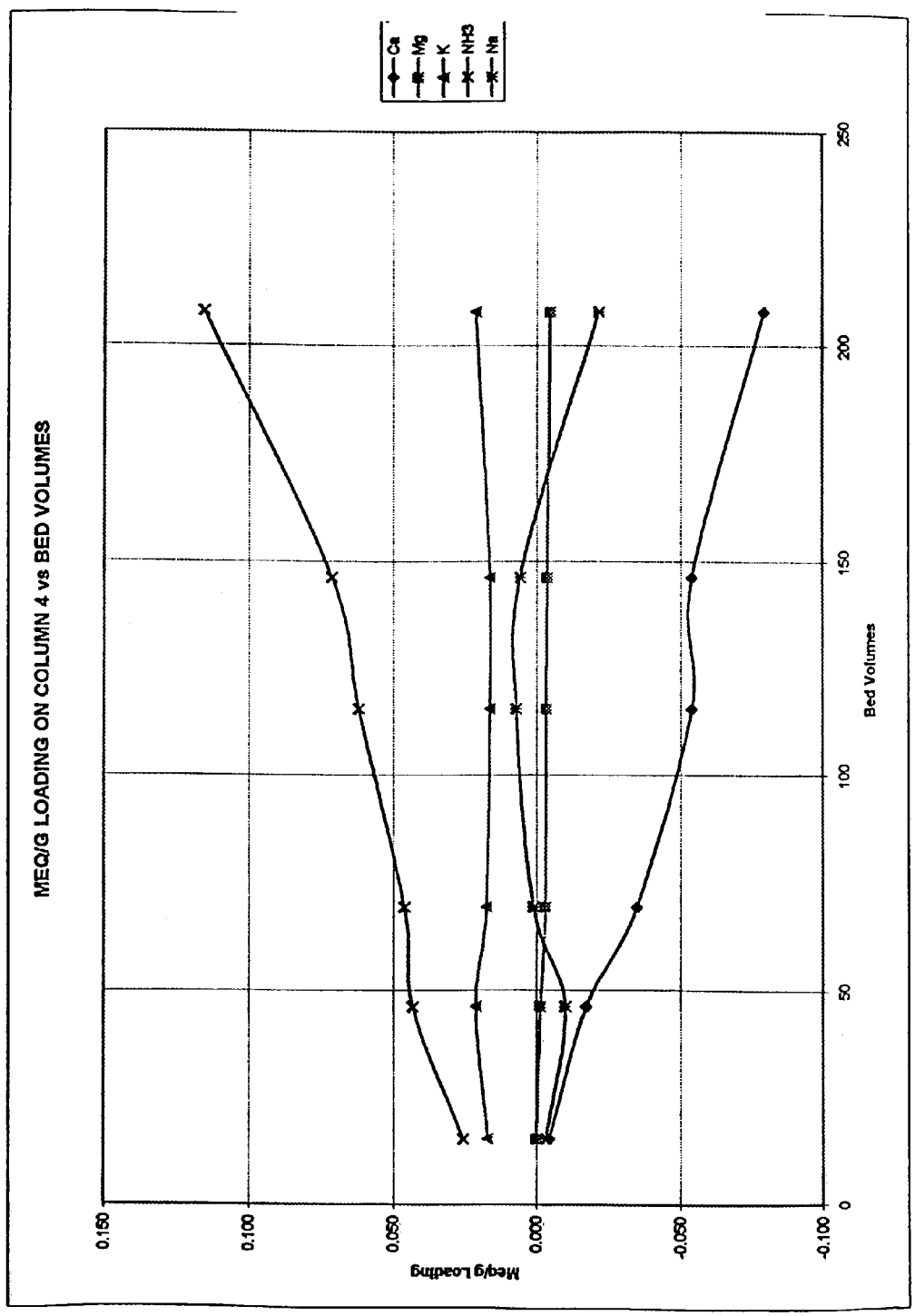
Figure 9E:
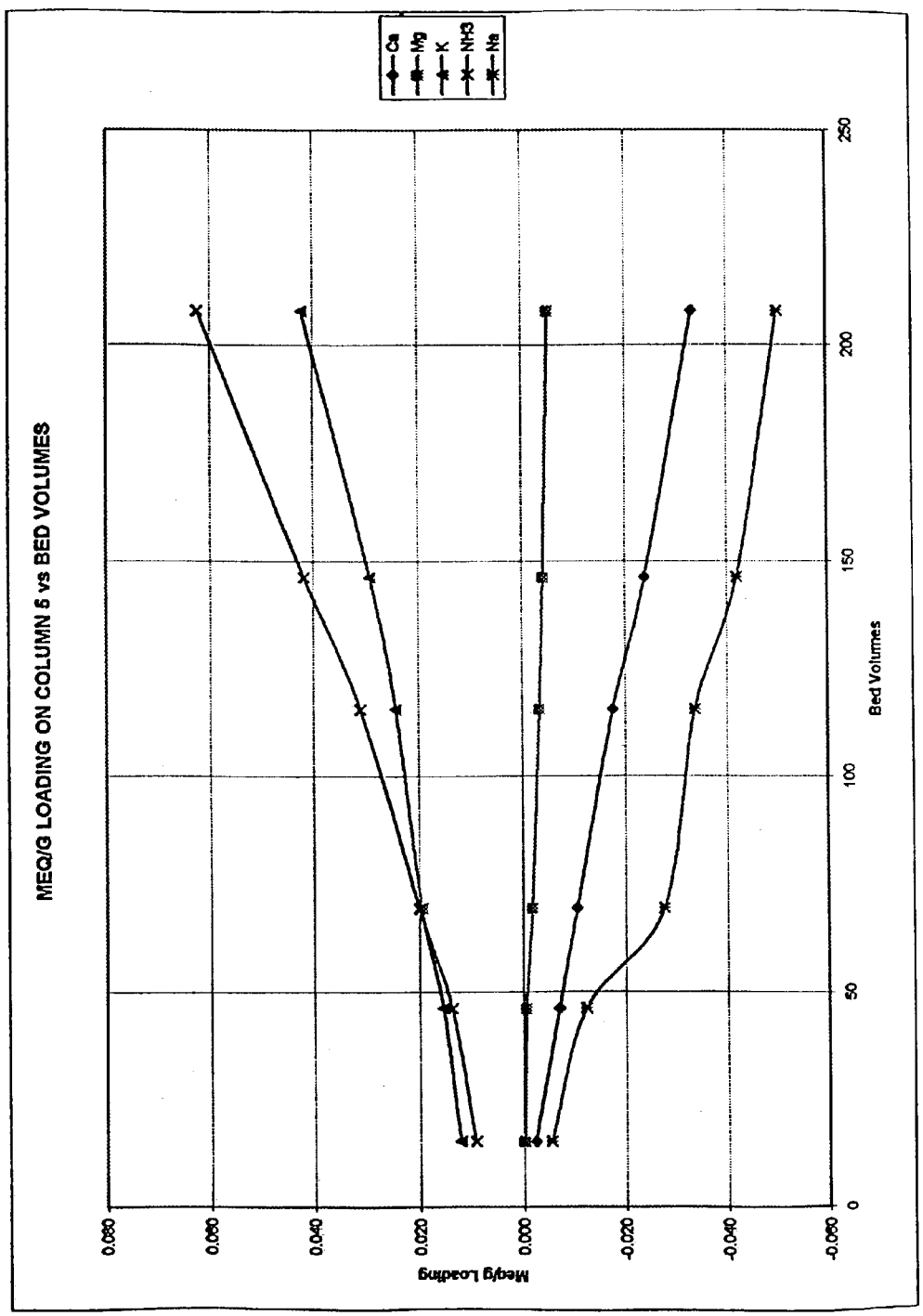
Figure 9F:
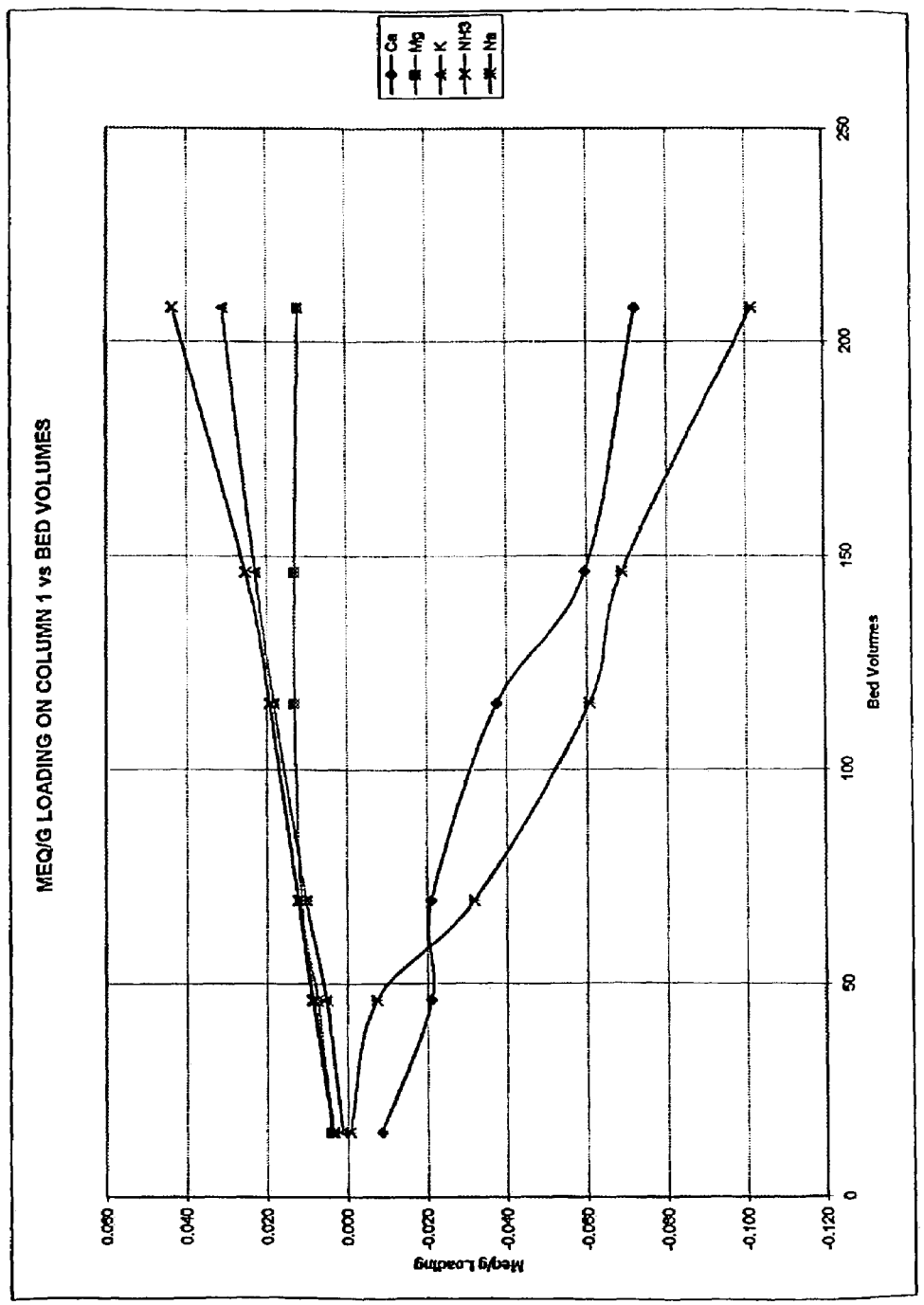
Figure 10B:
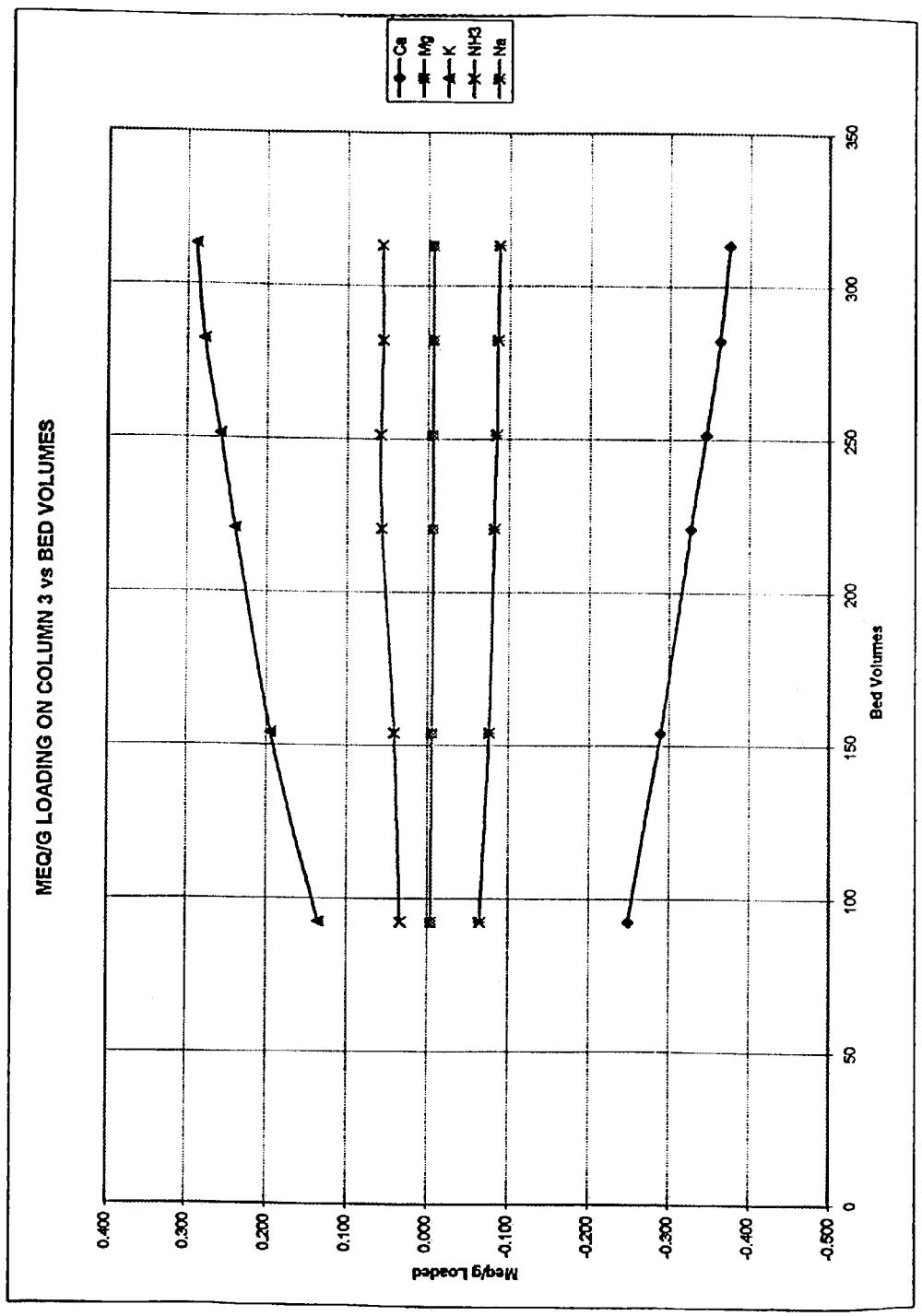
Figure 10C:
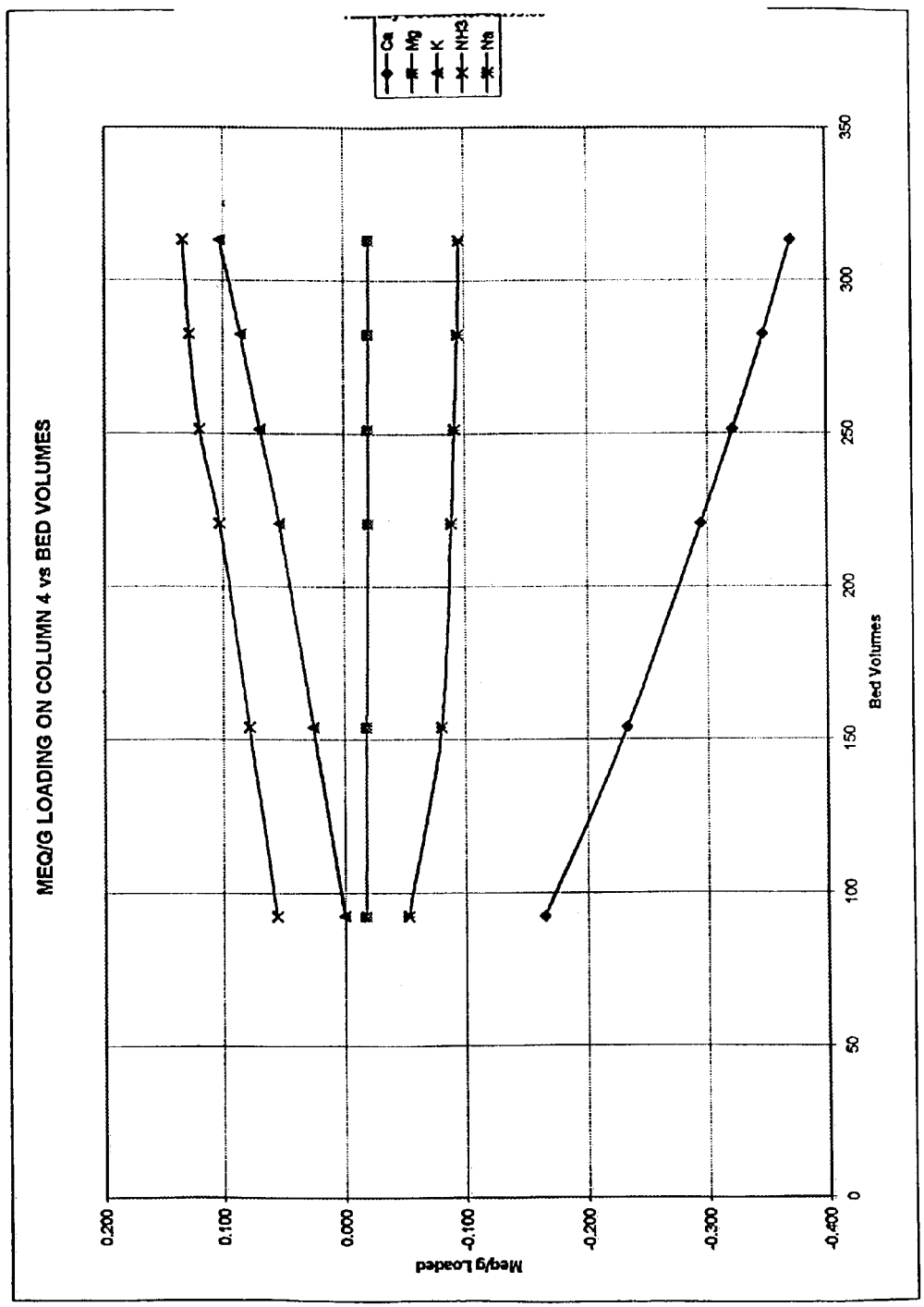
Figure 10D:
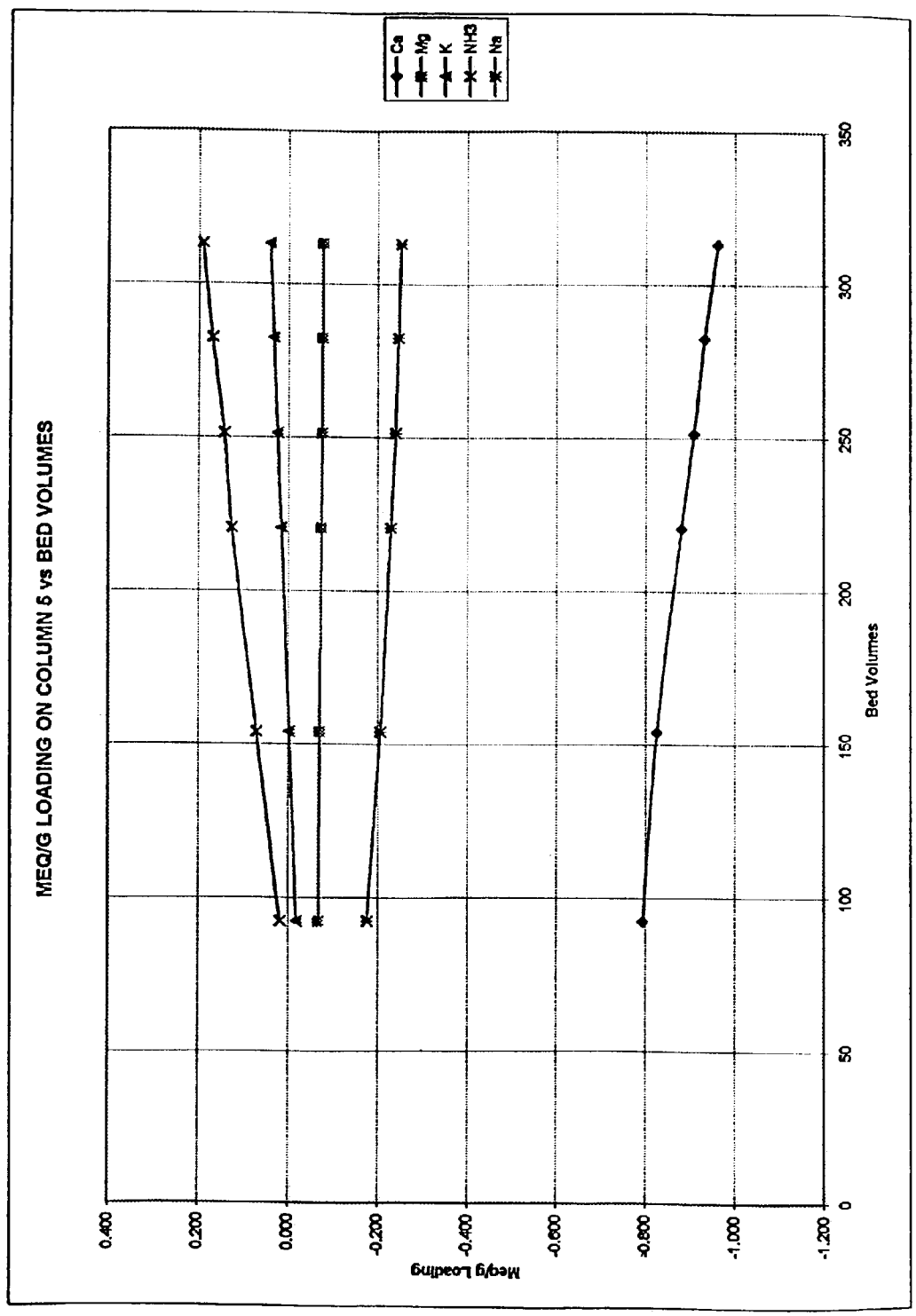
Figure 10E:
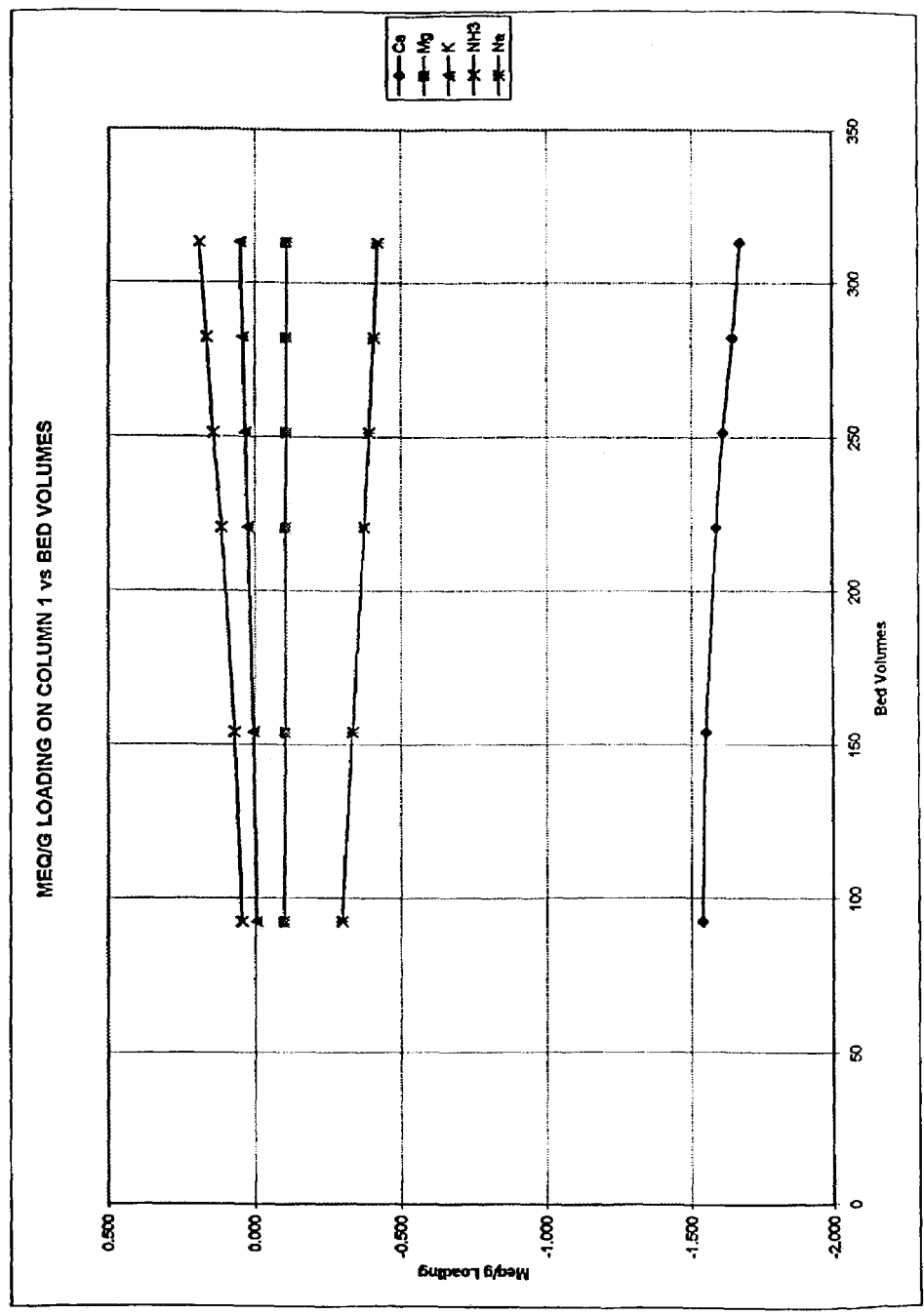
Figure 10F:
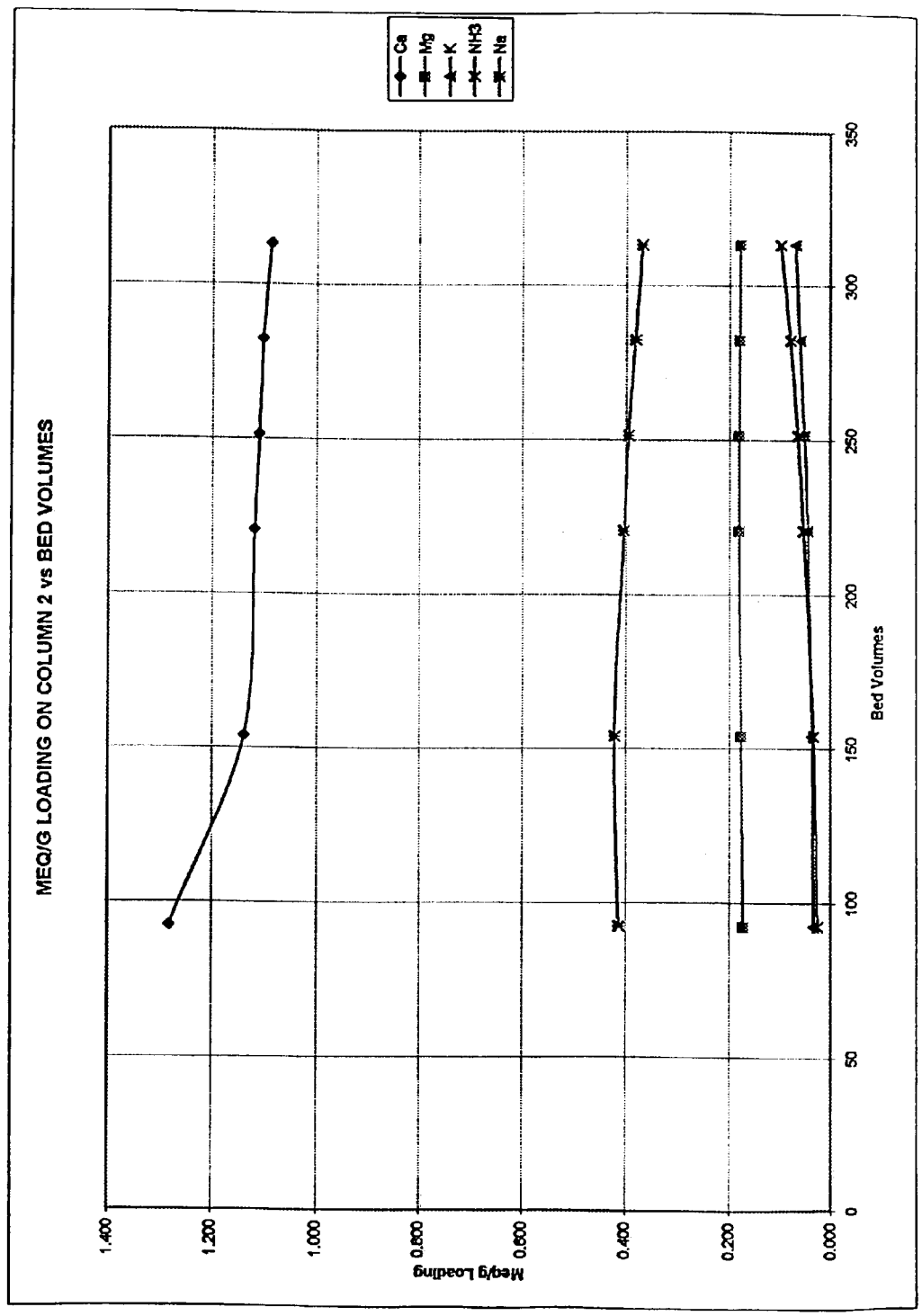

Tables 6 and 7 show that the concentration of ammonia in the column one effluent was approximately 20.9 mg/L and the concentration in the column two effluent was approximately 16.4 mg/L. As in Example 1, an additional column would have been useful for a more complete removal of the ammonia from the solution at that flow rate. The data also illustrates that calcium loads quickly onto the zeolite and that the majority of the sodium on the zeolite prior to flow of the solution is displaced by calcium and ammonia (see FIG. 6). Note that the concentration of sodium clearly decreases from an initial concentration of greater than 200 mg/L to a concentration of less than 50 mg/L, while the concentration of calcium increases from an initial concentration of less than 25 mg/L to a concentration of greater than 100 mg/L.

TABLE 6

Ammonia Loading onto Two Column Zeolite System - Col 1 Effluent

| | | | | | | | | | Col. 1 Effluent | | | |
| --- | --- | --- | --- | --- | --- | --- | --- | --- | --- | --- | --- | --- |
| Time | Flow rate | Bed Vol. | meq fed $NH_3$ | meq fed Ca | meq fed Mg | meq fed K | meq fed Na | meq $NH_3$ disch. | meq $NH_3$ on C#1 | meq disch Ca | meq disch Mg | meq disch K |
| 0 | 1.7 | 151 | 0 | 0 | 0 | 0 | 0 | 0 | 0 | 0 | 0 | 0 |
| 15 | 1.7 | 151 | 47.9 | 161.9 | 75.9 | 20.2 | 9.4 | 4.0 | 43.9 | 25.5 | 23.2 | 0.65 |
| 75 | 1.7 | 151 | 240.96 | 814.7 | 387.8 | 101.1 | 48 | 72.2 | 168.8 | 392.7 | 301.4 | 13.70 |
| 135 | 1.7 | 151 | 433.32 | 1472.6 | 708.1 | 179.3 | 87.5 | 183.6 | 249.7 | 877.2 | 613.26 | 39.78 |
| 195 | 1.7 | 151 | 621.29 | 2135.6 | 1036.9 | 257.6 | 127.8 | 319.2 | 302.1 | 1428 | 950.45 | 74.70 |
| 255 | 1.7 | 151 | 810.72 | 2788.4 | 1348.8 | 335.9 | 167.7 | 502.8 | 307.9 | 2009.4 | 1287.65 | 112.83 |
| 315 | 1.7 | 151 | 1000.1 | 3431.0 | 1652.2 | 414.1 | 207.2 | 663.8 | 336.4 | 2575.5 | 1591.12 | 157.17 |
| 375 | 1.7 | 151 | 1198.32 | 4063.4 | 1947.3 | 492.4 | 246.2 | 802.9 | 395.4 | 3162 | 1903.02 | 204.13 |
| 435 | 1.7 | 151 | 1405.96 | 4695.8 | 2242.3 | 570.7 | 284.8 | 955.2 | 450.8 | 3743.4 | 2206.49 | 253.70 |

| C#1 wt | C #2 wt | bed vol. | elapsed time | $NH_3$ | feed Ca | feed Mg | feed K | feed Na | Col 1 effluent mg/L | | | |
| --- | --- | --- | --- | --- | --- | --- | --- | --- | --- | --- | --- | --- |
| | | | | | | | | | NH3 | Ca | Mg | K |
| 1729 | 1795 | 0 | 0 | 26.3 | 127 | 36 | 31 | 8.5 | 2.22 | 20 | 11 | 1 |
| 1729 | 1795 | 10.2 | 15 | 26.3 | 127 | 36 | 31 | 8.5 | 2.22 | 20 | 11 | 1 |
| 1729 | 1795 | 51 | 75 | 26.5 | 128 | 37 | 31 | 8.7 | 9.35 | 72 | 33 | 5 |
| 1729 | 1795 | 91.8 | 135 | 26.4 | 129 | 38 | 30 | 8.9 | 15.3 | 95 | 37 | 10 |
| 1729 | 1795 | 132.6 | 195 | 25.8 | 130 | 39 | 30 | 9.1 | 18.6 | 108 | 40 | 13 |
| 1729 | 1795 | 173.4 | 255 | 26 | 128 | 37 | 30 | 9.2 | 5.2 | 114 | 40 | 15 |
| 1729 | 1795 | 214.2 | 315 | 26 | 126 | 36 | 30 | 8.9 | 22.1 | 111 | 36 | 17 |
| 1729 | 1795 | 255 | 375 | 27.2 | 124 | 35 | 30 | 8.8 | 19.1 | 115 | 37 | 18 |
| 1729 | 1795 | 295.8 | 435 | 28.5 | 124 | 35 | 30 | 8.7 | 20.9 | 114 | 36 | 19 |
| | | | total eq | 26.56 | 127 | 36.56 | 30.33 | 8.79 | | | | |
| | | | | 12.08 | 1.56 | 6.35 | 3.00 | 0.78 | 0.38 | | | |

Ammonia Loading onto Two Column Zeolite System - Col 2 Effluent

| | | | | | | Column 2 Effluent | | | | | | |
| --- | --- | --- | --- | --- | --- | --- | --- | --- | --- | --- | --- | --- |
| Time | Flow rate | Bed Vol. | meq Na | meq dischar | meq $NH_3$ on Col 2 | meq Ca | meq Mg | meq K | meq Na | meq Ca on Col. 1 | meq Mg on Col. 1 | meq K on Col. 1 |
| 0 | 1.7 | 151 | 0 | 0 | 0 | 0 | 0 | 0 | 0 | 0 | 0 | 0 |
| 15 | 1.7 | 151 | 257.2 | 2.4 | 1.64 | 0.54 | 0.25 | 0.65 | 266.09 | 136.43 | 52.69 | 19.57 |
| 75 | 1.7 | 151 | 740.6 | 12.46 | 59.71 | 66.84 | 135.13 | 0.91 | 1148.61 | 422.03 | 86.41 | 87.39 |
| 135 | 1.7 | 151 | 1046.6 | 31.62 | 152.01 | 306.54 | 447.03 | 6.13 | 1734.0 | 595.43 | 94.84 | 139.57 |
| 195 | 1.7 | 151 | 1268.3 | 80.43 | 238.72 | 658.44 | 801.08 | 13.96 | 2221.83 | 707.63 | 86.41 | 183.91 |
| 255 | 1.7 | 151 | 1459.0 | 154.75 | 348.01 | 091.94 | 1146.7 | 27 | 2603.22 | 779.03 | 61.12 | 223.04 |
| 315 | 1.7 | 151 | 1618.7 | 251.65 | 412.12 | 1556.04 | 1458.6 | 42.65 | 2926.96 | 855.53 | 61.12 | 256.96 |
| 375 | 1.7 | 151 | 1756.2 | 355.11 | 447.82 | 2055.84 | 1770.5 | 63.52 | 3193.04 | 901.43 | 44.26 | 288.26 |
| 435 | 1.7 | 151 | 1871.5 | 474.59 | 480.62 | 586.24 | 2082.40 | 89.61 | 3414.78 | 952.43 | 35.83 | 316.96 |

| | | | Col 2 Effluent, mg/L | | | | | |
| --- | --- | --- | --- | --- | --- | --- | --- | --- |
| Time | Flow rate | Bed Vol. | Na | NH3 | Ca | Mg | K | Na |
| 0 | 1.7 | 151 | 232 | 1.32 | 0.42 | 0.12 | 1 | 240 |
| 15 | 1.7 | 151 | 232 | 1.32 | 0.42 | 0.12 | 1 | 240 |
| 75 | 1.7 | 151 | 109 | 1.38 | 13 | 16 | 0.1 | 199 |
| 135 | 1.7 | 151 | 69 | 2.63 | 47 | 37 | 2 | 132 |
| 195 | 1.7 | 151 | 50 | 6.7 | 69 | 42 | 3 | 110 |
| 255 | 1.7 | 151 | 43 | 10.2 | 85 | 41 | 5 | 86 |
| 315 | 1.7 | 151 | 36 | 13.3 | 91 | 37 | 6 | 73 |
| 375 | 1.7 | 151 | 31 | 14.2 | 98 | 37 | 8 | 60 |
| 435 | 1.7 | 151 | 26 | 16.4 | 104 | 37 | 10 | 50 |

TABLE 7

Summary of Loading and Effluent onto Columns One and Two

| bed vol | NH$_3$ | Ca | Mg | K | Na | Sum |
|---|---|---|---|---|---|---|
| Column 1 - Loading on Zeolite, meq/g | | | | | | |
| 0 | 0.000 | 0.000 | 0.000 | 0.000 | 0.000 | 0.000 |
| 10 | 0.025 | 0.079 | 0.030 | 0.011 | −0.143 | 0.003 |
| 51 | 0.098 | 0.244 | 0.050 | 0.051 | −0.401 | 0.042 |
| 92 | 0.144 | 0.344 | 0.055 | 0.081 | −0.555 | 0.070 |
| 133 | 0.175 | 0.409 | 0.050 | 0.106 | −0.660 | 0.081 |
| 173 | 0.178 | 0.451 | 0.035 | 0.129 | −0.747 | 0.046 |
| 214 | 0.195 | 0.495 | 0.035 | 0.149 | −0.816 | 0.057 |
| 255 | 0.229 | 0.521 | 0.026 | 0.167 | −0.873 | 0.069 |
| 296 | 0.261 | 0.551 | 0.021 | 0.183 | −0.918 | 0.098 |
| Column 2 - Loading on Zeolite, meq/g | | | | | | |
| 0 | 0.000 | 0.000 | 0.000 | 0.000 | 0.000 | 0.000 |
| 10 | 0.001 | 0.014 | 0.013 | 0.000 | −0.005 | 0.023 |
| 51 | 0.033 | 0.182 | 0.093 | 0.007 | −0.227 | 0.087 |
| 92 | 0.085 | 0.318 | 0.093 | 0.019 | −0.383 | 0.131 |
| 133 | 0.133 | 0.429 | 0.083 | 0.033 | −0.531 | 0.147 |
| 173 | 0.194 | 0.511 | 0.079 | 0.048 | −0.637 | 0.194 |
| 214 | 0.230 | 0.568 | 0.074 | 0.064 | −0.729 | 0.206 |
| 255 | 0.249 | 0.616 | 0.074 | 0.078 | −0.800 | 0.217 |
| 296 | 0.268 | 0.645 | 0.069 | 0.091 | −0.860 | 0.213 |
| Column 1 - Effluent, mg/L | | | | | | |
| 0 | 2.22 | 20 | 11 | 1 | 232 | |
| 10 | 2.22 | 20 | 11 | 1 | 232 | |
| 51 | 9.35 | 72 | 33 | 5 | 109 | |
| 92 | 15.3 | 95 | 37 | 10 | 69 | |
| 133 | 18.6 | 108 | 40 | 13 | 50 | |
| 173 | 25.2 | 114 | 40 | 15 | 43 | |
| 214 | 22.1 | 111 | 36 | 17 | 36 | |
| 255 | 19.1 | 115 | 37 | 18 | 31 | |
| 296 | 20.9 | 114 | 36 | 19 | 26 | |
| Column 2 Effluent, mg/L | | | | | | |
| 0 | 1.32 | 0.42 | 0.12 | 1 | 240 | |
| 10 | 1.32 | 0.42 | 0.12 | 1 | 240 | |

TABLE 7-continued

Summary of Loading and Effluent onto Columns One and Two

| bed vol | NH$_3$ | Ca | Mg | K | Na | Sum |
|---|---|---|---|---|---|---|
| 51 | 1.38 | 13 | 16 | 0.1 | 199 | |
| 92 | 2.63 | 47 | 37 | 2 | 132 | |
| 133 | 6.70 | 69 | 42 | 2 | 110 | |
| 173 | 10.2 | 85 | 41 | 3 | 86 | |
| 214 | 13.3 | 91 | 37 | 5 | 73 | |
| 255 | 14.2 | 98 | 37 | 6 | 60 | |
| 296 | 16.4 | 104 | 37 | 8 | 50 | |

The data in Example 2 illustrates the utility of the present invention for absorbing ammonia from an aqueous medium, in particular absorbing ammonia from an aqueous medium having a high concentration of calcium, sodium, potassium and magnesium.

Example 3

Sodium Zeolite Absorption of Ammonia from an Aqueous Medium Having High Concentrations of Calcium, Magnesium and Potassium The data in Example 3 was prepared in a manner similar to that shown in Example 2, except that the flow rate through the two columns was approximately 1.5 L/min and the medium was run over the columns for a total of 430 minutes. As noted in Tables 8 and 9, the ammonium concentration of column one effluent was 19.7 mg/L, while the concentration of ammonium of column two was approximately 14.7 mg/L.

Note that the slightly decreased flow rate of the aqueous medium results in a higher absorption of ammonia by the zeolite as compared to the same ammonia loading performed in Example 2. Again, as described in Example 2, a third column of zeolite is required to keep the ammonia levels below 1 mg/L over the course of the experiment.

TABLE 8

Ammonia Loading onto Two Column Zeolite System - Col 1 Effluent (low flow)

| | | | | | | | | Col 1 | | | |
|---|---|---|---|---|---|---|---|---|---|---|---|
| Time | Flow Rate | Bed Vol. | meq fed NH$_3$ | med feq Ca | meq fed Mg | meq fed K | meq fed Na | meq NH$_3$ | meq NH$_3$ of Col 1 | meq disch Ca | meq disch Mg | meq disch K |
| 0 | 1.5 | 150.8 | 0 | 0 | 0 | 0 | 0 | 0 | 0 | 0 | 0 | 0 |
| 10 | 1.5 | 150.8 | 29.6 | 95.3 | 44.6 | 10.7 | 5.94 | 0.193 | 29.38 | 12.75 | 9.55 | 0.038 |
| 70 | 1.5 | 150.8 | 203.1 | 662.3 | 312.4 | 75.2 | 41.54 | 30.99 | 172.2 | 377.3 | 255 | 6.944 |
| 130 | 1.5 | 150.8 | 370.3 | 1224 | 580.2 | 141.9 | 77.54 | 110.7 | 259.6 | 845.3 | 522.8 | 23.06 |
| 190 | 1.5 | 150.8 | 534.2 | 1782 | 847.9 | 208.7 | 113.5 | 203.9 | 330.3 | 1349 | 798 | 46.07 |
| 250 | 1.5 | 150.8 | 698.1 | 2332 | 1123 | 275.5 | 148.8 | 306.8 | 391.4 | 1880 | 1081 | 75.99 |
| 310 | 1.5 | 150.8 | 861.4 | 2872 | 1405 | 342.2 | 182.8 | 437.3 | 424.2 | 2420 | 1363 | 112.8 |
| 370 | 1.5 | 150.8 | 1024 | 3407 | 1696 | 408.9 | 216.1 | 576.1 | 447.9 | 2965 | 1638 | 152 |
| 430 | 1.5 | 150.8 | 1187 | 3938 | 1986 | 475.7 | 248.2 | 702.8 | 483.9 | 3536 | 1921 | 193.4 |

| | | | | | | | | Column 1 Effluent | | | |
|---|---|---|---|---|---|---|---|---|---|---|---|
| Col 1 wt | Col 2 wt | bed vol | Elap. Min. | Feed NH$_3$ mg/L | Feed Ca mg/L | Feed Mg mg/L | Feed K mg/L | Feed Na mg/L | NH$_3$ mg/L | Ca mg/L | Mg mg/L | K mg/L |
| 1729 | 1795 | 0 | 0 | 27.6 | 127 | 36 | 28 | 9.1 | 0.18 | 17 | 7.7 | 0.1 |
| 1729 | 1795 | 6 | 10 | 27.6 | 127 | 36 | 28 | 9.1 | 0.18 | 17 | 7.7 | 0.1 |
| 1729 | 1795 | 42 | 70 | 27 | 126 | 36 | 28 | 9.1 | 4.79 | 81 | 33 | 3 |
| 1729 | 1795 | 78 | 130 | 26 | 125 | 36 | 29 | 9.2 | 12.4 | 104 | 36 | 7 |
| 1729 | 1795 | 114 | 190 | 25.5 | 124 | 36 | 29 | 9.2 | 14.5 | 112 | 37 | 10 |
| 1729 | 1795 | 150 | 250 | 25.5 | 122 | 37 | 29 | 9 | 16 | 118 | 38 | 13 |
| 1729 | 1795 | 186 | 310 | 25.4 | 120 | 38 | 29 | 8.7 | 20.3 | 120 | 38 | 16 |

TABLE 8-continued

| 1729 | 1795 | 222 | 370 | 25.3 | 119 | 39 | 29 | 8.5 | 21.6 | 121 | 37 | 17 |
| 1729 | 1795 | 258 | 430 | 25.3 | 118 | 39 | 29 | 8.2 | 19.7 | 127 | 38 | 18 |

Ammonia Loading onto Two Column Zeolite System - Col 2 Effluent (low flow)

Col 2

| meq Na disch | meq NH$_3$ disch | meq NH$_3$ on col 2 | meq Ca disch | meq Mg disch | meq K disch | meq Na disch | meq Ca on Col 1 | meq Mg on col 1 | meq K on col 1 | meq Na on col 1 | meq Ca on col 2 | meq Mg on col 2 |
|---|---|---|---|---|---|---|---|---|---|---|---|---|
| 0 | 0 | 0 | 0 | 0 | 0 | 0 | 0 | 0 | 0 | 0 | 0 | 0 |
| 148.7 | 0.107 | 0.086 | 1.8 | 0.409 | 0.038 | 167.6 | 82.5 | 35.08 | 10.70 | −142 | 10.95 | 9.136 |
| 571.3 | 0.750 | 30.24 | 136.8 | 186.4 | 2.230 | 883.7 | 285 | 57.4 | 68.25 | −529 | 240.5 | 68.64 |
| 841.3 | 7.179 | 103.5 | 438.3 | 461.6 | 4.642 | 1369 | 379.5 | 57.4 | 118.8 | −763 | 406.9 | 61.20 |
| 1053 | 25.37 | 178.5 | 825.3 | 744.2 | 9.246 | 1760 | 433.5 | 49.96 | 162.6 | −939 | 523.9 | 53.76 |
| 1217 | 59.38 | 247.4 | 1266 | 1034 | 16.15 | 2085 | 451.5 | 42.52 | 199.5 | −999 | 613.9 | 46.32 |
| 1350 | 126.2 | 311.0 | 1739 | 1310 | 27.7 | 2371 | 451.5 | 42.52 | 229.4 | −999 | 681.5 | 53.76 |
| 1475 | 201.5 | 374.7 | 2238 | 1585 | 41.47 | 2609 | 442.5 | 57.34 | 257 | −999 | 726.5 | 53.76 |
| 1582 | 296 | 406.8 | 2796 | 1860 | 59.89 | 2810 | 402 | 64.84 | 282.3 | −999 | 740 | 61.20 |

Col 2 Effluent

| Na mg/L | NH$_3$ mg/L | Ca mg/L | Mg mg/L | K mg/L | Na mg/L |
|---|---|---|---|---|---|
| 228 | 0.1 | 2.4 | 0.33 | 0.1 | 257 |
| 228 | 0.1 | 2.4 | 0.33 | 0.1 | 257 |
| 108 | 0.1 | 30 | 25 | 1 | 183 |
| 69 | 1 | 67 | 37 | 1 | 124 |
| 54 | 2.83 | 86 | 38 | 2 | 100 |
| 42 | 5.29 | 98 | 39 | 3 | 83 |
| 34 | 10.4 | 105 | 37 | 5 | 73 |
| 32 | 11.7 | 111 | 37 | 6 | 61 |
| 27.5 | 14.7 | 124 | 37 | 8 | 51.3 |

TABLE 9

Summary of Loading and Effluent in Table 8

| bed vol. | NH$_3$ | Ca | Mg | K | Na | Sum |
|---|---|---|---|---|---|---|
| Column 1 - Loading of zeolite, meq/g ||||||| 
| 0 | 0 | 0 | 0 | 0 | 0 | 0 |
| 6 | 0.017 | 0.048 | 0.02 | 0.006 | −0.083 | 0.009 |
| 42 | 0.1 | 0.165 | 0.033 | 0.039 | −0.306 | 0.031 |
| 78 | 0.15 | 0.219 | 0.033 | 0.069 | −0.442 | 0.03 |
| 114 | 0.191 | 0.251 | 0.029 | 0.094 | −0.543 | 0.022 |
| 150 | 0.226 | 0.261 | 0.025 | 0.115 | −0.618 | 0.010 |
| 186 | 0.245 | 0.261 | 0.025 | 0.133 | −0.675 | −0.011 |
| 222 | 0.259 | 0.256 | 0.033 | 0.149 | −0.728 | −0.031 |
| 258 | 0.280 | 0.233 | 0.037 | 0.163 | −0.772 | −0.059 |
| Column 2 - Loading on zeolite, meq/g ||||||| 
| 0 | 0 | 0 | 0 | 0 | 0 | 0 |
| 6 | 0 | 0.006 | 0.005 | 0 | −0.011 | 0.001 |
| 42 | 0.017 | 0.134 | 0.038 | 0.003 | −0.174 | 0.018 |
| 78 | 0.058 | 0.227 | 0.034 | 0.01 | −0.294 | 0.035 |
| 114 | 0.099 | 0.292 | 0.03 | 0.021 | −0.394 | 0.048 |
| 150 | 0.138 | 0.342 | 0.026 | 0.033 | −0.484 | 0.055 |
| 186 | 0.173 | 0.380 | 0.03 | 0.047 | −0.569 | 0.062 |
| 222 | 0.209 | 0.405 | 0.03 | 0.062 | −0.632 | 0.073 |
| 258 | 0.227 | 0.412 | 0.034 | 0.074 | −0.684 | 0.064 |
| Column 1 - Effluent, mg/L ||||||| 
| 0 | 0.18 | 17 | 7.7 | 0.1 | 228 | |
| 6 | 0.18 | 17 | 7.7 | 0.1 | 228 | |
| 42 | 4.79 | 81 | 33 | 3 | 108 | |
| 78 | 12.4 | 104 | 36 | 7 | 69 | |
| 114 | 14.5 | 112 | 37 | 10 | 54 | |
| 150 | 16 | 118 | 38 | 13 | 42 | |
| 186 | 20.3 | 120 | 38 | 16 | 34 | |
| 222 | 21.6 | 121 | 37 | 17 | 32 | |
| 258 | 19.7 | 127 | 38 | 18 | 27.5 | |
| Column 2 - Effluent, mg/L ||||||| 
| 0 | 0.1 | 2.4 | 0.33 | 0.1 | 257 | |
| 6 | 0.1 | 2.4 | 0.33 | 0.1 | 257 | |
| 42 | 0.1 | 30 | 25 | 1 | 183 | |
| 78 | 1 | 67 | 37 | 1 | 124 | |
| 114 | 2.83 | 86 | 38 | 2 | 100 | |
| 150 | 5.29 | 98 | 39 | 3 | 83 | |
| 186 | 10.4 | 105 | 37 | 5 | 73 | |
| 222 | 11.7 | 111 | 37 | 6 | 61 | |
| 258 | 14.7 | 124 | 37 | 8 | 51.3 | |

The data in Example 3 again illustrates the utility of the present invention. Zeolite absorbs ammonia from an aqueous medium with high affinity, even in the presence of high concentrations of calcium, magnesium, and potassium.

Example 4

Calcium Zeolite Absorption of Ammonia from an Aqueous Medium Having High Concentrations of Calcium, Magnesium and Potassium The following Example illustrates that calcium treated zeolite provides an excellent column material for absorbing ammonia from an aqueous medium (see Table 10). One hundred grams of zeolite, 20×35 mesh, was contacted with a CaCl$_2$ solution (20 grams dissolved into 1,000 ml demineralized water) overnight. The CaCl$_2$ treated zeolite was moved to a column where fines and clays were removed and the zeolite weight determined.

A flow rate of 4 ml/min ammonia sample was passed over the zeolite column and samples of the column discharge taken every one hour (composite samples submitted for testing). A dissolved eluant containing 438 grams $CaCl_2$ in 2000 mls demineralized water, pH of 10 (adjusted with NaOH) was used to elute zeolite at a solution flow rate of 5 ml/min. Discharged volumes were collected using the following formula: Z3-A=0–300 ml, Z3-B=300–600 ml, Z3-C=600–900 ml, Z3-D=900–1500, Z3-E=1500–2000 ml, Z3-E=1500–2000 ml.

TABLE 10

Calcium Form Zeolite Absorption of Ammonia

| ID | Day | Vol | Analysis, mg/L ||||| Zeolite loading, meq/g ||||| $NH_3$ grab feed/dis | % Elu |
|----|-----|-----|----|----|----|----|-----|----|----|----|----|-----|------|-----|
|    |     |     | Ca | Mg | K | Na | $NH_3$ | Ca | Mg | K | Na | $NH_3$ | | |
| Z3 | 0 | feed | 97 | 22 | 34 | .67 | 30.2 | | | | | | | |
| Z3 | 1 | 5010 | 41 | .65 | 2.2 | 140 | 1.63 | .14 | .09 | .04 | -.3 | .08 | 29.6/ | |
| Z3 | 2 | 4760 | 110 | 5.8 | 2.7 | 49 | 7.64 | .11 | .15 | .08 | -.4 | .15 | 27.8/11.8 | |
| Z3 | 3 | 6450 | 90 | 13 | 3.2 | 16 | 17.2 | .13 | .2 | .13 | -.45 | .186 | 27.8/21 | |
| Z3 | 4 | 4820 | 81 | 16 | 4.9 | 3.7 | 24.5 | .17 | .22 | .17 | -.45 | .195 | 28.8/24.1 | |
| Began Elution |||||||||||||||
| -A | 6 | 300 | high | 120 | 110 | 14 | 204 | | .19 | .16 | -.45 | .16 | /184 | 18 |
| -B | 6 | 300 | high | 29 | 110 | .7 | 186 | | .19 | .15 | -.45 | .13 | /148 | 35 |
| -C | 6 | 300 | high | 23 | 96 | 4.3 | 166 | | .18 | .14 | -.46 | .1 | /186 | 50 |
| -D | 6 | 500 | high | 17 | 85 | 3.7 | 111 | | .17 | .13 | -.46 | .065 | /67 | 67 |
| -E | 6 | 500 | high | 13 | 76 | 3.7 | 67.7 | | .17 | .12 | -.46 | .045 | /59 | 77 |
| -F | 14 | 500 | high | 29 | 110 | 22 | 69 | | .16 | .11 | -.46 | .025 | /41 | 87 |
| -G | 14 | 500 | high | 5.7 | 110 | 61 | 32 | | .15 | .09 | -.47 | .015 | /32 | 92 |
| -H | 14 | 500 | high | 4.6 | 120 | 100 | 17 | | .15 | .08 | -.5 | .01 | /18 | 95 |
| Second Cycle |||||||||||||||
| Z3 | 15 | feed | 92 | 26 | 38 | 45 | 51.7 | | | | | | /5.5 | |
| Z3 | 15 | 4860 | 180 | .5 | 9 | 31 | 22.3 | -.2 | .1 | .04 | .03 | .08 | 47.6/ | |
| Z3 | 16 | 6900 | 140 | 5 | 11 | 56 | 29 | -.38 | .22 | .08 | 0 | .16 | 41.7/32.4 | |
| Z3 | 17 | 6350 | 110 | 17 | 13 | 56 | 34.4 | -.44 | .27 | .12 | -.03 | .19 | 41.3/36.6 | |
| Z3 | 20 | 9999 | 108 | 18 | 19 | 60 | 36 | -.6 | .39 | .22 | -.16 | .25 | 39.1/33.8 | |
| Z3 | 21 | 1500 | 79 | 18 | 23 | 54 | 36.6 | -.6 | .4 | .22 | -.16 | .25 | 37.7/33.3 | |
| Began Elution -45° C. |||||||||||||||
| -F | | 300 | | 170 | 490 | 420 | 276 | | .36 | .18 | -.22 | .2 | | 20 |
| -G | | 340 | | 36 | 660 | 200 | 282 | | .35 | .13 | -.25 | .143 | | 42 |
| -H | | 260 | | 22 | 540 | 140 | 172 | | .34 | .09 | -.26 | .117 | | 53 |
| -I | | 470 | | 14 | 390 | 130 | 102 | | .33 | .04 | -.29 | .089 | | 64 |
| -J | | 300 | | 9 | 330 | 140 | 51 | | .33 | .02 | -.31 | .08 | | 68 |
| -K | | 570 | | 6.3 | 230 | 130 | 37 | | .33 | -.01 | -.34 | .07 | | 73 |
| -L | | 580 | | 3.1 | 180 | 120 | 15 | | .33 | -.04 | -.37 | .062 | | 75 |
| -M | | 590 | | 2.4 | 160 | 130 | 15 | | .33 | -.07 | -.40 | .057 | | 77 |

Table 11 illustrates a second test as above, however, the zeolite was eluted using a calcium concentration of 34.3 g/L. Sample IDs are the same as above, and assume 5 ppm $NH_3$ blank on strip.

TABLE 11

Calcium Form Zeolite Absorption of Ammonia

| ID | Day | Vol | Analysis, mg/L ||||| Zeolite Loading, meq/g ||||| $NH_3$ Feed/Dis | $NH_3$ Elut |
|----|-----|-----|----|----|----|----|-----|----|----|----|----|-----|------|-----|
|    |     |     | Ca | Mg | K | Na | $NH_3$ | Ca | Mg | K | Na | $NH_3$ | | |
| Z5 | wash | 350 | 12000 | 1.6 | 28 | 40 | 7 | | .325 | -.07 | -.4 | 0.6 | | |
|    | feed | | 92 | 37 | 34 | 54 | 34 | 0 | 0 | 0 | | .01 | 34/ | |
|    | 1 | 6050 | 190 | 2 | 8.2 | 38 | 7.6 | -.3 | .17 | .04 | .04 | .1 | 33.3/ | |
|    | 2 | 6450 | 140 | 21 | 8 | 53 | 18.2 | -.4 | .26 | .08 | .04 | .16 | 32.7/ | |
|    | 3 | 6400 | 110 | 29 | 8.9 | 54 | 28 | -.5 | .3 | .12 | .04 | .18 | 33.4/ | |
|    | 4 | 6100 | 110 | 31 | 9.6 | 58 | 30.4 | -.6 | .33 | .16 | .03 | .19 | 32.7/31 | |
|    | wash | 200 | 64 | 19 | 5.8 | 34 | 23.6 | | | | | | | |
| -H | | recyl strip | 15000 | 20 | 240 | 120 | | | | | | | | |

TABLE 11-continued

Calcium Form Zeolite Absorption of Ammonia

| ID | Day | Vol | Analysis, mg/L | | | | | Zeolite Loading, meq/g | | | | | $NH_3$ Feed/ Dis | $NH_3$ Elut |
|---|---|---|---|---|---|---|---|---|---|---|---|---|---|---|
| | | | Ca | Mg | K | Na | $NH_3$ | Ca | Mg | K | Na | $NH_3$ | | |
| -A | 4 | 300 | 9500 | 230 | 47 | 220 | 76 | | 0.28 | 0.18 | 0.02 | 0.177 | /95 | 7 |
| -B | | 300 | 14000 | 590 | 100 | 200 | 98 | | 0.27 | 0.19 | 0.01 | 0.161 | /102 | 15 |
| -C | | 300 | 14000 | 42 | 100 | 160 | 87 | | 0.26 | 0.2 | 0.01 | 0.146 | | 23 |
| -D | 6 | 500 | 15000 | 76 | 130 | 150 | 81 | | 0.24 | 0.21 | 0 | 0.124 | /80 | 35 |
| -E | | 500 | 15000 | 39 | 140 | 130 | 71 | | 0.23 | 0.23 | 0 | 0.1 | /73 | 45 |
| -F | | 500 | 15000 | 29 | 150 | 120 | 52 | | 0.23 | 0.24 | 0 | 0.09 | /43 | 52 |
| -G | 8 | 500 | 15000 | 37 | 150 | 120 | 42 | | 0.22 | 0.25 | 0 | 0.08 | /34 | 58 |
| -I | | 500 | 15000 | 12 | 78 | 100 | 39 | | 0.23 | 0.27 | 0 | 0.07 | | 63 |
| -J | | 500 | 14000 | 11 | 83 | 100 | 18 | | 0.23 | 0.29 | 0.01 | 0.07 | | 65 |
| -K | | 960 | 15000 | 11 | 110 | 110 | 20 | | 0.24 | 0.32 | 0.01 | 0.06 | | 70 |
| -L | wash | 300 | 5900 | 10 | 50 | 52 | 0.24 | | | 0.32 | 0.01 | | | |
| | | | | | | | Second cycle | | | | | | | |
| Z5 | | feed | 69 | 23 | 28 | 42 | 43.9 | | | | | | 43.9/ | |
| | 10 | 6150 | 140 | 3.6 | 15 | 30 | 16.8 | -.2 | .33 | .34 | .04 | .16 | 45.8/ | |
| | 11 | 6600 | 94 | 18 | 25 | 52 | 30.2 | -.3 | .36 | .35 | .01 | .22 | 44.9/ | |
| | 15 | 6150 | 86 | 20 | 24 | 48 | 29.2 | -.4 | .38 | .35 | -.01 | .27 | 44.8/31 | |
| | 16 | 6150 | 71 | 23 | 23 | 51 | 34.3 | -.4 | .38 | .36 | -.03 | .31 | 44.4/32 | |
| Elution | | recy strip | 15000 | 11 | 120 | | | | | 110 | | | | |
| -II | 42 g/l | 310 | | 17 | 200 | 250 | 182 | | .38 | .34 | | .26 | | 16 |
| -JJ | $CaCl_2$ | 410 | | 27 | 190 | 160 | 171 | | .37 | .33 | | .22 | | 30 |
| -KK | | 280 | | 20 | 180 | 120 | 146 | | .37 | .33 | | .2 | | 37 |
| -LL | | 300 | | 18 | 170 | 110 | 149 | | .37 | .32 | | .17 | | 46 |
| M | | 500 | | 32 | 160 | 110 | 143 | | .36 | .32 | | .12 | | 59 |
| N | | 500 | | 15 | 140 | 100 | 119 | | .35 | .32 | | .09 | | 71 |
| O | | 300 | | 13 | 130 | 100 | 99 | | .35 | .31 | | .22 | | 76 |
| P | | 340 | | 13 | 120 | 100 | 96 | | .35 | .31 | | .07 | | 82 |
| Q | | 280 | | 13 | 120 | 100 | 67 | | .35 | .31 | | .06 | | 86 |
| S | | 500 | | 21 | 120 | 110 | 49 | | .35 | .31 | | .04 | | 90 |
| T | | 500 | | 10 | 140 | 110 | 49 | | .34 | .3 | | .03 | | 95 |
| U | | 520 | | 4.1 | 140 | 74 | 41 | | .34 | .28 | | .02 | | 99 |
| V | | 505 | | 3.6 | 140 | 64 | 33 | | .34 | .26 | | .02 | | 102 |
| X | | 440 | | 3.2 | 140 | 63 | 26 | | .34 | .25 | | .003 | | 104 |
| Y | | 500 | | 9.7 | 140 | 71 | 25 | | .33 | .23 | | | | 107 |
| Z | | 500 | | 2.4 | 130 | 62 | 17 | | .33 | .21 | | | | 108 |

Example 5

Sodium Zeolite Absorption of Ammonia in a Five-Column Configuration, Including Migration of Zeolite FIGS. 7A to 7H illustrate a five-column run on a natural supply of aqueous medium located in Colorado City, Colo. The initial concentration of target materials in the aqueous medium was approximately 97 mg/L calcium, 14 mg/L magnesium, 19 mg/L potassium, 16 mg/L sodium, 29 mg/L ammonia (note that these values fluctuate slightly due to the natural source feed). The run was performed at a flow rate of approximately 1.1 L/minute for a period of approximately 24.5 hours. As can be seen in FIG. 7, the concentration of ammonia in the column 5 effluent is at all times less than 1 mg/L, indicating that the five-column configuration a the above mentioned flow rate is effective in removing ammonia from an aqueous medium to levels less than the acceptable discharge levels set by the EPA.

The zeolite was counter-current migrated throughout the course of the experiment. Note that the zeolite in column one was regenerated after day three, i.e., passed through a brine solution, and re-connected to the system after column five. The concentration of the regenerated column one effluent is lower than the column five effluent, indicating that the regenerated column one is still effective at removing even low concentrations of ammonia.

The present Example illustrates the utility of the present invention for removing ammonia from an aqueous medium—especially with regard to using a counter-current migration of zeolite.

Example 6

Sodium Zeolite Absorption of Ammonia in a Five-Column Configuration Including Migration of Zeolite Table 12 illustrates results from a five-column run on a natural supply of aqueous medium located in Burley, Id. The initial concentration of the aqueous medium was approximately 58 mg/L calcium, 14 mg/L magnesium, 25 mg/L potassium, 12.6 mg/L ammonia and 150 mg/L sodium. As in Example 5, the values tended to fluctuate due to the natural source of the feed. The flow rate for the run was approximately 1.7 L/minute over a period of 455 minutes.

The results show that the concentration of ammonia in the column 5 effluent (discharge) was at all times less than 1 mg/L ammonia, indicating that a five-column configuration at the above mentioned flow rate was effective at removing ammonia from this particular water source.

TABLE 12

Five Column Run at Burley Idaho, Feed

| Day | Elapsed Time | Cum. Time Minutes | Rate | Bed Vol. | Cum BV | Feed, mg/L Ca | Mg | K | NH$_3$ | Na |
|---|---|---|---|---|---|---|---|---|---|---|
| 1 | 13:50 | 0 | 0 | 1700 | | | 58 | 14 | 25 | 12.6 | 150 |
| 1 | 15:00 | 70 | 70 | 1700 | 64 | 64 | 58 | 14 | 25 | 12.6 | 150 |
|   | 15:55 | 125 | 125 | 1700 | 51 | 115 | 58 | 14 | 25 | 12.6 | 150 |
| 2 | 9:00 | 0 | 125 | 1700 | 0 | 115 | 59 | 14 | 25 | 14.9 | 145 |
| 2 | 10:00 | 60 | 185 | 1700 | 55 | 170 | 59 | 14 | 25 | 14.9 | 145 |
|   | 12:00 | 120 | 305 | 1700 | 110 | 280 | 61 | 14 | 25 | 14 | 135 |
|   | 14:00 | 120 | 425 | 1700 | 110 | 391 | 60 | 14 | 25 | 14 | 140 |
|   | 14:30 | 30 | 455 | 1700 | 28 | 418 | 60 | 14 | 25 | 14 | 140 |

| Day | Time | Elapsed Time | Cum. Minutes | Rate | Liters | meq fed to circuit Ca | Mg | K | NH$_3$ | Na |
|---|---|---|---|---|---|---|---|---|---|---|
| 1 | 13:50 | 0 | 0 | 1700 | 0 | | | | | |
| 1 | 15:00 | 70 | 70 | 1700 | 119 | 345 | 69 | 76 | 88 | 776 |
|   | 15:55 | 55 | 125 | 1700 | 93.5 | 271 | 54 | 60 | 69 | 610 |
| 2 | 9:00 | 0 | 125 | 1700 | 0 | 0 | 0 | 0 | 0 | 0 |
| 2 | 10:00 | 60 | 185 | 1700 | 102 | 301 | 59 | 65 | 89 | 643 |
|   | 12:00 | 120 | 305 | 1700 | 204 | 622 | 118 | 130 | 168 | 1197 |
|   | 14:00 | 120 | 425 | 1700 | 204 | 612 | 118 | 130 | 168 | 1242 |
|   | 14:30 | 30 | 455 | 1700 | 51 | 153 | 29 | 33 | 42 | 310 |
| 1 | 13:50 | 0 | 0 | | | | | | | |
| 1 | 15:00 | 70 | 70 | | | | | | | |
|   | 15:55 | 55 | 125 | | | | | | | |
| 2 | 9:00 | 0 | 125 | | | | | | | |
| 2 | 10:00 | 60 | 185 | | | | | | | |
|   | 12:00 | 120 | 305 | | | | | | | |
|   | 14:00 | 120 | 425 | | | | | | | |
|   | 14:30 | 30 | 455 | | | | | | | |
| 1 | 13:50 | 0 | 0 | | | | | | | |
| 1 | 15:00 | 70 | 70 | | | | | | | |
|   | 15:55 | 55 | 125 | | | | | | | |
| 2 | 9:00 | 0 | 125 | | | | | | | |
| 2 | 10:00 | 60 | 185 | | | | | | | |
|   | 12:00 | 120 | 305 | | | | | | | |
|   | 14:00 | 120 | 425 | | | | | | | |
|   | 14:30 | 30 | 455 | | | | | | | |

Five Column Run at Burley Idaho - Col. 1 discharge, mg/L

| Day | Elapsed Time | Cum. Time Minutes | Rate | Bed Vol. | Cum BV | Column 1 Discharge, mg/L Ca | Mg | K | NH$_3$ | Na |
|---|---|---|---|---|---|---|---|---|---|---|
| 1 | 13:50 | 0 | 0 | 1700 | | | | | | | |
| 1 | 15:00 | 70 | 70 | 1700 | 64 | 64 | 12 | 12 | 2 | 1.33 | 240 |
|   | 15:55 | 125 | 125 | 1700 | 51 | 115 | 12 | 12 | 2 | 1.33 | 240 |
| 2 | 9:00 | 0 | 125 | 1700 | 0 | 115 | | | | | |
| 2 | 10:00 | 60 | 185 | 1700 | 55 | 170 | | | | | |
|   | 12:00 | 120 | 305 | 1700 | 110 | 280 | | | | | |
|   | 14:00 | 120 | 425 | 1700 | 110 | 391 | | | | | |
|   | 14:30 | 30 | 455 | 1700 | 28 | 418 | | | | | |

| Day | Time | Elapsed Time | Cum. Minutes | Rate | Liters | meq discharging Column 1 Ca | Mg | K | NH$_3$ | Na |
|---|---|---|---|---|---|---|---|---|---|---|
| 1 | 13:50 | 0 | 0 | 1700 | 0 | | | | | |
| 1 | 15:00 | 70 | 70 | 1700 | 119 | 71 | 59 | 6.1 | 9.3 | 1242 |
|   | 15:55 | 55 | 125 | 1700 | 93.5 | 56 | 46 | 4.8 | 7.3 | 976 |
| 2 | 9:00 | 0 | 125 | 1700 | 0 | | | | | |
| 2 | 10:00 | 60 | 185 | 1700 | 102 | | | | | |
|   | 12:00 | 120 | 305 | 1700 | 204 | | | | | |
|   | 14:00 | 120 | 425 | 1700 | 204 | | | | | |
|   | 14:30 | 30 | 455 | 1700 | 51 | | | | | |

| Day | Time | Elapsed Time | Cum. Minutes | Ca | Mg | K | NH$_3$ | Na |
|---|---|---|---|---|---|---|---|---|
| 1 | 13:50 | 0 | 0 | Net Loading on Column 1 | | | | |
| 1 | 15:00 | 70 | 70 | 0 | 0 | 0 | 0 | 0 |
|   | 15:55 | 55 | 125 | 274 | 10 | 70 | 79 | −466 |
| 2 | 9:00 | 0 | 125 | 215 | 7.7 | 55 | 62 | −366 |

TABLE 12-continued

| Day | Time | | | | | | | | | |
|---|---|---|---|---|---|---|---|---|---|---|
| 2 | 10:00 | 60 | 185 | | | | | | | |
|   | 12:00 | 120 | 305 | | | | | | | |
|   | 14:00 | 120 | 425 | | | | | | | |
|   | 14:30 | 30 | 455 | | | | | | | |
| 1 | 13:50 | 0 | 0 | | | | | | | |
| 1 | 15:00 | 70 | 70 | | Cumulative Loading on Column 1 | | | | | |
|   | 15:55 | 55 | 125 | 0 | 0 | 0 | 0 | 0 | | |
| 2 | 9:00 | 0 | 125 | 274 | 10 | 70 | 79 | −466 | | |
| 2 | 10:00 | 60 | 185 | 489 | 17 | 125 | 141 | −832 | | |
|   | 12:00 | 120 | 305 | | | | | | | |
|   | 14:00 | 120 | 425 | | | | | | | |
|   | 14:30 | 30 | 455 | | | | | | | |

Five Column Run at Burley Idaho - Col. 2 discharge, mg/L

| Day | Time | Elapsed Time | Cum. Minutes | Rate | Bed Vol. | Cum BV | Ca | Mg | K | $NH_3$ | Na |
|---|---|---|---|---|---|---|---|---|---|---|---|
| 1 | 13:50 | 0 | 0 | 1700 | | | | | | | |
| 1 | 15:00 | 70 | 70 | 1700 | 64 | 64 | <1 | <2 | 2 | 0.8 | 290 |
|   | 15:55 | 125 | 125 | 1700 | 51 | 115 | <1 | <2 | 2 | 0.8 | 290 |
| 2 | 9:00 | 0 | 125 | 1700 | 0 | 115 | | | | | |
| 2 | 10:00 | 60 | 185 | 1700 | 55 | 170 | 19 | 18 | 3 | 2.3 | 215 |
|   | 12:00 | 120 | 305 | 1700 | 110 | 280 | 40 | 16 | 7 | 5.8 | 180 |
|   | 14:00 | 120 | 425 | 1700 | 110 | 391 | 50 | 14 | 11 | 9.1 | 165 |
|   | 14:30 | 30 | 455 | 1700 | 28 | 418 | 50 | 14 | 11 | 9.1 | 165 |

| Day | Time | Elapsed Time | Cum. Minutes | Rate | Cum. Liters | meq discharging Column 2 | | | | |
|---|---|---|---|---|---|---|---|---|---|---|
| | | | | | | Ca | Mg | K | $NH_3$ | Na |
| 1 | 13:50 | 0 | 0 | 1700 | 0 | 6 | 9.8 | 6.1 | 5.6 | 1500 |
| 1 | 15:00 | 70 | 70 | 1700 | 119 | 4.7 | 7.7 | 4.8 | 4.4 | 1179 |
|   | 15:55 | 55 | 125 | 1700 | 93.5 | 0 | 0 | 0 | 0 | 0 |
| 2 | 9:00 | 0 | 125 | 1700 | 0 | 97 | 76 | 7.8 | 14 | 953 |
| 2 | 10:00 | 60 | 185 | 1700 | 102 | 408 | 134 | 37 | 70 | 1597 |
|   | 12:00 | 120 | 305 | 1700 | 204 | 510 | 118 | 57 | 109 | 1463 |
|   | 14:00 | 120 | 425 | 1700 | 204 | 128 | 29 | 14 | 27 | 366 |
|   | 14:30 | 30 | 455 | 1700 | 51 | | | | | |

Net Loading on Column 2

| Day | Time | Elapsed Time | Cum. Minutes | Ca | Mg | K | $NH_3$ | Na |
|---|---|---|---|---|---|---|---|---|
| 1 | 13:50 | 0 | 0 | 0 | 0 | 0 | 0 | 0 |
| 1 | 15:00 | 70 | 70 | 65 | 49 | 0 | 3.7 | −259 |
|   | 15:55 | 55 | 125 | 51 | 38 | 0 | 2.9 | −203 |
| 2 | 9:00 | 0 | 125 | 0 | 0 | 0 | 0 | 0 |
| 2 | 10:00 | 60 | 185 | 204 | −17 | 57 | 76 | −310 |
|   | 12:00 | 120 | 305 | 214 | −17 | 94 | 98 | −399 |
|   | 14:00 | 120 | 425 | 102 | 0 | 73 | 59 | −222 |
|   | 14:30 | 30 | 455 | 26 | 0 | 18 | 15 | −55 |

Cumulative Loading on Column 2

| Day | Time | Elapsed Time | Cum. Minutes | Ca | Mg | K | $NH_3$ | Na |
|---|---|---|---|---|---|---|---|---|
| 1 | 13:50 | 0 | 0 | 0 | 0 | 0 | 0 | 0 |
| 1 | 15:00 | 70 | 70 | 65 | 49 | 0 | | |
|   | 15:55 | 55 | 125 | 117 | 87 | 0 | | |
| 2 | 9:00 | 0 | 125 | 117 | 87 | 0 | | |
| 2 | 10:00 | 60 | 185 | 321 | 71 | 57 | | |
|   | 12:00 | 120 | 305 | 535 | 54 | 151 | | |
|   | 14:00 | 120 | 425 | 637 | 54 | 224 | | |
|   | 14:30 | 30 | 455 | 663 | 54 | 243 | | |

Five Column Run at Burley Idaho - Col. 3 discharge, mg/L

| Day | Time | Elapsed Time | Cum. Minutes | Rate | Bed Vol. | Cum BV | Ca | Mg | K | $NH_3$ | Na |
|---|---|---|---|---|---|---|---|---|---|---|---|
| 1 | 13:50 | 0 | 0 | 1700 | | | | | | | |
| 1 | 15:00 | 70 | 70 | 1700 | 64 | 64 | <1 | <2 | 2 | 1.05 | 295 |
|   | 15:55 | 125 | 125 | 1700 | 51 | 115 | <1 | <2 | 2 | 1.05 | 295 |
| 2 | 9:00 | 0 | 125 | 1700 | 0 | 115 | | | | | |

TABLE 12-continued

| Day | Time | Elapsed Time | Cum. Minutes | Rate | Liters | Ca | Mg | K | NH₃ | Na |
|---|---|---|---|---|---|---|---|---|---|---|
| 2 | 10:00 | 60 | 185 | 1700 | 55 | 170 | 1 | <2 | 1 | 1.2 | 280 |
|  | 12:00 | 120 | 305 | 1700 | 110 | 280 | 13 | 16 | 2 | 1.7 | 215 |
|  | 14:00 | 120 | 425 | 1700 | 110 | 391 | 33 | 16 | 3 | 2.9 | 190 |
|  | 14:30 | 30 | 455 | 1700 | 28 | 418 | 33 | 16 | 3 | 2.9 | 190 |

| | | | Cum. | | | meq discharging Column 3 | | | | |
|---|---|---|---|---|---|---|---|---|---|---|
| Day | Time | Elapsed Time | Minutes | Rate | Liters | Ca | Mg | K | NH₃ | Na |
| 1 | 13:50 | 0 | 0 | 1700 | 0 | 6 | 9.8 | 6.1 | 7.4 | 1526 |
| 1 | 15:00 | 70 | 70 | 1700 | 119 | 4.7 | 7.7 | 4.8 | 5.8 | 1199 |
|  | 15:55 | 55 | 125 | 1700 | 93.5 | 0 | 0 | 0 | 0 | 0 |
| 2 | 9:00 | 0 | 125 | 1700 | 0 | 5.1 | 8.4 | 2.6 | 7.2 | 1242 |
| 2 | 10:00 | 60 | 185 | 1700 | 102 | 133 | 134 | 10 | 20 | 1907 |
|  | 12:00 | 120 | 305 | 1700 | 204 | 337 | 134 | 16 | 35 | 1685 |
|  | 14:00 | 120 | 425 | 1700 | 204 | 84 | 34 | 3.9 | 8.7 | 421 |
|  | 14:30 | 30 | 455 | 1700 | 51 | | | | | |

| | | | | Net Loading on Column 3 | | | | |
|---|---|---|---|---|---|---|---|---|
| Day | Time | Elapsed Time | Cum. Minutes | Ca | Mg | K | NH₃ | Na |
| 1 | 13:50 | 0 | 0 | 0 | 0 | 0 | 0 | 0 |
| 1 | 15:00 | 70 | 70 | 0 | 0 | 0 | −1.8 | −26 |
|  | 15:55 | 55 | 125 | 0 | 0 | 0 | −1.4 | −20 |
| 2 | 9:00 | 0 | 125 | 0 | 0 | 0 | 0 | 0 |
| 2 | 10:00 | 60 | 185 | 92 | 67 | 5.2 | 6.6 | −288 |
|  | 12:00 | 120 | 305 | 275 | 0 | 26 | 49 | −310 |
|  | 14:00 | 120 | 425 | 173 | −17 | 42 | 74 | −222 |
|  | 14:30 | 30 | 455 | 43 | −4.2 | 10 | 19 | −55 |

| | | | | Cumulative Loading on Column 3 | | | | |
|---|---|---|---|---|---|---|---|---|
| Day | Time | Elapsed Time | Cum. Minutes | Ca | Mg | K | NH₃ | Na |
| 1 | 13:50 | 0 | 0 | 0 | 0 | 0 | 0 | 0 |
| 1 | 15:00 | 70 | 70 | 0 | 0 | 0 | −1.8 | −26 |
|  | 15:55 | 55 | 125 | 0 | 0 | 0 | −3.1 | −46 |
| 2 | 9:00 | 0 | 125 | 0 | 0 | 0 | −3.1 | −46 |
| 2 | 10:00 | 60 | 185 | 92 | 67 | 5.2 | 3.5 | −334 |
|  | 12:00 | 120 | 305 | 367 | 67 | 31 | 53 | −645 |
|  | 14:00 | 120 | 425 | 541 | 50 | 73 | 127 | −867 |
|  | 14:30 | 30 | 455 | 584 | 46 | 83 | 146 | −922 |

Five Column Run at Burley Idaho - Col. 4 discharge, mg/L

| | | Elapsed | Cum. | | Bed | Cum | Column 4 Discharge, mg/L | | | | |
|---|---|---|---|---|---|---|---|---|---|---|---|
| Day | Time | Time | Minutes | Rate | Vol. | BV | Ca | Mg | K | NH₃ | Na |
| 1 | 13:50 | 0 | 0 | 1700 | | | | | | | |
| 1 | 15:00 | 70 | 70 | 1700 | 64 | 64 | <1 | <2 | 2 | 1.01 | 295 |
|  | 15:55 | 125 | 125 | 1700 | 51 | 115 | <1 | <2 | 2 | 1.01 | 295 |
| 2 | 9:00 | 0 | 125 | 1700 | 0 | 115 | | | | | |
| 2 | 10:00 | 60 | 185 | 1700 | 55 | 170 | <1 | <2 | 1 | 1.1 | 290 |
|  | 12:00 | 120 | 305 | 1700 | 110 | 280 | 2 | 16 | 1 | 1 | 235 |
|  | 14:00 | 120 | 425 | 1700 | 110 | 391 | 10 | 18 | 1 | 1.3 | 220 |
|  | 14:30 | 30 | 455 | 1700 | 28 | 418 | 10 | 18 | 1 | 1.3 | 220 |

| | | | Cum. | | | meq discharging Column 4 | | | | |
|---|---|---|---|---|---|---|---|---|---|---|
| Day | Time | Elapsed Time | Minutes | Rate | Liters | Ca | Mg | K | NH₃ | Na |
| 1 | 13:50 | 0 | 0 | 1700 | 0 | 6 | 9.8 | 6.1 | 7.1 | 1526 |
| 1 | 15:00 | 70 | 70 | 1700 | 119 | 4.7 | 7.7 | 4.8 | 5.6 | 1199 |
|  | 15:55 | 55 | 125 | 1700 | 93.5 | 0 | 0 | 0 | 0 | 0 |
| 2 | 9:00 | 0 | 125 | 1700 | 0 | 5.1 | 8.4 | 2.6 | 6.6 | 1286 |
| 2 | 10:00 | 60 | 185 | 1700 | 102 | 20 | 134 | 5.2 | 12 | 2084 |
|  | 12:00 | 120 | 305 | 1700 | 204 | 102 | 151 | 5.2 | 16 | 1951 |
|  | 14:00 | 120 | 425 | 1700 | 204 | 26 | 38 | 1.3 | 3.9 | 488 |
|  | 14:30 | 30 | 455 | 1700 | 51 | | | | | |

| Day | Time | Elapsed Time | Cum. Minutes | Ca | Mg | K | NH₃ | Na |
|---|---|---|---|---|---|---|---|---|
| | | | | Net Loading on Column 4 | | | | |
| 1 | 13:50 | 0 | 0 | | | | | |
| 1 | 15:00 | 70 | 70 | 0 | 0 | 0 | 0 | 0 |
|  | 15:55 | 55 | 125 | 0 | 0 | 0 | 0.3 | 0 |

TABLE 12-continued

| Day | Time | Elapsed Time | Cum. Minutes | Ca | Mg | K | NH₃ | Na |
|---|---|---|---|---|---|---|---|---|
| 2 | 9:00 | 0 | 125 | 0 | 0 | 0 | 0.2 | 0 |
| 2 | 10:00 | 60 | 185 | 0 | 0 | 0 | 0 | −44 |
|   | 12:00 | 120 | 305 | 0 | 0 | 0 | 0.6 | −177 |
|   | 14:00 | 120 | 425 | 112 | 0 | 5.2 | 8.4 | −266 |
|   | 14:30 | 30 | 455 | 235 | −17 | 10 | 19 | −67 |

| | | | | Cumulative Loading on Column 4 | | | | |
|---|---|---|---|---|---|---|---|---|
| Day | Time | Elapsed Time | Cum. Minutes | Ca | Mg | K | NH₃ | Na |
| 1 | 13:50 | 0 | 0 | 0 | 0 | 0 | 0 | 0 |
| 1 | 15:00 | 70 | 70 | 0 | 0 | 0 | 0.3 | 0 |
|   | 15:55 | 55 | 125 | 0 | 0 | 0 | 0.5 | 0 |
| 2 | 9:00 | 0 | 125 | 0 | 0 | 0 | 0.5 | 0 |
| 2 | 10:00 | 60 | 185 | 0 | 0 | 0 | 1.1 | −44 |
|   | 12:00 | 120 | 305 | 112 | 0 | 5.2 | 9.5 | −222 |
|   | 14:00 | 120 | 425 | 347 | −17 | 16 | 29 | −488 |
|   | 14:30 | 30 | 455 | 405 | −21 | 18 | 34 | −554 |

Five Column Run at Burley Idaho - Col. 5 discharge, mg/L

| | | | | | | Column 4 Discharge, mg/L | | | | |
|---|---|---|---|---|---|---|---|---|---|---|
| Day | Time | Elapsed Time | Cum. Minutes | Rate | Bed Vol. | Cum BV | Ca | Mg | K | NH₃ | Na |
| 1 | 13:50 | 0 | 0 | 1700 | | | | | | | |
| 1 | 15:00 | 70 | 70 | 1700 | 64 | 64 | | | | | |
|   | 15:55 | 125 | 125 | 1700 | 51 | 115 | | | | | |
| 2 | 9:00 | 0 | 125 | 1700 | 0 | 115 | | | | | |
| 2 | 10:00 | 60 | 185 | 1700 | 155 | 170 | 2 | <2 | 1 | 0.2 | 335 |
|   | 12:00 | 120 | 305 | 1700 | 1110 | 280 | 1 | <2 | 1 | 0.4 | 285 |
|   | 14:00 | 120 | 425 | 1700 | 1110 | 391 | 3 | 18 | 1 | 0.1 | 225 |
|   | 14:30 | 30 | 455 | 1700 | 128 | 418 | 3 | 18 | 1 | 0.1 | 225 |

| | | | Cum. | | | meq discharging Column 5 | | | | |
|---|---|---|---|---|---|---|---|---|---|---|
| Day | Time | Elapsed Time | Minutes | Rate | Liters | Ca | Mg | K | NH₃ | Na |
| 1 | 13:50 | 0 | 0 | 1700 | 0 | | | | | |
| 1 | 15:00 | 70 | 70 | 1700 | 119 | 0 | 0 | 0 | 0 | 0 |
|   | 15:55 | 55 | 125 | 1700 | 93.5 | 0 | 0 | 0 | 0 | 0 |
| 2 | 9:00 | 0 | 125 | 1700 | 0 | 0 | 0 | 0 | 0 | 0 |
| 2 | 10:00 | 60 | 185 | 1700 | 102 | 10 | 8.4 | 2.6 | 1.2 | 1486 |
|   | 12:00 | 120 | 305 | 1700 | 204 | 10 | 17 | 5.2 | 4.8 | 2528 |
|   | 14:00 | 120 | 425 | 1700 | 204 | 31 | 151 | 5.2 | 1.2 | 1996 |
|   | 14:30 | 30 | 455 | 1700 | 51 | 7.7 | 38 | 1.3 | 0.3 | 499 |

| | | | | Net Loading on Column 5 | | | | |
|---|---|---|---|---|---|---|---|---|
| Day | Time | Elapsed Time | Cum. Minutes | Ca | Mg | K | NH₃ | Na |
| 1 | 13:50 | 0 | 0 | | | | | |
| 1 | 15:00 | 70 | 70 | | | | | |
|   | 15:55 | 55 | 125 | | | | | |
| 2 | 9:00 | 0 | 125 | | | | | |
| 2 | 10:00 | 60 | 185 | −5.1 | 0 | 0 | 5.4 | −200 |
|   | 12:00 | 120 | 305 | 101 | 18 | 0 | 7.2 | −443 |
|   | 14:00 | 120 | 425 | 71 | 0 | 0 | 14 | −44 |
|   | 14:30 | 30 | 455 | 18 | 0 | 0 | 3.6 | −11 |

| | | | | Cumulative Loading on Column 5 | | | | |
|---|---|---|---|---|---|---|---|---|
| Day | Time | Elapsed Time | Cum. Minutes | Ca | Mg | K | NH₃ | Na |
| 1 | 13:50 | 0 | 0 | | | | | |
| 1 | 15:00 | 70 | 70 | | | | | |
|   | 15:55 | 55 | 125 | | | | | |
| 2 | 9:00 | 0 | 125 | 0 | 0 | 0 | 0 | 0 |
| 2 | 10:00 | 60 | 185 | −5.1 | 0 | 0 | 5.4 | −200 |
|   | 12:00 | 120 | 305 | 5.1 | 118 | 0 | 13 | −643 |
|   | 14:00 | 120 | 425 | 77 | 118 | 0 | 27 | −687 |
|   | 14:30 | 30 | 455 | 94 | 118 | 0 | 31 | −698 |

Example 7

Calcium Zeolite Absorption of Ammonia from an Aqueous Medium Containing Calcium, Magnesium, and Potassium FIGS. 8A–F provide tabular and graphical results of a five-column test run on a feed solution containing approximately 3.5 mg/L calcium, 2 mg/L magnesium, 30 mg/L potassium, 36 mg/L ammonia and 13 mg/L sodium. The run was performed at a flow rate of 0.95 L/minute for a time period of 280 minutes. FIG. 8 shows that the concentration of ammonia in column 5 effluent began at 0.03 mg/L and finished at 2.2 mg/L. The data indicates that the five-column configuration at the above-mentioned flow rate is effective to remove ammonia to a discharge level of less than 1 mg/L. FIGS. 8A–8F illustrate the MEQ per gram loading of the various components of the feed on each column versus bed volume. Again, this graphical data shows that the calcium on the zeolite is replaced by ammonia during the absorption process.

FIGS. 9A–9F, represent the results of a continuation of the run shown above in this Example (FIGS. 8A–F) in which column one was eluted with a calcium chloride brine solution and placed back into the test after column five. The data indicates that the concentration of ammonia in the regenerated column one effluent is at all times, but for the final reading, at a concentration of less than 1 mg/L. The final concentration of ammonia in the column one effluent was 1.5 mg/L, suggesting that the absorption of ammonia can be accomplished in a batch or a continuous process.

Finally, FIGS. 10A–F represents tabular and graphical results of a continuation of the above data in which the second column was regenerated and migrated and the concentration of potassium in the feed solution was increased from approximately 30 mg/L initially to approximately 90 mg/L. These results show that the transfer of potassium through zeolite to the brine does not substantially effect the absorption of ammonia.

Example 8

Industrial Scale-Up for Ammonia Removal and Destruction at a Theoretical Treatment Facility The following Table 13 provides a potential scale-up calculation for removing and destroying ammonia from a hypothetical one million gallon a day treatment facility. The amount of zeolite material and the size of the tank(s) for commercial applications are selected based on a number of design parameters, including but not limited to, average amount of ammonia in the water, desired levels of reduction, plant capacity (1 MGD) and the types of zeolites used.

Predictable scale-up for the methods according to the present invention are shown below with respect to a theoretical one million gallon per day treatment facility.

Table 13 summarizes a typical scale-up calculation for design of an industrial capacity system (1 MGD). A 98% reduction in ammonia concentration at the facility is attainable by using approximately 125 tons of zeolite. Each absorption column should be approximately 9 feet in diameter and 25 feet tall. A maximum rate of migration of the zeolite is approximately 116 pounds per minute and a minimum rate is 58 pounds per minute. Ultimately, the system provides for the destruction of approximately 1,673 pounds of ammonium sulfate solution per day.

TABLE 13

Material Balance For Calcium, Sulphuric acid and Ammonia At a 1 MGD Facility

| | Value |
|---|---|
| Input Data | |
| Gallons per day | 1.008 million |
| Gallons per minute | 700 |
| Ammonia in feed (mg/L) | 40 |
| Assumptions | |
| # lime/# $NH_3$ for stripping zeolite | 1.64 |
| # lime/# $NH_3$ for stripping brine | 0.82 |
| # lime/# $NH_3$ for destruction | 1.55 |
| # $H_2SO_4$/# $NH_3$ for ammonia removal | 2.875 |
| $CaSO_4$ produced/# of $NH_3$ | 5.1 |
| Results | |
| 1000 gallons/day | 1,008 |
| Pounds per day ammonia | 334.7 |
| Pounds zeolite loaded/day | 83,664 |
| Pounds zeolite stripped/min | 58 |
| Tons Zeolite in plant/3 days | 125 |
| # $H_2SO_4$ to remove ammonia/day | 962 |
| # $(NH_4)SO_4$/day | 1,297 |
| # lime for stripping zeolite | 549 |
| # lime for stripping brine | 274 |
| # lime for destruction | 519 |
| # total lime/day | 1,342 |
| Absorption | |
| Flow rate gpm/$ft^3$ | 10 |
| Square feet needed | 70 |
| Diameter of tank | 9.44 |
| Height of tank | 25 |
| Depth of zeolite/tank | 13 |
| Cubic feet zeolite/tank | 875 |
| Pounds zeolite/tank | 48,125 |
| Tons zeolite/tank | 24 |
| Number of loading tank | 4 |
| Tons zeolite in absorption circuit | 96.25 |
| Zeolite maximum advancement rate | 116 pounds/min |
| Zeolite minimum advancement rate | 58 pounds/min |
| Desorption | |
| Retainage time (minimum) | 2 hours |
| Cubic feet advancement of zeolite/min | 2.1 |
| Pounds capacity | 13,944 |
| Tons capacity | 7 |
| Cubic feet zeolite capacity | 254 |
| Depth of zeolite | 15 |
| Square feet of base | 16.9 |
| Diameter of base | 4.6 |
| Brine flow rate/$ft^3$ | 6 |
| Gallons per minute brine | 101.4 |
| Cubic feet of brine/minute | 13.6 |
| Minimum bed volumes | 770 |
| Ammonia Stripping | |
| Flow rate to ammonia stripper | 101.4 |
| Square feet of stripper | 101.4 |
| Diameter of stripper | 11.4 |
| Height of stripper | 20 |
| Air flow of stripper | 40,673 $ft^3$ |
| Lime to stripper | 0.93 lb/minute |

TABLE 13-continued

Material Balance For Calcium, Sulphuric acid and Ammonia At a 1 MGD Facility

| | Value |
|---|---|
| Ammonia Recovery | |
| Diameter of absorber | 11.4 |
| Flow rate of absorber | 507 |
| Air flow to absorber | 40,673 ft$^3$ |
| H$_2$SO$_4$ to absorber | 0.67 lb/minute |
| Pounds (NH$_4$)$_2$SO$_4$ produced/minute | 0.90 lb/minute |
| Zeolite Rinse | |
| Retainage time (minimum) | 0.5 hours |
| Cubic feet advancement of zeolite/minute | 2.1 |
| Pounds capacity | 3,486 |
| Tons capacity | 1.7 |
| Cubic feet zeolite capacity | 63 |
| Depth of zeolite | 15 |
| Square feet of base | 4.2 |
| Diameter of base | 2.3 |
| Brine flow rate/ft$^3$ | 6 |
| Gallons per minute rinse solution | 25.4 |
| Cubic feet of brine/minute | 3.4 |
| Minimum bed volumes | 48 |
| Ammonia Destruction | |
| Bleed stream to destruction stripper | 1,673.28 lbs/day |
| Cubic feet liquid to destruction stripper | 26.82 ft$^3$/day |
| Liquid to stripper/minute | 0.139 gallons/minute |
| Air to destruction stripper/minute | 55.865 ft$^3$/min |
| Gypsum production | 1706.7456/day |
| Number/minute gypsum production | 1.19 |

The above discussed scale-up calculation illustrates the utility of the present invention, for large scale application of the present invention.

Example 9

Pilot Plant Study—Ammonia Removal Pilot Plant at Tomahawk Wastewater Treatment Facility, Johnson County, Kansas.

The Tomahawk wastewater treatment facility has a trickling filter system with ammonia discharges that limit the plant throughput. The plant has a current capacity of 9 MGD, but operates at 4 MGD and has an ammonia permit of 4 mg/L.

A six day pilot study was conducted to verify the applicability of the methods and apparatuses of the present invention at removing ammonia from a wastewater source. The pilot study was set-up to test 3.5 gallons/minute, having a feed concentration of 11.65 mg/L ammonia. A total of 29,000 gallons of water was treated during the study. Sampling and analysis were conducted on-site using a Hanna Ion Specific Meter for ammonia and analysis was re-checked at the Johnson County Wastewater Lab (note that discrepancies between lab results appear to be due to the differences in the sample analysis temperature).

As shown in Table 14, the pilot ammonia removal plant was effective at removing a sub-permit level of ammonia. Ultimately, ammonia discharge was lowered to 1.14 mg/L, showing an ammonia recovery of 90.2%. The chemical consumption used during the test was below expectation.

TABLE 14

Johnson County Pilot Plant

| Day | Time | JCW Lab feed NH$_3$—N mg/L | WRT feed NH$_3$—N mg/L | JCW Lab discharge NH$_3$—N mg/L | WRT discharge NH$_3$—N mg/L |
|---|---|---|---|---|---|
| 1 | 12 PM | 10.52 | 12.80 | 0.17 | 0.95 |
| 1 | 2 PM | 12.20 | 15.40 | 0.10 | 1.12 |
| 1 | 3 PM | 10.06 | 10.60 | 0.56 | 1.14 |
| 4 | 7 PM | 11.24 | 9.12 | 0.29 | 0.70 |
| 5 | 8 AM | 8.84 | 8.78 | 0.98 | 1.43 |
| | Average: | 10.57 | 11.34 | 0.39 | 1.07 |

The data in the pilot study shows the utility of the present invention at removing ammonia from a waste water stream.

Example 10

Pilot Plant Study-Ammonia Removal Pilot Plant at Colorado City Wastewater Treatment Facility, Colo. City, Colo.

The Colorado City wastewater treatment facility has an aerated lagoon system with ammonia discharges that limit the plant throughput. The plant has a current capacity of about 0.35 MGD and an ammonia permit level of 10 mg/L, which is expected to be decreased to 2 mg/L in the near future.

A six day pilot study was conducted to verify the applicability of the methods and apparatuses of the present invention at removing ammonia from a wastewater source. The pilot study was set-up to test 15 gallons/minute, having a feed concentration of 16.2 mg/L ammonia. A total of 65,300 gallons of water was treated during the study. Sampling and analysis were conducted on-site using a Hanna Ion Specific Meter for ammonia.

Figure 11:
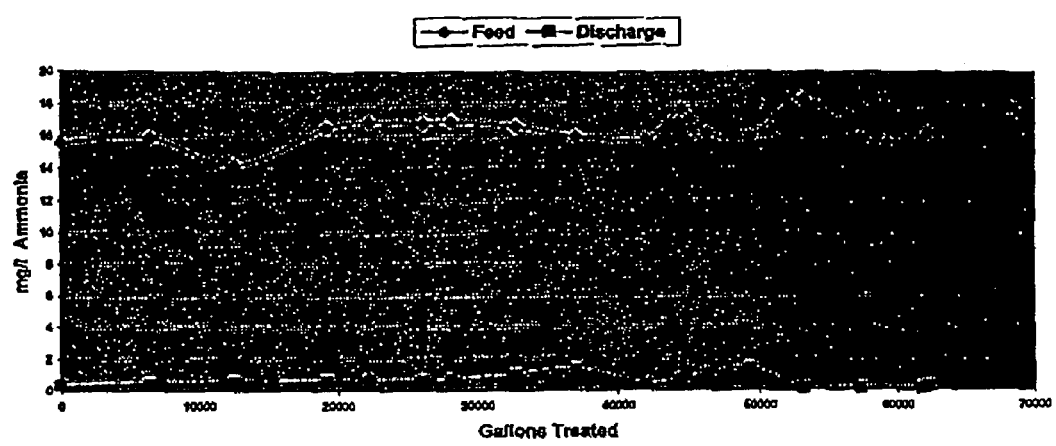
FIG. 11 provides data from a pilot study performed at Colorado City, Colo., showing the feed and discharge levels of ammonia for a 1000 gallon treatment in accordance with embodiments of the present invention.

As shown in FIG. 11, the pilot ammonia removal plant was effective at removing a sub-permit level of ammonia. Ultimately, ammonia discharge was lowered to 0.6 mg/L, showing an ammonia recovery of 96.5%. The chemical consumption used during the test was at or below expectation.

Example 11

Pilot Plant Study-Air Stripping Ammonia from Feed Having High Ammonia Levels

The pilot study was performed for the City of Harrisburg in an effort to remove ammonia directly to an air stripping unit from a high ammonia waste stream (the secondary digester discharge). The basic process consist of first clarifying the feed medium from the secondary digester and filter press returning solids to the filter press for removal from the system and air stripping the ammonia from the medium. The ammonia is then recaptured in a mild acid solution to form up to 20% ammonium sulfate. The low ammonia feed medium is then returned to the process plant. The ammonium sulfate can be used as fertilizer or burned to release nitrogen as has been discussed above.

Note that it was originally hoped that the secondary digester discharge could be handled with no additional clarification but the discharge was too viscous, having to many large particles of plastic and other waste. As such, it was necessary to clarify the solution prior to air stripping.

Figure 12:
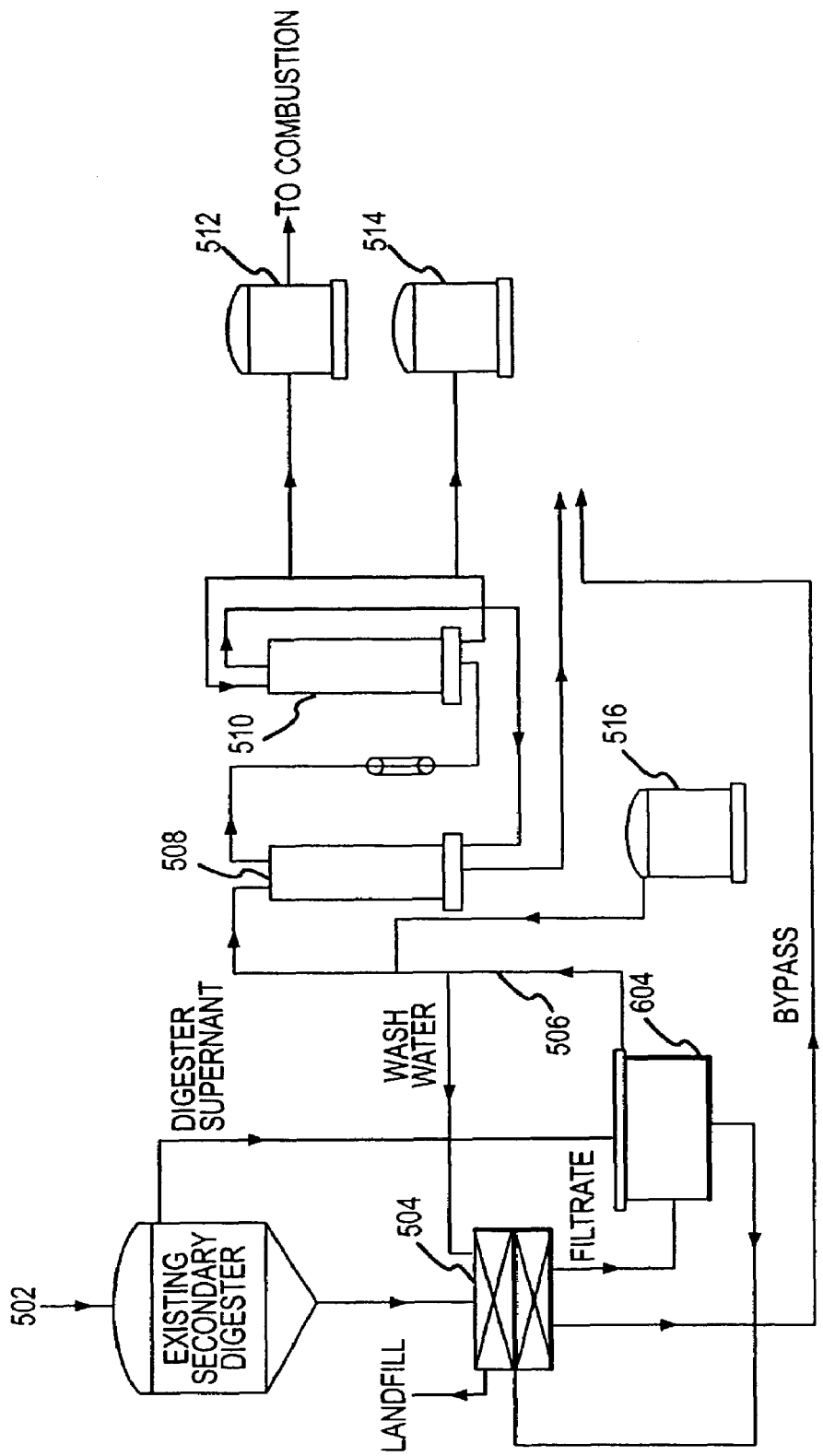
FIG. 12 is a schematic of the air stripping process in accordance with an embodiment of the present invention.

The schematic diagram in FIG. 12 provides an overview of the steps performed in the process. For example, feed 500 is filtered 502 and/or clarified 504 to provide a high ammonia stream 506 for the air stripping process. The filtrate cycles through an ammonia stripper 508 and scrubber 510 as previously described, to provide an ammonium sulfate solution for storage in a tank 512. Acid 514 and caustic 516 storage tanks are shown. The data, as illustrated in Table 15, shows that ammonia recoveries of about 90 to 98% could be achieved when the pH was maintained at about 10. Caustic consumption was lower than expected, averaging 3.68 pounds per 1000 gallons treated. Recovery is directly related to the pH of the solution, where a pH of 10 to 12 is necessary to have recovery over 90%. The average results of the four day test were: feed rate=0.52 gallons/min., feed concentration=274 mg/L ammonia, discharge pH=10, the discharge ammonia concentration=21 mg/L, providing a recovery of 93% on average.

TABLE 15

Ammonia Recover From A Highly Concentrated Ammonia Source

| Day | Time | Feed Temp | Feed Flow | Feed Total | Feed pH Target/Actual | Feed $NH_4$ |
|---|---|---|---|---|---|---|
| 1 | start | | 0.53 | 216.7 | 10.5/10.2 | 181 |
| | 20 min | | 0.57 | 224 | 10.5/11 | 212 |
| | 42 | | | 235.8 | | |
| | 56 | | 0.51 | 243.1 | 10.5/10.2 | 196 |
| | 80 | | 0.54 | 256.5 | 10.5/10.2 | |
| | 110 | | 0.45 | 271.9 | 10.2/10.8 | 193/217 |
| | 140 | | 0.48 | 287.2 | 10/11 | 192 |
| | 170 | | 0.51 | 301.4 | 10/10 | 188 |
| | 200 | 27.4° C. | 0.56 | 316.4 | 10/10.1 | 99 |
| | 230 | | 0.47 | 330.5 | 10.0/9.7 | 180.5 |
| | 290 | | 0.53 | 356 | 9/9.3 | 609 |
| | 320 | | 0.55 | 377.7 | 9/8.7 | |
| | 350 | 27.5° C. | 0.61 | 391.3 | 9/8.9 | 210 |
| | 380 | | 0.61 | 410.2 | 9/9.8 | |
| | 410 | | 0.53 | 426.2 | 9.8/10 | 209.5 |
| | 440 | 27.6° C. | 0.5 | 442.5 | 9.5/10.6 | |
| | 455 | | | | | 288.5 |
| | 470 | | 0.51 | 458.3 | 9.5/9.8 | |
| | 500 | | 0.5 | 473.2 | 9.2/9.8 | |
| | 530 | | 0.49 | 484.2 | 9.2/10.9 | |
| 2 | start | | | | | |
| | 20 | | 0.50 | 503.1 | 9.4 | |
| | 50 | | 0.51 | 517.4 | 9.1 | 236 |
| | 80 | 26.0° C. | 0.50 | 531.8 | 9.9 | |
| | 110 | | 0.48 | 546.6 | 9.7 | 213 |
| | 140 | | 0.49 | 561.5 | 10 | |
| | 170 | | 0.54 | 577.4 | 9.7 | 212 |
| | 200 | | 0.55 | 592.3 | 9.5 | 211 |
| | 230 | | 0.54 | 607.2 | 9.9 | 214 |
| 3 | start | | | 619.2 | | |
| | 15 | 30.2° C. | 0.52 | 627.5 | 9.9 | 283 |
| | 45 | | 0.52 | 643.4 | 10.2 | 270 |
| | 75 | | 0.52 | 658.5 | 10.3 | 278 |
| | 105 | | 0.55 | 674.6 | 11 | 251 |
| | 135 | | 0.53 | 689.8 | 10.7 | 266 |
| | 165 | | 0.43 | 702.6 | 9.9 | 295 |
| 3 | re-start | | 0.48 | 713 | 9.5 | |
| | 36 | 28.8° C. | 0.50 | 821.9 | 11.2 | 301 |
| | 66 | | 0.53 | 840.3 | 10 | 395 |
| | 90 | | 0.55 | 852.4 | 10.3 | 353 |
| | 120 | | 0.53 | 868.4 | 11.1 | |
| | 150 | | 0.54 | 884.2 | 10.4 | 311 |

TABLE 15-continued

Ammonia Recover From A Highly Concentrated Ammonia Source

| 4 | start | | | | | |
|---|---|---|---|---|---|---|
| | 10 | 25.3° C. | 0.5 | 892.2 | 9.9 | |
| | 40 | | 0.52 | 905.9 | 10.2 | 573 |
| | 70 | | 0.49 | 921.2 | 10.1 | 391 |
| | 100 | | 0.57 | 937.6 | 10.8 | 307 |
| | 130 | | 0.52 | 954.4 | 10.4 | 307 |
| | 160 | | 0.53/ | | | |
| | | | 0.51 | 968.5 | 10.2 | 293 |
| | 190 | | 0.51 | 984.8 | 10.2 | 300 |
| | 220 | | 0.49 | 999.6 | 10.3 | 301 |
| | 250 | | 0.50 | 1014.9 | 10.9 | 299 |
| | 280 | | 0.47 | 1029 | 10.4 | 295 |
| | 310 | | 0.5 | 1043.7 | 10.7 | 316 |
| | 330 | | | | | |
| | 340 | | 0.5 | 1058.6 | 10.4 | 316 |
| | 370 | | 0.5 | 1073.6 | 10.9 | 298 |

| Day | Time | Caustic added | Discharge pH | Discharge $NH_4$ | Concen. flow | Conc. pH | Conc. $NH_4$ |
|---|---|---|---|---|---|---|---|
| 1 | start | | 10.3 | 7.82 | 1.24 | | 0.167% |
| | 20 min | | 10.5 | 15.58 | 1.26 | | 0.189 |
| | 42 | 75/75 | 10.6 | | | | |
| | 56 | 120/195 | 10.4 | 6.6 | 1.27 | 1.6 | 0.217 |
| | 80 | 195/390 | 10.9 | | 1.27 | 1.7 | |
| | 110 | 185/575 | 10.9 | 3.06 | 1.28 | 1.8 | 0.255 |
| | 140 | 205/780 | 10.1 | 3.55 | 1.27 | 1.9 | |
| | 170 | 155/935 | 10.1 | 8.20 | 1.27 | 2 | 0.323 |
| | 200 | 175/1110 | 10.2 | 13.8 | 1.27 | 2.2 | |
| | 230 | 160/1270 | 10.6 | 3.86 | 1.28 | 2.5 | |
| | 290 | 245/1515 | 9.7 | 43.54 | 1.28 | 3.3 | 0.42 |
| | 320 | 165/1680 | 9.2 | | 1.29 | 3.1 | |
| | 350 | 125/1805 | 9.7 | 35.94 | 1.28 | 3.6 | 0.477 |
| | 380 | 135/1940 | 9.3 | | 1.28 | 3.4 | |
| | 410 | 145/2085 | 9.4 | 35.68 | 1.28 | 3.3 | 0.519 |
| | 440 | 160/2245 | 9.8 | | 1.28 | 4.2 | |
| | 455 | | 9.5 | 29.2 | | | |
| | 470 | 170/2415 | 10.1 | | 1.28 | 3.4 | |
| | 500 | 135/2550 | 10.0 | | 1.28 | 3.7 | |
| | 530 | 125/2675 | 9.8 | | 1.28 | 3.2 | |
| 2 | start | | | | | | |
| | 20 | 60/60 | 9.5 | | 1.16 | 3.1 | |
| | 50 | 125/185 | 9.9 | 10.7 | 1.21 | 5.0 | 1962 |
| | 80 | 135/320 | 10 | | 1.20 | 3.5 | |
| | 110 | 135/455 | 9.9 | 5.08 | 1.20 | 3.8 | 6794 |
| | 140 | 125/580 | 10 | | 1.20 | 5.0 | |
| | 170 | 270/850 | 9.7 | 92 | 1.21 | 3.0 | 7534 |
| | 200 | 210/1060 | 9.4 | 24 | 1.21 | 4.2 | |
| | 230 | 240/1300 | 9.9 | 25 | | 3.2 | |
| 3 | start | | | | | | |
| | 15 | 150/150 | 9.4 | 53.8 | 1.26 | 3.2 | |
| | 45 | 230/380 | 9.8 | 29.1 | 1.27 | 3.4 | |
| | 75 | 270/650 | 9.9 | 26.3 | 1.28 | 3.5 | |
| | 105 | 230/880 | 10 | 28.8 | 1.30 | 3.5 | |
| | 135 | 300/1180 | 10.3 | 15.3 | 1.28 | 4.6 | |
| | 165 | 295/1475 | 10.5 | 22.9 | 1.27 | 4 | |
| 3 | re-start | 200/1675 | 10.1 | | 1.24 | 3.8 | |
| | 36 | 570/2245 | 10.2 | 16.7 | 1.24 | 3.9 | |
| | 66 | 330/2575 | 10 | 15.5 | 1.25 | 3.5 | |
| | 90 | 230/2805 | 10.2 | 16.1 | 1.25 | 3.7 | |
| | 120 | 270/3075 | 10.1 | | 1.26 | 3.6 | |
| | 150 | 360/3435 | 10 | 21 | 1.27 | 3.7 | |
| 4 | start | | | | | | |
| | 10 | 80/80 | 9.9 | | 1.21 | 2.6 | |
| | 40 | 260/340 | 10.2 | 25.3 | 1.22 | 3.9 | |
| | 70 | 360/700 | 10.2 | 20.1 | 1.23 | 3.5 | |
| | 100 | 300/1000 | 10.2 | 26.8 | 1.23 | 3.6 | |
| | 130 | 340/1340 | 10.3 | 18.9 | 1.23 | 4.2 | |
| | 160 | 310/1650 | 10.3 | 18.3 | 1.23 | 3.9 | |
| | 190 | 360/2010 | 10.3 | 15.3 | 1.24 | 3.9 | |
| | 220 | 270/2280 | 10.2 | 11.8 | 1.22 | 3.8 | |
| | 250 | 350/2630 | 10.3 | 11.5 | 1.24 | 3.8 | |
| | 280 | 265/2895 | 10.3 | 8.8 | 1.23 | 3.8 | |

TABLE 15-continued

Ammonia Recover From A Highly Concentrated Ammonia Source

| | | | | | |
|---|---|---|---|---|---|
| 310 | 295/3190 | 10.3 | 11.7 | 1.23 | 4.1 |
| 330 | | | | | |
| 340 | 370/3560 | 10.3 | 12.6 | 1.23 | 3.5 |
| 370 | 320/3880 | 10.3 | 11.2 | 1.23 | 4.3 |

| Day | Time | Acid Added | Air Flow | NaOH ml | $H_2SO_4$ |
|---|---|---|---|---|---|
| 1 | start | | 0.15/1528 | | |
| | 20 min | | 0.145/1502 | | |
| | 42 | | 0.15/1528 | | |
| | 56 | | 0.14/1476 | | |
| | 80 | | 0.145/1502 | | |
| | 110 | | 0.135/1450 | | |
| | 140 | | 0.135/1450 | | |
| | 170 | 50/50 | 0.14/1476 | | |
| | 200 | | 0.12/1371 | | |
| | 230 | | 0.14/1476 | | |
| | 290 | | 0.13/1424 | | |
| | 320 | 90/140 | 0.12/1371 | 835 | 410 |
| | 350 | 85/225 | 0.11/1319 | 710 | 325 |
| | 380 | 98/323 | 0.12/1371 | 575 | 227 |
| | 410 | 97/420 | 0.12/1371 | 430/1000 | 130/500 |
| | 440 | 100/520 | 0.13/1424 | 840 | 400 |
| | 455 | | | | |
| | 470 | 105/625 | 0.12/1371 | 670 | 295 |
| | 500 | 70/695 | 0.125/1397 | 535 | 225 |
| | 530 | 115/810 | 0.11 | 410 | 110 |
| 2 | start | | | | |
| | 20 | | 0.155/1555 | 940 | 485 |
| | 50 | | 0.135/1450 | 815 | 445 |
| | 80 | 185 | 0.135/1450 | 680 | 315 |
| | 110 | 90/275 | 0.135/1450 | 545 | 225 |
| | 140 | 95/365 | 0.135/1450 | 420 | 405 |
| | 170 | 75/440 | 0.135/1450 | 150 | 330 |
| | 200 | 75/515 | 0.135/1450 | 790 | 255 |
| | 230 | 125/640 | | 550 | 130 |
| 3 | start | | | | |
| | 15 | 15/15 | 0.26/1420 | 850 | 485 |
| | 45 | 130/145 | 0.16/1581 | 620 | 355 |
| | 75 | 130/275 | 0.16/1581 | 350 | 225 |
| | 105 | 110/385 | 0.155/1555 | 770 | 390 |
| | 135 | 140/525 | 0.16/1581 | 470 | 250 |
| | 165 | 285/690 | 0.155/1555 | 175 | 85 |
| 3 | re-start | 80/770 | | 800 | 420 |
| | 36 | 210/980 | 0.07/1060 | 230 | 210 |
| | 66 | 160/1140 | 0.26 | 660 | 340 |
| | 90 | 100/1240 | 0.16/1581 | 430 | 240 |
| | 120 | 110/1350 | 0.16/1581 | 730 | 390 |
| | 150 | 170/1520 | 0.16/1581 | 370 | 220 |
| 4 | start | | | | |
| | 10 | 5/5 | 0.17/1634 | 920 | 495 |
| | 40 | 5/10 | 0.16/1581 | 660 | 490 |
| | 70 | 165/175 | 0.16/1581 | 300 | 325 |
| | 100 | 155/330 | 0.155/1555 | 700 | 170 |
| | 130 | 155/485 | 0.15 | 360 | 345 |
| | 160 | 120/605 | 0.15 | 690 | 225/500 |
| | 190 | 120/725 | 0.15/1555 | 330 | 345 |
| | 220 | 125/850 | 0.15/1555 | 730 | 220 |
| | 250 | 150/1000 | 0.15/1555 | 380 | 370 |
| | 280 | 130/1130 | 0.15 | 735 | 240/500 |
| | 310 | | 95/1225 | 0.145/1502 | 440 | 405 |
| | 330 | | | 180/1000 | | |
| | 340 | | 145/1370 | 0.14/1502 | 890 | 260 |
| | 370 | | 165/1535 | 0.14 | 570 | 95 |

The data in this Example shows that ammonia can be recovered directly from a secondary or high ammonia source. Caustic consumption for pH control was less than anticipated.

It should be understood for purposes of this disclosure, that various changes and modifications may be made to the invention that are well within the scope of the invention. Numerous other changes may be made which will readily suggest themselves to those skilled in the art and which are encompassed in the spirit of the invention disclosed herein and as defined in the appended claims.

What is claimed is:

1. A system for removing ammonia from an aqueous medium comprising:
   an ammonia absorption unit for contacting an amount of zeolite with the aqueous medium;
   an ammonia elution unit for eluting the ammonia from the zeolite with a brine solution;
   an air stripping unit for dissociating the ammonia from the brine solution and providing an ammonia gas;
   an acid wash unit for treating the ammonia gas with an acid wash and forming an ammonium salt;
   a second air stripping unit for receiving the ammonium salt and a base to dissociate the ammonia in the form of ammonium hydroxide and providing an ammonia gas; and
   a combustion unit for receiving the ammonium gas to be burned at a controlled temperature.

2. The system of claim 1 further comprising:
   a pre-burner unit for providing an exhaust gas to the ammonia gas in the combustion unit, wherein the exhaust gas raises the temperature within the combustion unit to a level appropriate for the combustion of the ammonia gas.

3. The system of claim 1 further comprising:
   a re-circulation unit for concentrating the ammonium salt, the re-circulation unit providing the ammonium salt solution back to the air stripping unit for additional ammonium salt production.

4. The system of claim 1 further comprising:
   a zeolite regeneration unit for regenerating fresh-zeolite from spent zeolite and providing the regenerated zeolite for continued use in the absorption unit.

* * * * *